United States Patent
Nickerson et al.

(10) Patent No.: US 12,468,970 B2
(45) Date of Patent: Nov. 11, 2025

(54) PHOTONIC QUANTUM COMPUTER ARCHITECTURE

(71) Applicant: Psiquantum, Corp., Palo Alto, CA (US)

(72) Inventors: Naomi Nickerson, San Francisco, CA (US); Hector Bombin Palomo, Kyoto (JP)

(73) Assignee: Psiquantum, Corp., Palo Alto, CA (US)

(*) Notice: Subject to any disclaimer, the term of this patent is extended or adjusted under 35 U.S.C. 154(b) by 608 days.

(21) Appl. No.: 17/555,238

(22) Filed: Dec. 17, 2021

(65) Prior Publication Data

US 2022/0224996 A1 Jul. 14, 2022

Related U.S. Application Data

(63) Continuation of application No. PCT/US2020/038962, filed on Jun. 22, 2020.
(Continued)

(51) Int. Cl.
*G06N 10/20* (2022.01)
*G06N 10/40* (2022.01)
(Continued)

(52) U.S. Cl.
CPC ............ *G06N 10/20* (2022.01); *G06N 10/40* (2022.01); *H03K 17/92* (2013.01); *H04B 10/70* (2013.01);
(Continued)

(58) Field of Classification Search
CPC ........ G06N 10/20; G06N 10/40; H03K 17/92; H04B 10/70; H04Q 11/0005; H04Q 2011/002; C09J 123/10
See application file for complete search history.

(56) References Cited

U.S. PATENT DOCUMENTS

| | | | |
|---|---|---|---|
| 7,028,275 B1 * | 4/2006 | Chen | G06N 10/20 703/2 |
| 7,277,872 B2 | 10/2007 | Raussendorf et al. | |

(Continued)

FOREIGN PATENT DOCUMENTS

| | | |
|---|---|---|
| EP | 3109803 B1 | 7/2020 |
| JP | 2012531874 A | 12/2012 |

(Continued)

OTHER PUBLICATIONS

Mercedes Gimeno, Relative multiplexing for minimising switching in linear-optical quantum computing, New J. Phys. 19 (2017) 063013, Published Jun. 6, 2017). (Year: 2017).*

(Continued)

*Primary Examiner* — Tung S Lau
(74) *Attorney, Agent, or Firm* — Kilpatrick Townsend & Stockton LLP

(57) ABSTRACT

Entanglement among qubits can be generated using "rasterized" and interleaving techniques. A circuit can include a resource state generator that generates one resource state per clock cycle, with each resource state having a number of entangled qubits. The circuit can also include circuits and delay lines to perform entangling measurement operations on qubits of resource states generated by the same resource state generator in different clock cycles. With appropriate selection of delay lines, a single resource state generator can generate all of the resource states needed to generate a large entanglement structure. Hybrid techniques can also be used, where the number of resource state circuits is greater than one but less than the number of resource states needed to generate the entanglement structure.

9 Claims, 38 Drawing Sheets

Related U.S. Application Data

(60) Provisional application No. 63/006,590, filed on Apr. 7, 2020, provisional application No. 62/926,383, filed on Oct. 25, 2019, provisional application No. 62/865,058, filed on Jun. 21, 2019.

(51) Int. Cl.
*H03K 17/92* (2006.01)
*H04B 10/70* (2013.01)
*H04Q 11/00* (2006.01)

(52) U.S. Cl.
CPC ... *H04Q 11/0005* (2013.01); *H04Q 2011/002* (2013.01)

(56) References Cited

U.S. PATENT DOCUMENTS

| | | |
|---|---|---|
| 7,554,080 B2 | 6/2009 | Munro et al. |
| 9,178,154 B2 | 11/2015 | Bunyk |
| 9,509,428 B2 * | 11/2016 | Boertjes ............. H04J 14/0227 |
| 9,735,776 B1 | 8/2017 | Abdo et al. |
| 9,858,531 B1 | 1/2018 | Monroe et al. |
| 9,944,520 B2 | 4/2018 | Ashikhmin |
| 10,592,626 B1 | 3/2020 | Pednault et al. |
| 10,726,353 B2 | 7/2020 | Ashrafi |
| 11,010,145 B1 | 5/2021 | Smith et al. |
| 11,093,215 B2 | 8/2021 | Harris et al. |
| 11,263,076 B2 | 3/2022 | Nickerson et al. |
| 11,892,746 B1 | 2/2024 | Mazed |
| 11,972,321 B2 | 4/2024 | Gunnels et al. |
| 2008/0035911 A1 | 2/2008 | Gilbert et al. |
| 2009/0070402 A1* | 3/2009 | Rose ...................... G06N 10/80 709/201 |
| 2009/0078931 A1 | 3/2009 | Berkley |
| 2009/0180616 A1 | 7/2009 | Brodsky et al. |
| 2011/0175062 A1 | 7/2011 | Farinelli et al. |
| 2012/0155870 A1 | 6/2012 | Harrison et al. |
| 2014/0112478 A1 | 4/2014 | Arahira |
| 2014/0153926 A1 | 6/2014 | Mower et al. |
| 2014/0221059 A1 | 8/2014 | Freedman et al. |
| 2014/0314419 A1* | 10/2014 | Paik ...................... H04B 10/70 398/115 |
| 2014/0355998 A1 | 12/2014 | Tanzilli et al. |
| 2015/0036967 A1 | 2/2015 | Smith et al. |
| 2016/0112066 A1 | 4/2016 | Ashikhmin |
| 2016/0245639 A1 | 8/2016 | Mower et al. |
| 2016/0267032 A1 | 9/2016 | Rigetti et al. |
| 2016/0344414 A1 | 11/2016 | Naaman et al. |
| 2017/0141287 A1 | 5/2017 | Barkeshli et al. |
| 2018/0013426 A1 | 1/2018 | Deurloo et al. |
| 2018/0046933 A1 | 2/2018 | La Cour et al. |
| 2020/0044749 A1 | 2/2020 | Rauschenbach et al. |
| 2020/0097848 A1 | 3/2020 | Woerner et al. |
| 2020/0287631 A1 | 9/2020 | Gimeno-Segovia et al. |
| 2020/0301244 A1 | 9/2020 | Wang |
| 2020/0401927 A1 | 12/2020 | Nickerson et al. |
| 2021/0027188 A1 | 1/2021 | Nickerson et al. |
| 2021/0105135 A1 | 4/2021 | Figueroa et al. |
| 2021/0374588 A1 | 12/2021 | Gidney et al. |
| 2022/0172096 A1 | 6/2022 | Rudolph |
| 2022/0224996 A1 | 7/2022 | Nickerson et al. |
| 2022/0374378 A1 | 11/2022 | Sivan et al. |
| 2022/0383175 A1 | 12/2022 | Gimeno-Segovia et al. |
| 2023/0042201 A1 | 2/2023 | Raussendorf et al. |
| 2023/0112525 A1 | 4/2023 | Naveh et al. |
| 2023/0237359 A1 | 7/2023 | Rogers et al. |
| 2023/0237360 A1 | 7/2023 | Naveh et al. |
| 2023/0244973 A1 | 8/2023 | Naveh et al. |
| 2023/0315516 A1 | 10/2023 | Fitzpatrick et al. |
| 2024/0168906 A1 | 5/2024 | Litinski |
| 2024/0275495 A1 | 8/2024 | Qiang et al. |

FOREIGN PATENT DOCUMENTS

| | | |
|---|---|---|
| JP | 2016504002 A | 2/2016 |
| JP | 2018538680 A | 12/2018 |
| JP | 2022537399 A | 8/2022 |
| WO | 2019178009 A1 | 9/2019 |
| WO | 2019183602 A1 | 9/2019 |
| WO | 2020033588 A1 | 2/2020 |
| WO | 2020056324 A1 | 3/2020 |
| WO | 2020257772 A1 | 12/2020 |
| WO | 2022159847 A1 | 7/2022 |
| WO | 2022241336 A2 | 11/2022 |

OTHER PUBLICATIONS

Delfosse, "Hierarchical Decoding to Reduce Hardware Requirements for Quantum Computingg", Available Online at: https://arxiv.org/pdf/2001.11427.pdf, Jan. 30, 2020, pp. 1-8.

Fujisaki, et al., "A Practical and Scalable Decoder for Topological Quantum Error Correction with Digital Annealer", Available Online at: https://arxiv.org/pdf/2203.15304.pdf, Sep. 9, 2022, pp. 1-12.

Preskill, "Quantum Computing in the NISQ Era and Beyond", Quantum Journal, vol. 2, No. 79, Jul. 2018, pp. 1-20.

Spitz, et al., "Adaptive Weight Estimator for Quantum Error Correction in a Time-dependent Environment", Advanced Quantum Technologies, vol. 1, No. 1, 180012, Jul. 30, 2018, p. 1-8.

U.S. Appl. No. 18/108,550, Notice of Allowance, Mailed on May 29, 2024, 8 pages.

U.S. Appl. No. 18/108,552, Non-Final Office Action, Mailed on Jul. 18, 2024, 7 pages.

U.S. Appl. No. 18/108,552 , Notice of Allowance, Mailed on Nov. 15, 2024, 8 pages.

U.S. Appl. No. 18/108,556, Non-Final Office Action, Mailed on Sep. 6, 2024, 22 pages.

U.S. Appl. No. 18/108,561, Notice of Allowance, Mailed on Jul. 31, 2024, 9 pages.

Adcock et al., "Programmable Four-Photon Graph States on a Silicon Chip", Nature Communications, vol. 10, No. 3528, Aug. 6, 2019, 6 pages.

Bartolucci et al., "Creation of Entangled Photonic States Using Linear Optics", Available online at: https://arxiv.org/abs/ 2106.13825, Jun. 25, 2021, 18 pages.

Bartolucci et al., "Switch Networks for Photonic Fusion-Based Quantum Computing", Quantum Physics, Available online at: https://arxiv.org/abs/2109.13760, Sep. 28, 2021, 31 pages.

Application No. EP22808495.0 , Extended European Search Report, Mailed on Nov. 15, 2024, 19 pages.

Application No. JP2021-575967, Notice of Allowance, Mailed on Aug. 30, 2024, 3 pages.

Application No. PCT/US2023/012848, International Search Report and Written Opinion, Mailed on Sep. 30, 2024, 15 pages.

PCT/US2023/012848, "Invitation to Pay Additional Fees and, Where Applicable, Protest Fee", Aug. 5, 2024, 3 pages.

U.S. Appl. No. 17/163,219 , Final Office Action, Mailed On Apr. 20, 2023, 14 pages.

U.S. Appl. No. 17/808,979 , Non-Final Office Action, Mailed On Sep. 23, 2022, 17 pages.

U.S. Appl. No. 17/808,979 , Notice of Allowance, Mailed On Jan. 30, 2024, 8 pages.

U.S. Appl. No. 18/120,328 , Non- Final Office Action, Mailed On Aug. 2, 2023, 7 pages.

U.S. Appl. No. 18/120,328 , Notice of Allowance, Mailed On Sep. 1, 2023, 7 pages.

Ball, "First 100-Qubit Quantum Computer Enters Crowded Race", Nature, vol. 599, Nov. 19, 2021, p. 542.

Bombin et al., "Interleaving: Modular Architectures for Fault-Tolerant Photonic Quantum Computing", Available Online at https://arxiv.org/pdf/2103.08612.pdf, Mar. 15, 2021, 22 pages.

Bombin et al., "Logical Blocks for Fault-Tolerant Topological Quantum Computation", PRX Quantum, vol. 4, No. 2, Dec. 22, 2021, 39 pages.

(56) References Cited

OTHER PUBLICATIONS

Coecke et al., "Interacting Quantum Observables: Categorical Algebra and Diagrammatics", Oxford University, Apr. 21, 2011, 80 pages.
Application No. EP20826691.6, Extended European Search Report, Mailed On Jun. 9, 2023, 11 pages.
Application No. EP20826691.6, Office Action, Mailed On Apr. 24, 2024, 5 pages.
Fowler et al., "Surface Codes: Towards Practical Large-Scale Quantum Computation", Physical Review A, vol. 86, No. 3, Oct. 27, 2012, 54 pages.
Litinski, "Magic State Distillation: Not as Costly as You Think", Nov. 6, 2019, 22 pages.
Nielsen et al., "Quantum Computation and Quantum Information", Cambridge University Press, Available online at: www.cambridge.org/9781107002173, 2010, 6 pages.
PsiQuantum, Corp., PsiQuantum, Webpage from 4/20 Disclosing Cornell University Paper, 8 pages.
Aharonov et al., "Fault-Tolerant Quantum Computation with Constant Error Rate", SIAM Journal on Computing, vol. 38, No. 4, 2008, pp. 1207-1282.
Auger et al., "Fault-Tolerant Quantum Computation with Non-Deterministic Entangling Gates", Physical Review A, vol. 97, Mar. 16, 2018, pp. 1-5.
Barkeshli et al., "Modular Transformations Through Sequences of Topological Charge Projections", Physical Review B, vol. 94, Jan. 19, 2017, pp. 1-21.
Barrett et al., "Fault Tolerant Quantum Computation with Very High Threshold for Loss Errors", Physical Review Letters, vol. 105, No. 20, Nov. 15, 2010, pp. 1-4.
Bartolucci et al., "Fusion-Based Quantum Computation", Available Online at: https://arxiv.org/pdf/2101.09310.pdf, Jan. 22, 2021, pp. 1-25.
Blais et al., "Circuit Quantum Electrodynamics", Reviews of Modern Physics, vol. 93, May 19, 2021, pp. 1-82.
Bolt et al., "Foliated Quantum Error-Correcting Codes", Physical Review Letters, vol. 117, Aug. 12, 2016, pp. 070501-1-070501-6.
Bombin et al., "Quantum Measurements and Gates by Code Deformation", Journal of Physics A Mathematical and Theoretical, vol. 42, No. 9, May 2007, pp. 1-19.
Bombin, "Single-Shot Fault-Tolerant Quantum Error Correction", Physical Review X, vol. 5, Sep. 28, 2015, pp. 031043-1-031043-26.
Bombin, "Topological Order with a Twist: Ising Anyons from an Abelian Model", Physical Review Letters, vol. 105, Jul. 14, 2010, pp. 1-5.
Bourassa et al., "Blueprint for a Scalable Photonic Fault-Tolerant Quantum Computer", Quantum, vol. 5, Feb. 2, 2021, pp. 1-38.
Braunstein, "Quantum Information with Continuous Variables", Reviews of Modern Physics, vol. 77, No. 2, Apr.-Jun. 2005, pp. 1-65.
Braunstein, "Teleportation of Continuous Quantum Variables", Physical Review Letters, vol. 80, No. 4, Jan. 26, 1998, pp. 869-872.
Bravyi et al., "Quantum Codes on a Lattice with Boundary", Available Online at: https://arxiv.org/pdf/quant-ph/9811052.pdf, Nov. 20, 1998, pp. 1-6.
Briegel et al., "Measurement-Based Quantum Computation", Nature Physics, vol. 5, Oct. 9, 2009, pp. 1-20.
Brown et al., "Universal Fault-Tolerant Measurement-Based Quantum Computation", Physical Review Research, vol. 2, Aug. 25, 2020, pp. 1-30.
Browne et al., "Resource-Efficient Linear Optical Quantum Computation", Physical Review Letters, vol. 95, No. 1, Feb. 9, 2005, pp. 1-5.
Bruzewicz et al., "Trapped-Ion Quantum Computing: Progress and Challenges", Applied Physics Reviews, vol. 6, No. 2, Apr. 8, 2019, pp. 1-56.
Castellanos, "PsiQuantum Raises $450 Million to Build Its Quantum Computer", The Wall Street Journal, Jul. 27, 2021, 4 pages.

Chamberland et al., "Fault-Tolerant Quantum Computing in the Pauli or Clifford Frame with Slow Error Diagnostics", Quantum, vol. 2, Dec. 25, 2017, pp. 1-11.
Chao et al., "Optimization of the Surface Code Design for Majorana-Based Qubits", Quantum, vol. 4, Oct. 24, 2020, pp. 1-19.
Cirac et al., "Quantum Computations with Cold Trapped Ions", Physical Review Letters, vol. 74, No. 20, May 15, 1995, pp. 4091-4094.
Das et al., "A Scalable Decoder Micro-Architecture for Fault-Tolerant Quantum Computing", Available Online at: https://arxiv.org/pdf/2001.06598.pdf, Jan. 18, 2020, pp. 1-19.
Dawson et al., "Noise Thresholds for Optical Quantum Computers", Physical Review Letters, vol. 96, Jan. 17, 2006, pp. 1-5.
Delfosse et al., "Almost-Linear Time Decoding Algorithm for Topological Codes", Available Online at: https://arxiv.org/pdf/1709.06218.pdf, Sep. 19, 2017, pp. 1-10.
Dennis et al., "Topological Quantum Memory", Journal of Mathematical Physics, vol. 43, No. 9, Oct. 24, 2001, pp. 1-39.
Dyakonov, "The Case Against Quantum Computing", Institute of Electrical and Electronics Engineers Spectrum, Nov. 15, 2018, pp. 1-14.
Edmonds, "Paths, Trees, and Flowers", National Bureau of Standards and Princeton University, 1965, pp. 449-467.
Ewert et al., "3/4-Efficient Bell Measurement with Passive Linear Optics and Unentangled Ancillae", Physical Review Letters, vol. 113, No. 14, Sep. 30, 2014, pp. 1-8.
Gimeno-Segovia et al., "From Three-Photon GHZ States to Universal Ballistic Quantum Computation", Physical Review Letters, vol. 115, Feb. 26, 2015, pp. 1-9.
Glancy et al., "Error Analysis for Encoding a Qubit in an Oscillator", Physical Review A, vol. 73, No. 1, Jan. 2006, pp. 1-5.
Gottesman, "A Class of Quantum Error-Correcting Codes Saturating the Quantum Hamming Bound", Physical Review A, vol. 54, Sep. 1, 1996, pp. 1-22.
Gottesman et al., "Encoding a Qubit in an Oscillator", Physical Review A, vol. 64, No. 1, May 13, 2001, pp. 1-22.
Gottesman, "Fault-Tolerant Quantum Computation with Constant Overhead", Quantum Information & Computation, vol. 14, Nos. 15-16, Nov. 2014, pp. 1-33.
Gottesman et al., "Quantum Teleportation Is a Universal Computational Primitive", Nature, vol. 402, Aug. 2, 1999, pp. 1-6.
Grice, "Arbitrarily Complete Bell-State Measurement Using Only Linear Optical Elements", Physical Review A, vol. 84, No. 4, Oct. 2011, pp. 1-6.
Grumbling et al., "Quantum Computing: Progress and Prospects", The National Academies of Sciences, Engineering, and Medicine, 2019, pp. 156-192.
Hein et al., "Multiparty Entanglement in Graph States", Physical Review A, vol. 69, Jun. 9, 2004, pp. 062311-1-062311-20.
Herr et al., "A Local and Scalable Lattice Renormalization Method for Ballistic Quantum Computation", NPJ Quantum Information, vol. 4, No. 27, Jun. 21, 2018, pp. 1-8.
Herrera-Marti et al., "A Photonic Implementation for the Topological Cluster State Quantum Computer", Physical Review A, vol. 82, No. 3, May 17, 2010, pp. 1-7.
Horgan, "Will Quantum Computing Ever Live Up to Its Hype?", Scientific American, Apr. 20, 2021, 10 pages.
Horsman et al., "Surface Code Quantum Computing by Lattice Surgery", New Journal of Physics, vol. 14, Dec. 7, 2012, pp. 1-27.
Huo et al., "Learning Time-Dependent Noise To Reduce Logical Errors: Real Time Error Rate Estimation In Quantum Error Correction", New Journal of Physics. vol. 19, No. 12, Dec. 13, 2017, 11 pages.
Kane, "A Silicon-Based Nuclear Spin Quantum Computer", Nature, vol. 393, 1998, pp. 133-137.
Kastoryano et al., "Dissipative Preparation of Entanglement in Optical Cavities", Physical Review Letters, vol. 106, Feb. 28, 2011, pp. 1-4.
Kieling et al., "Percolation, Renormalization, and Quantum Computing with Non-Deterministic Gates", Physical Review Letters, vol. 99, No. 13, Jul. 20, 2007, pp. 1-5.

(56) References Cited

OTHER PUBLICATIONS

Naergaard et al., "Superconducting Qubits: Current State of Play", Annual Reviews of Condensed Matter Physics, vol. 11, Apr. 21, 2020, pp. 1-30.

Knill et al., "Efficient Linear Optics Quantum Computation", Available Online at https://arxiv.org/pdf/quant-ph/0006088.pdf, Jun. 20, 2000, pp. 1-8.

Knill, "Fault-Tolerant Postselected Quantum Computation: Threshold Analysis", Available Online at https://arxiv.org/pdf/quant-ph/0404104.pdf, Apr. 19, 2004, pp. 1-21.

Koch et al., "Charge Insensitive Qubit Design Derived From the Cooper Pair Box", Physical Review A, vol. 76, Oct. 12, 2007, pp. 1-21.

Kolmogorov, "Blossom V: A New Implementation of A Minimum Cost Perfect Matching Algorithm", Mathematical Programming Computation, vol. 1, No. 1, Apr. 21, 2009, pp. 1-15.

Krauter et al., "Entanglement Generated by Dissipation", International Conference on Quantum Information, Jun. 22, 2010, pp. 1-9.

Leung, "Quantum Computation by Measurements", International Journal of Quantum Information, vol. 2, No. 1, Feb. 27, 2004, pp. 1-10.

Li et al., "Resource Costs for Fault-Tolerant Linear Optical Quantum Computing", Physical Review X, vol. 5, No. 4, Apr. 22, 2015, pp. 1-13.

Litinski, "A Game of Surface Codes: Large-Scale Quantum Computing with Lattice Surgery", Quantum, vol. 3, Mar. 5, 2019, pp. 1-37.

Loss et al., "Quantum Computation with Quantum Dots", Physical Review A, vol. 57, Jan. 1, 1998, pp. 1-20.

Molmer et al., "Multi-Particle Entanglement of Hot Trapped Ions", Physical Review Letters, vol. 82, No. 9, Mar. 1, 1999, pp. 1-4.

Nayak et al., "Non-Abelian Anyons and Topological Quantum Computation", Reviews of Modern Physics, vol. 80, No. 3, Jul.-Sep. 2008, pp. 1-73.

Newman et al., "Generating Fault-Tolerant Cluster States from Crystal Structures", Quantum, vol. 4, Jul. 13, 2020, pp. 1-37.

Nickerson et al., "Measurement Based Fault Tolerance Beyond Foliation", PsiQuantum, Oct. 23, 2018, pp. 1-16.

Nielsen, "Optical Quantum Computation Using Cluster States", Physical Review Letters, vol. 93, No. 4, Jul. 23, 2004, pp. 1-4.

Nielsen, "Universal Quantum Computation Using Only Projective Measurement, Quantum Memory, and Preparation of the |0> State", Physics Letters A, vol. 308, Nos. 2-3, 2003, pp. 1-4.

Pant et al., "Percolation Thresholds for Photonic Quantum Computing", Nature Communications, vol. 10, 2019, pp. 1-12.

Politi et al., "Integrated Quantum Photonics", IEEE Journal of Selected Topics in Quantum Electronics, vol. 15, No. 6, 2009, pp. 1673-1684.

Raussendorf et al., "A Fault-Tolerant One-Way Quantum Computer", Annals of Physics, vol. 321, No. 9i, Sep. 2006, pp. 1-26.

Raussendorf et al., "Computational Model Underlying the One-Way Quantum Computer", Quantum Information & Computation, vol. 2, No. 6, Oct. 2002, pp. 1-37.

Riesebos et al., "Pauli Frames for Quantum Computer Architectures", Proceedings of the 54th Annual Design Automation Conference, 2017, 6 pages.

Shor, "Scheme for Reducing Decoherence in Quantum Computer Memory", Physical Review A, Third Series, vol. 52, No. 4, Oct. 1995, pp. R2493-R2496.

Tillich et al., "Quantum LDPC Codes With Positive Rate and Minimum Distance Proportional to n 1/2", ISIT'09: Proceedings of the 2009 IEEE international conference on Symposium on Information Theory, vol. 60, No. 2, Jun. 2009, pp. 1-21.

Vasmer et al., "Cellular Automaton Decoders for Topological Quantum Codes with Noisy Measurements and Beyond", Scientific Reports, Nature Research, Available Online At: https://www.nature.com/articles/s41598-021-81138-2, 2021, 14 pages.

Verstraete et al., "Quantum Computation, Quantum State Engineering, and Quantum Phase Transitions Driven by Dissipation", Nature Physics, vol. 5, Mar. 12, 2008, pp. 1-7.

Verstraete et al., "Renormalization Algorithms for Quantum-Many Body Systems in Two and Higher Dimensions", Available Online at https://arxiv.org/pdf/cond-mat/0407066.pdf, Jul. 2, 2004, pp. 1-5.

Webster et al., "Fault-Tolerant Quantum Gates with Defects in Topological Stabilizer Codes", Physical Review A, vol. 102, Aug. 6, 2020, pp. 1-28.

Gimeno-Segovia, et al., "Relative Multiplexing for Minimising Switching in Linear-Optical Quantum Computing", New Journal of Physics, vol. 19, Available Online at: https://iopscience.iop.org/article/10.1088/1367-2630/aa7095, Jun. 6, 2017, pp. 1-13.

PCT/US2020/038962, "International Preliminary Report on Patentability", Dec. 30, 2021, 9 pages.

PCT/US2020/038962, "International Search Report and Written Opinion", Oct. 13, 2020, 12 pages.

PCT/US2020/038962, "Invitation to Pay Additional Fees and, Where Applicable, Protest Fee", Aug. 3, 2020, 2 pages.

U.S. Appl. No. 17/808,979, Notice of Allowance, Mailed On May 9, 2024, 10 pages.

Gimeno-Segovia, et al., "Relative Multiplexing for Minimizing Switching in Linear-optical Quantum Computing", Available on arxiv.org, Cornell University, vol. 19, Jun. 9, 2017, pp. 1-13.

PCT/US2022/070447, "International Search Report and Written Opinion", Nov. 25, 2022, 7 pages.

EP20826691.6, "Intention to Grant", Apr. 7, 2025, 8 pages.

U.S. Appl. No. 18/108,556, Notice of Allowance, Mailed on Jan. 13, 2025, 16 pages.

U.S. Appl. No. 18/504,059, Non-Final Office Action, Mailed on Jan. 30, 2025, 10 pages.

U.S. Appl. No. 18/504,059, Notice of Allowance, Mailed On Jul. 15, 2025, 8 pages.

AU2023414161, "First Examination Report", Jul. 25, 2025, 3 pages.

Application No. CA3, 143,227, Office Action, Mailed On Jul. 3, 2025, 6 pages.

Application No. JP2023-545900, Notice of Allowance, Mailed On Sep. 9, 2025, 3 pages.

Application No. JP2024-170088, Office Action, Mailed On Aug. 26, 2025, 5 pages.

* cited by examiner

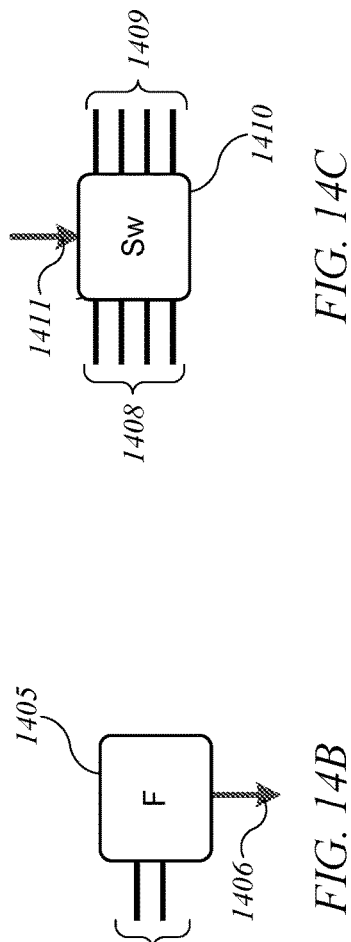
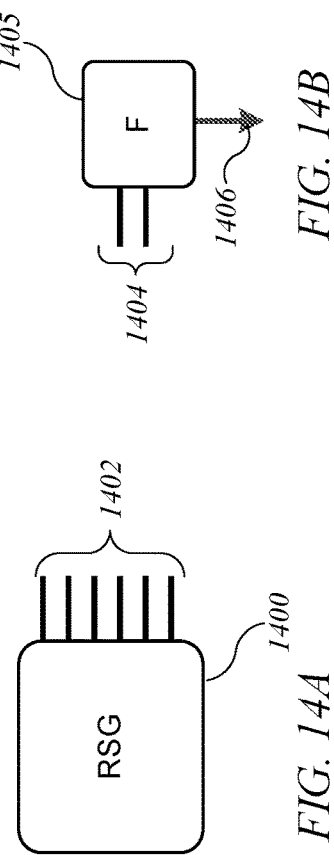
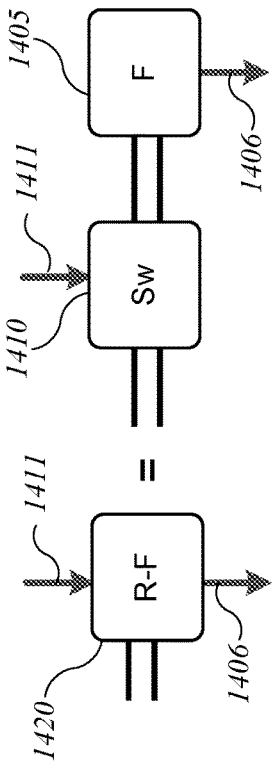
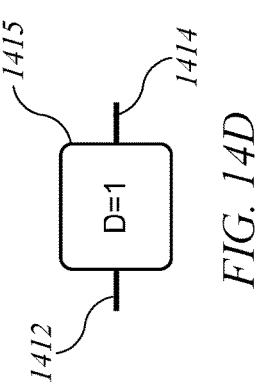
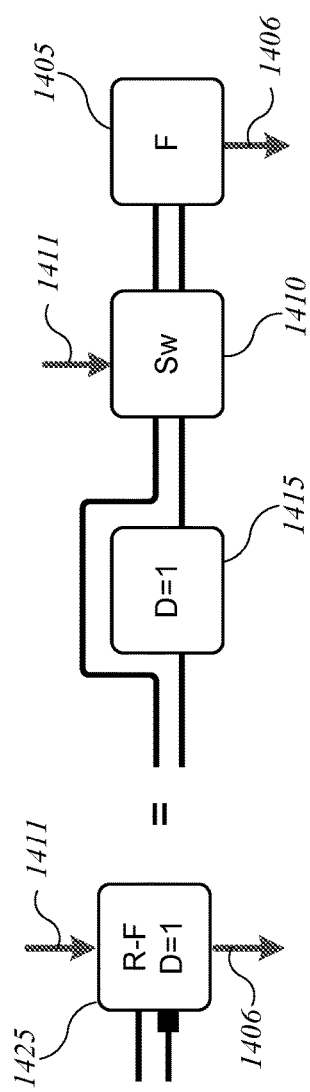
FIG. 14A
FIG. 14B
FIG. 14C
FIG. 14D
FIG. 14E
FIG. 14F

FIG. 23

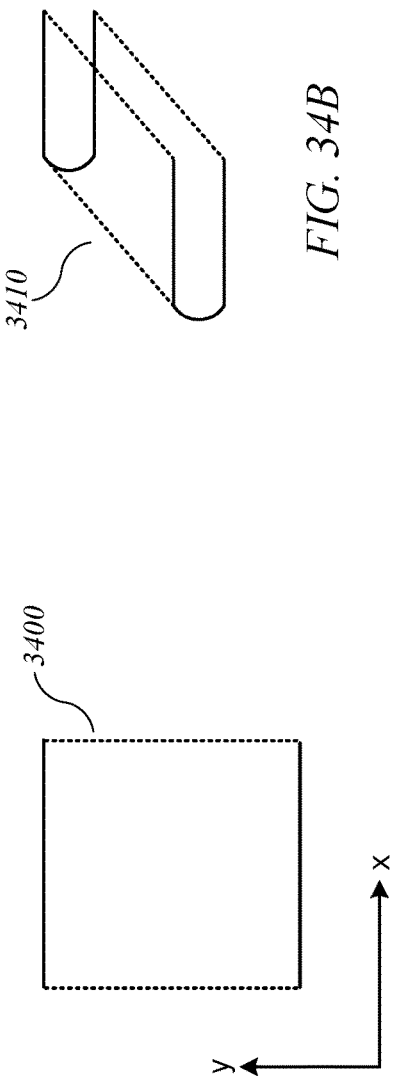
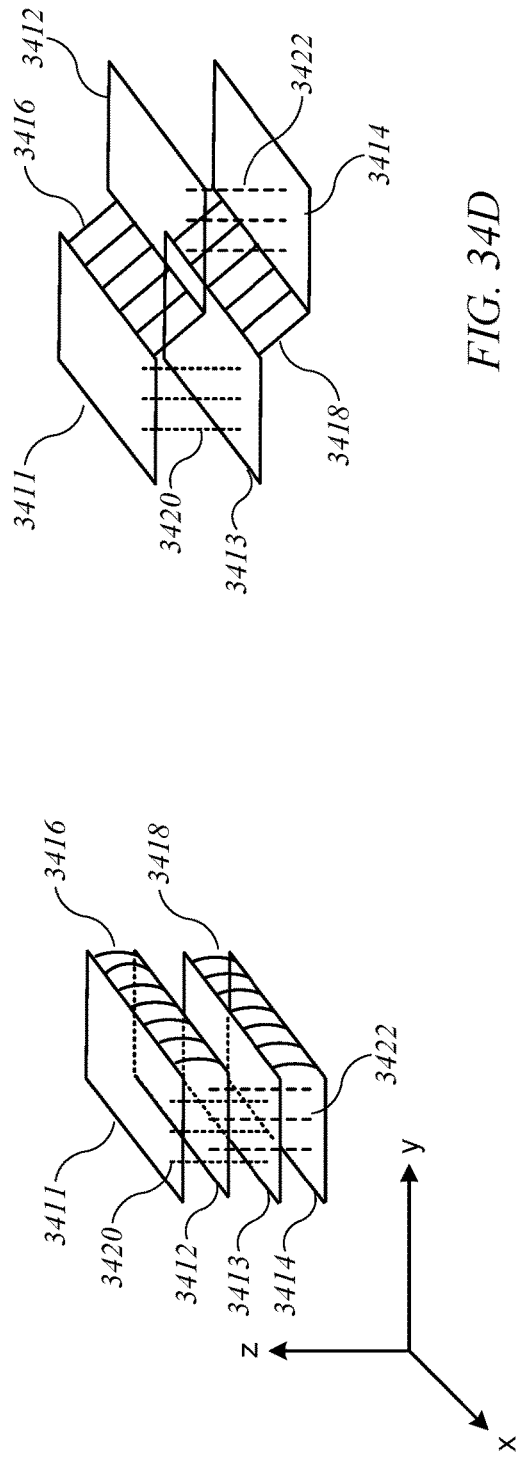

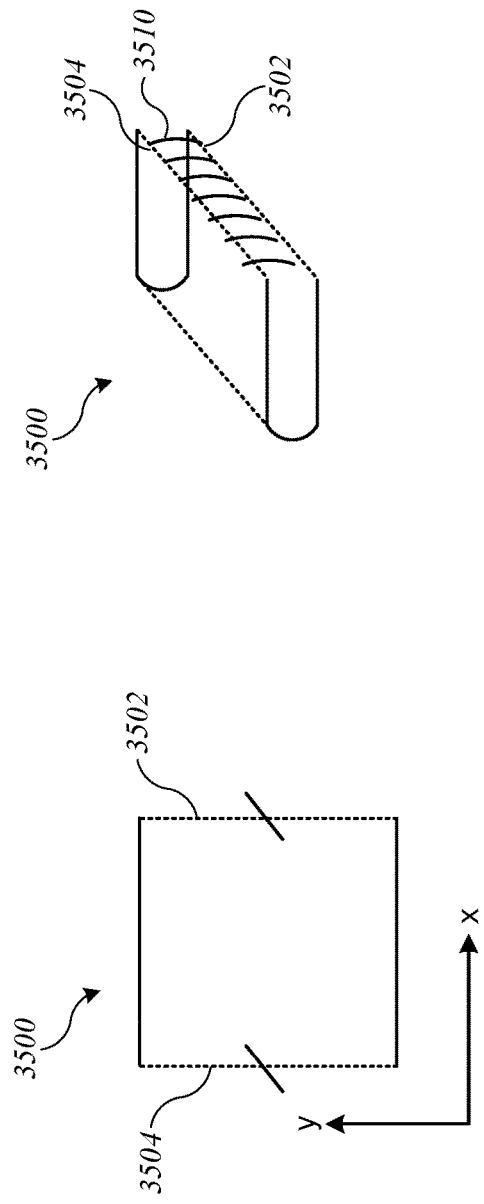
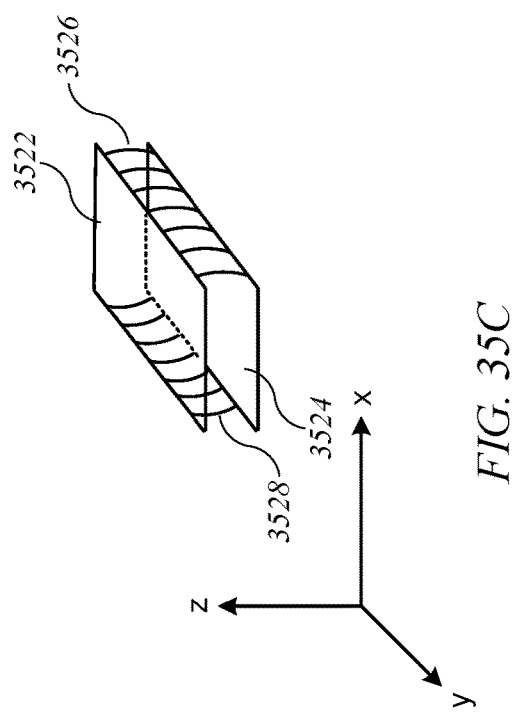
FIG. 35B
FIG. 35C
FIG. 35A

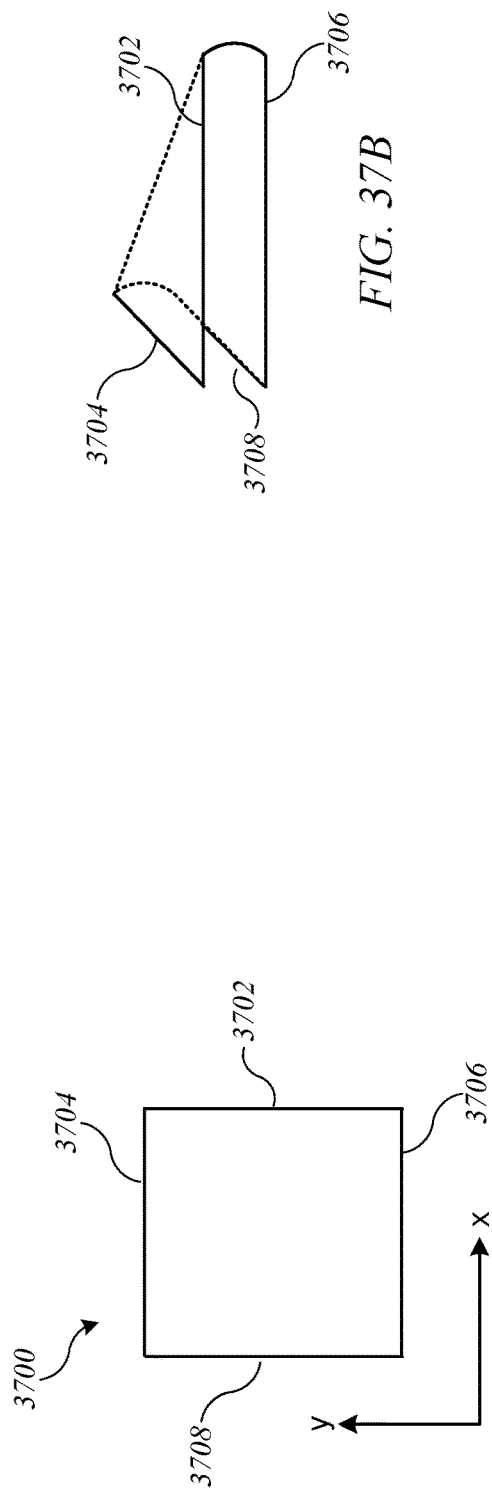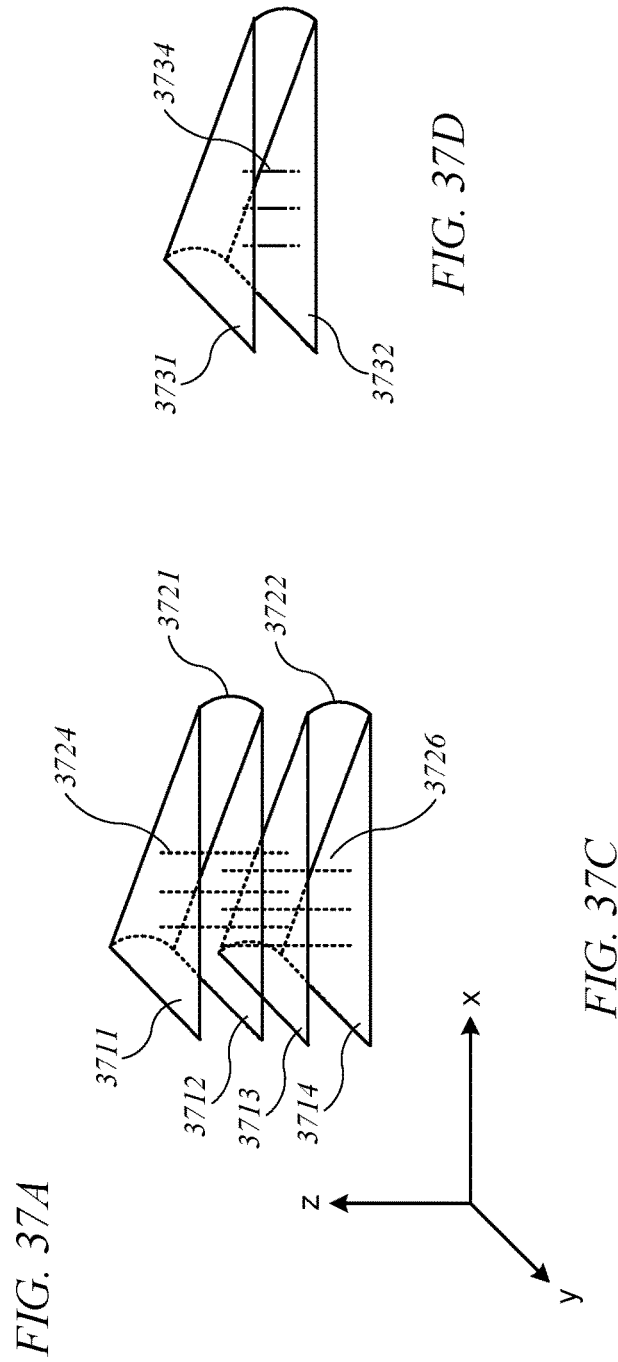

PHOTONIC QUANTUM COMPUTER ARCHITECTURE

CROSS-REFERENCES TO RELATED APPLICATIONS

This application is a continuation of PCT Application No. PCT/US2020/038962, filed Jun. 22, 2020, which claims the benefit of U.S. Provisional Application No. 62/865,058, filed Jun. 21, 2019; U.S. Provisional Application No. 62/926,383, filed Oct. 25, 2019; and U.S. Provisional Application No. 63/006,590, filed Apr. 7, 2020. The disclosures of all of these applications are incorporated by reference herein.

BACKGROUND

Quantum computing is distinguished from "classical" computing by its reliance on structures referred to as "qubits." At the most general level, a qubit is a quantum system that can exist in one of two orthogonal states (denoted as $|0\rangle$) and $|1\rangle$) in the conventional bracket notation) or in a superposition of the two states (e.g., $$\text{(e.g., } \frac{1}{\sqrt{2}}(|0\rangle + |1\rangle)\text{).}$$

By operating on a system (or ensemble) of qubits, a quantum computer can quickly perform certain categories of computations that would require impractical amounts of time in a classical computer.

Practical realization of a quantum computer, however, remains a daunting task. One challenge is the reliable creation and entangling of qubits.

SUMMARY

Certain embodiments described herein relate to a circuit for generating entanglement among qubits using a "rasterized" approach. In some embodiments, the circuit can include a resource state generator, a first timelike fusion circuit, a second timelike fusion circuit, and a third timelike fusion circuit. The resource state generator can have circuitry to generate a first resource state during a first clock cycle, a second resource state during a second clock cycle, a third resource state during a third clock cycle, and a fourth resource state during a fourth clock cycle, wherein each of the first, second, third, and fourth resource states comprises a system of entangled photonic qubits, and wherein the first, second, third, and fourth clock cycles are different clock cycles. The first timelike fusion circuit can be configured to generate a first entangled state between the first and second resource states by performing an entangling measurement operation between a first qubit of the first resource state and a first qubit of the second resource state. The second timelike fusion circuit can be configured to generate a second entangled state between the first entangled state and the third resource state by performing an entangling measurement operation between a second qubit of the first resource state and a first qubit of the third resource state. The third timelike fusion circuit can be configured to generate a third entangled state between the second entangled state and the fourth resource state by performing an entangling measurement operation between a third qubit of the first resource state and a first qubit of the fourth resource state.

In some embodiments, the first and second clock cycles are consecutive clock cycles.

In some embodiments, the resource states define a plurality of layers in an entanglement space, and in some embodiments, the circuit is operable to form a large entangled system of qubits having an entanglement structure comprising a plurality of layers in an entanglement space. Where layers in an entanglement space are defined, the first resource state, the second resource state, and the third resource state can all be associated with a first one of the plurality of layers, while the fourth resource state is associated with a second one of the plurality of layers. For example, each layer in entanglement space can be a two-dimensional layer with a first linear dimension of size L, the first clock cycle and the second clock cycle can be separated by a first time interval, and the first clock cycle and the third clock cycle can be separated by L times the first time interval. Further, each layer in entanglement space can be a two-dimensional layer with a second linear dimension of size L, and the first clock cycle and the fourth clock cycle can separated by $L^2$ times the first time interval.

In some embodiments, the first timelike fusion circuit can include a delay line to delay the first qubit of the first resource state until the second clock cycle, and the second timelike fusion circuit can include a delay line to delay the second qubit of the first resource state until the third clock cycle.

In some embodiments, the entangling measurement operation performed by the first timelike fusion circuit includes a destructive measurement on the first qubit of the first resource state and the first qubit of the second resource state. Similarly, the entangling measurement operation performed by the second timelike fusion circuit can include a destructive measurement on the second qubit of the first resource state and the first qubit of the third resource state.

Some embodiments relate to a circuit for generating entanglement among qubits that includes a number (N) of unit cells forming a network such that each unit cell is coupled to at least two neighboring unit cells. Each unit cell can comprise a resource state generator, a plurality of fusion circuits, a first local delay line, a second local delay line, a third local delay line, a first routing switch, a second routing switch, a third routing switch, a fourth routing switch, a first routing path, and a second routing path. The resource state generator can have photonic circuitry to generate a first local resource state during a first clock cycle, a second local resource state during a second clock cycle, a third local resource state during a third clock cycle, and a fourth local resource state during a fourth clock cycle, wherein each of the first, second, third, and fourth local resource states comprises a system of entangled photonic qubits, and wherein the first, second, and third clock cycles are different clock cycles. The plurality of fusion circuits can include a first local fusion circuit, a second local fusion circuit, a third local fusion circuit, a first networked fusion circuit, and a second networked fusion circuit, with each of the plurality of fusion circuits being configured to perform an entangling measurement operation between two input qubits. The first local delay line can be coupled to a first input of the first local fusion circuit and can have a delay of a first number of clock cycles. The second local delay line can be coupled to a first input of the second local fusion circuit and can have a delay of a second number of clock cycles, the second number being greater than the first number. The third local delay line can be coupled to a first input of the third local fusion circuit and can have a delay of a third number of clock cycles, the third number being greater than the second number. The first routing switch can be configured to selectably direct a first qubit of each resource state to one of the first local delay line of the unit cell or a first input of the first networked fusion circuit of a first neighboring unit cell. The second routing switch can be configured to selectably direct a second qubit of each resource state to one of a second input of the first local fusion circuit or a second input of the first networked fusion circuit of the unit cell. The third routing switch can be configured to selectably direct a third qubit of each resource state to one of the second local delay line of the unit cell or a first input of the second networked fusion circuit of a second neighboring unit cell. The fourth routing switch can be configured to selectably direct a fourth qubit of each resource state to one of a second input of second local fusion circuit or a second input of the second networked fusion circuit of the unit cell. The first routing path can direct a fifth qubit of each resource state to the third local delay line. The second routing path can direct a sixth qubit of each resource state to the third local fusion circuit.

In some embodiments, the resource states define a plurality of layers in an entanglement space, and in some embodiments, the circuit is operable to form a large entangled system of qubits having an entanglement structure comprising a plurality of layers in an entanglement space. Where layers in an entanglement space are defined, the first local resource state, the second local resource state, and the third local resource state can all be associated with a first one of the plurality of layers, while the fourth local resource state is associated with a second one of the plurality of layers. For instance if each layer of the large entangled system of qubits is a two-dimensional layer having a size of $L^2$, each unit cell can generate a number ($P^2$) of resource states for each layer of the large entangled system of qubits, where $P^2=L^2/N$. In these and other embodiments, the first clock cycle and the second clock cycle can be separated by a first time interval while the first and third clock cycles are separated by P times the first time interval. Further, the first clock cycle and the fourth clock cycle are separated by $P^2$ times the first time interval.

In some embodiments, each of the plurality of fusion circuits can be configured such that the entangling measurement operation includes a destructive measurement on both of the input qubits.

Some embodiments relate to a circuit for generating multiple entanglement structures, wherein each entanglement structure is representable as a plurality of layers in an entanglement space The circuit can comprise a layer-generating circuit and a plurality of timelike fusion circuits. The layer-generating circuit can be configured to produce a first layer during a first time period, a second layer during a second time period, and a third layer during a third time period, wherein each of the first, second, and third layers comprises a system of photonic qubits entangled in at least two dimensions in an entanglement space, and wherein the second time period is between the first time period and the third time period. Each of the timelike fusion circuits can be configured to perform an entangling measurement operation between a qubit of the first layer and a qubit of the third layer during a fourth time period subsequent to the third time period.

In some embodiments, the layer-generating circuit is further configured to produce a fourth layer during the fourth time period, and the plurality of timelike fusion circuits is configured to perform entangling measurement operations between one or more qubits of the second layer and one or more qubits of the fourth layer during a fifth time period subsequent to the fourth time period.

In some embodiments, the circuit can also comprise a boundary circuit configured to receive a peripheral qubit corresponding to a boundary of each layer of entangled qubits, wherein the boundary circuit includes a detector configured to detect the peripheral qubit.

In some embodiments, the circuit can also comprise a boundary circuit configured to receive, as a boundary qubit, a peripheral qubit of a resource state at a boundary of each layer of entangled qubits. The boundary circuit can include: a detector configured to detect the boundary qubit; a timelike fusion circuit to fuse two boundary qubits from layers generated during two different time periods; and a switch configurable to route the boundary qubit to either the detector or the timelike fusion circuit. The switch can be dynamically reconfigurable for each time period.

In some embodiments, the entangling measurement operation can include a destructive measurement on the qubits between which the entangling measurement operation is performed.

Some embodiments relate to a method for generating entanglement among qubits. The method can comprise, during each of a plurality of clock cycles: operating a resource state generator to generate a new resource state comprising a system of entangled photonic qubits; determining a position in an entanglement space for the new resource state, wherein the position is defined within a layer of resource states; in the event that the position in the entanglement space does not correspond to an end of a row of the layer, routing a first qubit of the new resource state into a first delay line; in the event that the position in the entanglement space does not correspond to a beginning of a row of the layer, performing an entangling measurement between a second qubit of the new resource state and a qubit output from the first delay line; in the event that the position in the entanglement space does not correspond to a last row of the layer, routing a third qubit of the new resource state into a second delay line having a longer delay than the first delay line; in the event that the position in the entanglement space does not correspond to a first row of the layer, performing an entangling measurement between a fourth qubit of the new resource state and a qubit output from the second delay line; routing a fifth qubit of the new resource state into a third delay line having a longer delay than the second delay line; and performing an entangling measurement between a sixth qubit of the new resource state and a qubit output from the third delay line.

In some embodiments, the method can also comprise, in the event that the position in the entanglement space corresponds to an end of a row of the layer, performing a layer-edge processing operation on the first qubit of the new resource state. The layer-edge processing operation can include, for example, performing a measurement operation on the first qubit of the new resource state or performing an entangling measurement between the first qubit of the new resource state and a qubit associated with an edge of a different layer of the large entangled system.

In some embodiments, the method can also comprise, in the event that the position in the entanglement space corresponds to a beginning of a row of the layer, performing a layer-edge processing operation on the second qubit of the new resource state.

In some embodiments, the method can also comprise, in the event that the position in the entanglement space corresponds to a last of a row of the layer, performing a layer-edge processing operation on the third qubit of the new resource state.

In some embodiments, the method can also comprise, in the event that the position in the entanglement space corresponds to a first of a row of the layer, performing a layer-edge processing operation on the fourth qubit of the new resource state.

In some embodiments, each row of the layer can have dimension L in the entanglement space, and the second delay line can have a delay corresponding to L times a delay of the first delay line. Further, each layer can have dimension $L^2$ in the entanglement space, and the third delay line can have a delay corresponding to $L^2$ times a delay of the first delay line.

In some embodiments, performing each of the entangling measurements can include performing a fusion operation that includes a destructive measurement on one or both of the qubits between which the fusion operation is performed.

Some embodiments relate to a method for generating entanglement among qubits. The method can comprise, during each of a plurality of clock cycles: operating a plurality of resource state generators in a plurality of unit cells such that each unit cell generates a new resource state comprising a system of entangled photonic qubits; and for each unit cell: determining a position in an entanglement space of the new resource state, wherein the position is defined within a contiguous patch of a layer of resource states; in the event that the position in the entanglement space does not correspond to an end of a row of the patch, routing a first qubit of the new resource state into a first delay line; in the event that the position in the entanglement space does not correspond to a beginning of a row of the patch, performing an entangling measurement between a second qubit of the new resource state and a qubit output from the first delay line; in the event that the position in the entanglement space does not correspond to a last row of the patch, routing a third qubit of the new resource state into a second delay line having a longer delay than the first delay line; in the event that the position in the entanglement space does not correspond to a first row of the patch, performing an entangling measurement between a fourth qubit of the new resource state and a qubit output from the second delay line; routing a fifth qubit of the new resource state into a third delay line having a longer delay than the second delay line; and performing an entangling measurement between a sixth qubit of the new resource state and a qubit output from the third delay line.

In some embodiments, the method can also comprise, for at least one of the unit cells, in the event that the position in the entanglement space corresponds to an end of a row of the patch, routing the first qubit of the new resource state to a first neighboring unit cell. The method can also comprise, for at least one other of the unit cells, in the event that the position in the entanglement space corresponds to a beginning of a row of the patch, performing an entangling measurement operation between the second qubit of the new resource state and a networked qubit received from a second neighboring unit cell.

In some embodiments, the method can also comprise, for at least one of the unit cells, in the event that the position in the entanglement space corresponds to a last row of the patch, routing the third qubit of the new resource state to a first neighboring unit cell. The method can also comprise, for at least one of the unit cells, in the event that the position in entanglement space corresponds to a first row of the patch, performing an entangling measurement operation between the fourth qubit of the new resource state and a networked qubit received from a second neighboring unit cell.

In some embodiments, each row of the patch can have a size P in the entanglement space, and the second delay line can have a delay corresponding to P times a delay of the first delay line. In these and other embodiments, each patch can have a size $P^2$ in the entanglement space, and the third delay line can have a delay corresponding to $P^2$ times a delay of the first delay line.

In some embodiments, performing each of the entangling measurements can include performing a fusion operation that includes a destructive measurement on one or both of the qubits between which the fusion operation is performed.

The following detailed description, together with the accompanying drawings, will provide a better understanding of the nature and advantages of the claimed invention.

BRIEF DESCRIPTION OF THE DRAWINGS

FIGS. 14A-14F introduce a set of schematic circuit symbols.

FIG. 23 shows an example of a coordinated order of generation of resource states for different patches for a layer according to some embodiments.

FIGS. 34A-34D show a conceptual illustration of using interleaving to create a three-dimensional entanglement topology having folded layers according to some embodiments.

FIGS. 35A-35C are conceptual illustrations of using folding techniques to create a periodic boundary condition for a layer of an entanglement structure according to some embodiments.

FIGS. 37A-37D are conceptual illustrations of using techniques described herein to create a diagonal folding for a layer of an entanglement structure according to some embodiments.

DETAILED DESCRIPTION

Figure 1:
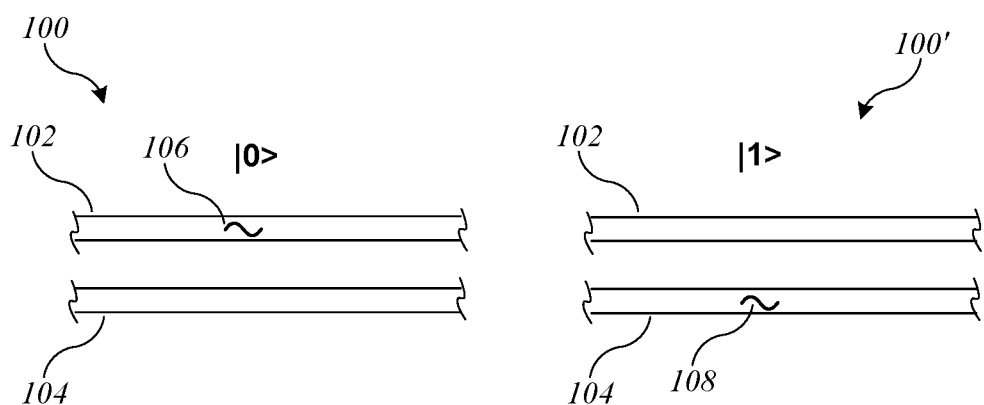
FIG. 1 shows two representations of a portion of a pair of waveguides corresponding to a dual-rail-encoded photonic qubit.

Disclosed herein are examples (also referred to as "embodiments") of systems and methods for creating qubits and superposition states (including entangled states) of qubits based on various physical quantum systems, including photonic systems. Such embodiments can be used, for example, in quantum computing as well as in other contexts (e.g., quantum communication) that exploit quantum entanglement. To facilitate understanding of the disclosure, an overview of relevant concepts and terminology is provided in Section 1. With this context established, Section 2 describes examples of circuits and methods for generating entanglement structures, and Section 3 describes additional examples of interleaving techniques that can be used to generate entanglement structures. In some embodiments, the entanglement generated using techniques described herein can be used to support fault-tolerant quantum computation. Although embodiments are described with specific detail to facilitate understanding, those skilled in the art with access to this disclosure will appreciate that the claimed invention can be practiced without these details.

Further, embodiments are described herein as creating and operating on systems of qubits, where the quantum state space of a qubit can be modeled as a 2-dimensional vector space. Those skilled in the art with access to this disclosure will understand that techniques described herein can be applied to systems of "qudits," where a qudit can be any quantum system having a quantum state space that can be modeled as a (complex) n-dimensional vector space (for any integer n), which can be used to encode n bits of information. For the sake of clarity of description, the term "qubit" is used herein, although in some embodiments the system can also employ quantum information carriers that encode information in a manner that is not necessarily associated with a binary bit, such as a qudit.

1. Overview of Quantum Computing

Quantum computing relies on the dynamics of quantum objects, e.g., photons, electrons, atoms, ions, molecules, nanostructures, and the like, which follow the rules of quantum theory. In quantum theory, the quantum state of a quantum object is described by a set of physical properties, the complete set of which is referred to as a mode. In some embodiments, a mode is defined by specifying the value (or distribution of values) of one or more properties of the quantum object. For example, in the case where the quantum object is a photon, modes can be defined by the frequency of the photon, the position in space of the photon (e.g., which waveguide or superposition of waveguides the photon is propagating within), the associated direction of propagation (e.g., the k-vector for a photon in free space), the polarization state of the photon (e.g., the direction (horizontal or vertical) of the photon's electric and/or magnetic fields), a time window in which the photon is propagating, orbital angular momentum, and the like.

For the case of photons propagating in a waveguide, it is convenient to express the state of the photon as one of a set of discrete spatio-temporal modes. For example, the spatial mode $k_i$ of the photon is determined according to which one of a finite set of discrete waveguides the photon is propagating in, and the temporal mode $t_j$ is determined by which one of a set of discrete time periods (referred to herein as "bins") the photon is present in. The degree of temporal discretization can be provided by a pulsed laser which is responsible for generating the photons. In examples below, spatial modes will be used primarily to avoid complication of the description. However, one of ordinary skill will appreciate that the systems and methods can apply to any type of mode, e.g., temporal modes, polarization modes, and any other mode or set of modes that serves to specify the quantum state. Further, in the description that follows, embodiments will be described that employ photonic waveguides to define the spatial modes of the photon. However, persons of ordinary skill in the art with access to this disclosure will appreciate that other types of mode, e.g., temporal modes, energy states, and the like, can be used without departing from the scope of the present disclosure. In addition, persons of ordinary skill in the art will be able to implement examples using other types of quantum systems, including but not limited to other types of photonic systems.

For quantum systems of multiple indistinguishable particles, rather than describing the quantum state of each particle in the system, it is useful to describe the quantum state of the entire many-body system using the formalism of Fock states (sometimes referred to as the occupation number representation). In the Fock state description, the many-body quantum state is specified by how many particles there are in each mode of the system. For example, a multi-mode, two particle Fock state $|1001\rangle_{1,2,3,4}$ specifies a two-particle quantum state with one particle in mode 1, zero particles in mode 2, zero particles in mode 3, and one particle in mode 4. Again, as introduced above, a mode can be any property of the quantum object. For the case of a photon, any two modes of the electromagnetic field can be used, e.g., one may design the system to use modes that are related to a degree of freedom that can be manipulated passively with linear optics. For example, polarization, spatial degree of freedom, or angular momentum could be used. The four-mode system represented by the two particle Fock state $|1001\rangle_{1,2,3,4}$ can be physically implemented as four distinct waveguides with two of the four waveguides having one photon travelling within them. Other examples of a state of such a many-body quantum system include the four-particle Fock state $|1111\rangle_{1,2,3,4}$ that represents each mode occupied by one particle and the four-particle Fock state $|2200\rangle_{1,2,3,4}$ that represents modes 1 and 2 respectively occupied by two particles and modes 3 and 4 occupied by zero particles. For modes having zero particles present, the term "vacuum mode" is used. For example, for the four-particle Fock state $|2200\rangle_{1,2,3,4}$ modes 3 and 4 are referred to herein as "vacuum modes." Fock states having a single occupied mode can be represented in shorthand using a subscript to identify the occupied mode. For example, $|0010\rangle_{1,2,3,4}$ is equivalent to $|1_3\rangle$.

1.1. Qubits

As used herein, a "qubit" (or quantum bit) is a quantum system with an associated quantum state that can be used to encode information. A quantum state can be used to encode one bit of information if the quantum state space can be modeled as a (complex) two-dimensional vector space, with one dimension in the vector space being mapped to logical value 0 and the other to logical value 1. In contrast to classical bits, a qubit can have a state that is a superposition of logical values 0 and 1. More generally, a "qudit" can be any quantum system having a quantum state space that can be modeled as a (complex) n-dimensional vector space (for any integer n), which can be used to encode n bits of information. For the sake of clarity of description, the term "qubit" is used herein, although in some embodiments the system can also employ quantum information carriers that encode information in a manner that is not necessarily associated with a binary bit, such as a qudit. Qubits (or qudits) can be implemented in a variety of quantum systems. Examples of qubits include: polarization states of photons; presence of photons in waveguides; or energy states of atoms, ions, nuclei, or photons. Other examples include other engineered quantum systems such as flux qubits, phase qubits, or charge qubits (e.g., formed from a superconducting Josephson junction); topological qubits (e.g., Majorana fermions); or spin qubits formed from vacancy centers (e.g., nitrogen vacancies in diamond).

A qubit can be "dual-rail encoded" such that the logical value of the qubit is encoded by occupation of one of two modes of the quantum system. For example, the logical 0 and 1 values can be encoded as follows:

$$|0\rangle_L = |10\rangle_{1,2} \tag{1}$$

$$|1\rangle_L = |10\rangle_{1,2} \tag{2}$$

where the subscript "L" indicates that the ket represents a logical state (e.g., a qubit value) and, as before, the notation $|ij\rangle_{1,2}$ on the right-hand side of the equations above indicates that there are i particles in a first mode and j particles in a second mode, respectively (e.g., where i and j are integers). In this notation, a two-qubit system having a logical state $|0\rangle|1\rangle_L$ (representing a state of two qubits, the first qubit being in a '0' logical state and the second qubit being in a '1' logical state) may be represented using occupancy across four modes by $|1001\rangle_{1,2,3,4}$ (e.g., in a photonic system, one photon in a first waveguide, zero photons in a second waveguide, zero photons in a third waveguide, and one photon in a fourth waveguide). In some instances throughout this disclosure, the various subscripts are omitted to avoid unnecessary mathematical clutter.

1.2. Entangled States

Many of the advantages of quantum computing relative to "classical" computing (e.g., conventional digital computers using binary logic) stem from the ability to create entangled states of multi-qubit systems. In mathematical terms, a state $|\psi\rangle$ of n quantum objects is a separable state if $|\psi\rangle = |\psi_1\rangle \otimes \ldots \otimes |\psi_n\rangle$, and an entangled state is a state that is not separable. One example is a Bell state, which loosely speaking is a type of maximally entangled state for a two-qubit system, and qubits in a Bell state may be referred to as a Bell pair. For example, for qubits encoded by single photons in pairs of modes (a dual-rail encoding), examples of Bell states include:

$$|\Phi^+\rangle = \frac{|0\rangle_L|0\rangle_L + |1\rangle_L|1\rangle_L}{\sqrt{2}} = \frac{|10\rangle|10\rangle + |01\rangle|01\rangle}{\sqrt{2}} \tag{3}$$

$$|\Phi^-\rangle = \frac{|0\rangle_L|0\rangle_L - |1\rangle_L|1\rangle_L}{\sqrt{2}} = \frac{|10\rangle|10\rangle - |01\rangle|01\rangle}{\sqrt{2}} \tag{4}$$

$$|\Psi^+\rangle = \frac{|0\rangle_L|1\rangle_L + |1\rangle_L|0\rangle_L}{\sqrt{2}} = \frac{|10\rangle|01\rangle + |01\rangle|10\rangle}{\sqrt{2}} \tag{5}$$

$$|\Psi^-\rangle = \frac{|0\rangle_L|1\rangle_L - |1\rangle_L|0\rangle_L}{\sqrt{2}} = \frac{|10\rangle|01\rangle - |01\rangle|10\rangle}{\sqrt{2}} \tag{6}$$

More generally, an n-qubit Greenberger-Horne-Zeilinger (GHZ) state (or "n-GHZ state") is an entangled quantum state of n qubits. For a given orthonormal logical basis, an n-GHZ state is a quantum superposition of all qubits being in a first basis state superposed with all qubits being in a second basis state:

$$|GHZ\rangle = \frac{|0\rangle^{\otimes M} + |1\rangle^{\otimes M}}{\sqrt{2}} \quad (7)$$

where the kets above refer to the logical basis. For example, for qubits encoded by single photons in pairs of modes (a dual-rail encoding), a 3-GHZ state can be written:

$$|GHZ\rangle = \frac{|0\rangle_L|0\rangle_L|0\rangle_L - |1\rangle_L|1\rangle_L|1\rangle_L}{\sqrt{2}} = \quad (8)$$

$$\frac{|10\rangle|10\rangle|10\rangle + |01\rangle|01\rangle|01\rangle}{\sqrt{2}}$$

where the kets above refer to photon occupation number in six respective modes (with mode subscripts omitted).

1.3. Physical Implementations

Qubits (and operations on qubits) can be implemented using a variety of physical systems. In some examples described herein, qubits are provided in an integrated photonic system employing waveguides, beam splitters, photonic switches, and single photon detectors, and the modes that can be occupied by photons are spatiotemporal modes that correspond to presence of a photon in a waveguide. Modes can be coupled using mode couplers, e.g., optical beam splitters, to implement transformation operations, and measurement operations can be implemented by coupling single-photon detectors to specific waveguides. One of ordinary skill in the art with access to this disclosure will appreciate that modes defined by any appropriate set of degrees of freedom, e.g., polarization modes, temporal modes, and the like, can be used without departing from the scope of the present disclosure. For instance, for modes that only differ in polarization (e.g., horizontal (H) and vertical (V)), a mode coupler can be any optical element that coherently rotates polarization, e.g., a birefringent material such as a waveplate. For other systems such as ion trap systems or neutral atom systems, a mode coupler can be any physical mechanism that can couple two modes, e.g., a pulsed electromagnetic field that is tuned to couple two internal states of the atom/ion.

In some embodiments of a photonic quantum computing system using dual-rail encoding, a qubit can be implemented using a pair of waveguides. FIG. 1 shows two representations (100, 100') of a portion of a pair of waveguides 102, 104 that can be used to provide a dual-rail-encoded photonic qubit. At 100, a photon 106 is in waveguide 102 and no photon is in waveguide 104 (also referred to as a vacuum mode); in some embodiments, this corresponds to the $|0\rangle_L$ state of a photonic qubit. At 100', a photon 108 is in waveguide 104, and no photon is in waveguide 102; in some embodiments this corresponds to the $|1\rangle_L$ state of the photonic qubit. To prepare a photonic qubit in a known logical state, a photon source (not shown) can be coupled to one end of one of the waveguides. The photon source can be operated to emit a single photon into the waveguide to which it is coupled, thereby preparing a photonic qubit in a known state. Photons travel through the waveguides, and by periodically operating the photon source, a quantum system having qubits whose logical states map to different temporal modes of the photonic system can be created in the same pair of waveguides. In addition, by providing multiple pairs of waveguides, a quantum system having qubits whose logical states correspond to different spatiotemporal modes can be created. It should be understood that the waveguides in such a system need not have any particular spatial relationship to each other. For instance, they can be but need not be arranged in parallel.

Occupied modes can be created by using a photon source to generate a photon that then propagates in the desired waveguide. A photon source can be, for instance, a resonator-based source that emits photon pairs, also referred to as a heralded single photon source. In one example of such a source, the source is driven by a pump, e.g., a light pulse, that is coupled into a system of optical resonators that, through a nonlinear optical process (e.g., spontaneous four wave mixing (SFWM), spontaneous parametric down-conversion (SPDC), second harmonic generation, or the like), can generate a pair of photons. Many different types of photon sources can be employed. Examples of photon pair sources can include a microring-based spontaneous four wave mixing (SPFW) heralded photon source (HPS). However, the precise type of photon source used is not critical and any type of nonlinear source, employing any process, such as SPFW, SPDC, or any other process can be used. Other classes of sources that do not necessarily require a nonlinear material can also be employed, such as those that employ atomic and/or artificial atomic systems, e.g., quantum dot sources, color centers in crystals, and the like. In some cases, sources may or may not be coupled to photonic cavities, e.g., as can be the case for artificial atomic systems such as quantum dots coupled to cavities. Other types of photon sources also exist for SPWM and SPDC, such as optomechanical systems and the like.

In such cases, operation of the photon source may be non-deterministic (also sometimes referred to as "stochastic") such that a given pump pulse may or may not produce a photon pair. In some embodiments, coherent spatial and/or temporal multiplexing of several non-deterministic sources (referred to herein as "active" multiplexing) can be used to allow the probability of having one mode become occupied during a given cycle to approach 1. One of ordinary skill will appreciate that many different active multiplexing architectures that incorporate spatial and/or temporal multiplexing are possible. For instance, active multiplexing schemes that employ log-tree, generalized Mach-Zehnder interferometers, multimode interferometers, chained sources, chained sources with dump-the-pump schemes, asymmetric multi-crystal single photon sources, or any other type of active multiplexing architecture can be used. In some embodiments, the photon source can employ an active multiplexing scheme with quantum feedback control and the like. In some embodiments described below, use of multirail encoding allows the probability of a band having one mode become occupied during a given pulse cycle to approach 1 without active multiplexing.

Measurement operations can be implemented by coupling a waveguide to a single-photon detector that generates a classical signal (e.g., a digital logic signal) indicating that a photon has been detected by the detector. Any type of photodetector that has sensitivity to single photons can be used. In some embodiments, detection of a photon (e.g., at the output end of a waveguide) indicates an occupied mode while absence of a detected photon can indicate an unoccupied mode.

Some embodiments described below relate to physical implementations of unitary transform operations that couple modes of a quantum system, which can be understood as transforming the quantum state of the system. For instance, if the initial state of the quantum system (prior to mode coupling) is one in which one mode is occupied with probability 1 and another mode is unoccupied with probability 1 (e.g., a state $|10\rangle$ in the Fock notation introduced above), mode coupling can result in a state in which both modes have a nonzero probability of being occupied, e.g., a state $\alpha_1|10\rangle+\alpha_2|01\rangle$, where $|\alpha_1|^2+|\alpha_2|^2=1$. In some embodiments, operations of this kind can be implemented by using beam splitters to couple modes together and variable phase shifters to apply phase shifts to one or more modes. The amplitudes $\alpha_1$ and $\alpha_2$ depend on the reflectivity (or transmissivity) of the beam splitters and on any phase shifts that are introduced.

Figure 2A:
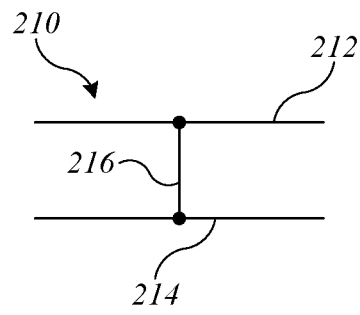
FIG. 2A shows a schematic diagram for coupling of two modes.

FIG. 2A shows a schematic diagram 210 (also referred to as a circuit diagram or circuit notation) for coupling of two modes. The modes are drawn as horizontal lines 212, 214, and the mode coupler 216 is indicated by a vertical line that is terminated with nodes (solid dots) to identify the modes being coupled. In the more specific language of linear quantum optics, the mode coupler 216 shown in FIG. 2A represents a 50/50 beam splitter that implements a transfer matrix:

$$T = \frac{1}{\sqrt{2}}\begin{pmatrix} 1 & i \\ i & 1 \end{pmatrix}, \tag{9}$$

where T defines the linear map for the photon creation operators on two modes. (In certain contexts, transfer matrix T can be understood as implementing a first-order imaginary Hadamard transform.) By convention the first column of the transfer matrix corresponds to creation operators on the top mode (referred to herein as mode 1, labeled as horizontal line 212), and the second column corresponds to creation operators on the second mode (referred to herein as mode 2, labeled as horizontal line 214), and so on if the system includes more than two modes. More explicitly, the mapping can be written as:

$$\begin{pmatrix} a_1^\dagger \\ a_2^\dagger \end{pmatrix}_{input} \mapsto \frac{1}{\sqrt{2}}\begin{pmatrix} 1 & -i \\ -i & 1 \end{pmatrix}\begin{pmatrix} a_1^\dagger \\ a_2^\dagger \end{pmatrix}_{output}, \tag{10}$$

where subscripts on the creation operators indicate the mode that is operated on, the subscripts input and output identify the form of the creation operators before and after the beam splitter, respectively and where:

$$\alpha_i|n_i,n_j\rangle = \sqrt{n_i}|n_i-1,n_j\rangle$$

$$\alpha_j|n_i,n_j\rangle = \sqrt{n_j}|n_i,n_j-1\rangle$$

$$\alpha_j^\dagger|n_i,n_j\rangle = \sqrt{n_j+1}|n_i,n_j+1\rangle \tag{11}$$

For example, the application of the mode coupler shown in FIG. 2A leads to the following mappings:

$$a_{1_{input}}^\dagger \mapsto \frac{1}{\sqrt{2}}(a_{1_{output}}^\dagger - i a_{2_{output}}^\dagger) \tag{12}$$

$$a_{2_{input}}^\dagger \mapsto \frac{1}{\sqrt{2}}(-i a_{1_{output}}^\dagger + a_{2_{output}}^\dagger)$$

Thus, the action of the mode coupler described by Eq. (9) is to take the input states $|10\rangle$, $|01\rangle$, and $|11\rangle$ to $$|10\rangle \mapsto \frac{|10\rangle - i|01\rangle}{\sqrt{2}} \tag{13}$$

$$|01\rangle \mapsto \frac{-i|10\rangle + |01\rangle}{\sqrt{2}}$$

$$|11\rangle \mapsto \frac{-i}{2}(|20\rangle + |02\rangle)$$

Figure 2B:
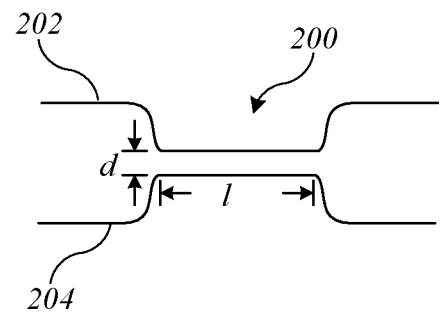
FIG. 2B shows, in schematic form, a physical implementation of mode coupling in a photonic system that can be used in some embodiments.

FIG. 2B shows a physical implementation of a mode coupling that implements the transfer matrix T of Eq. (9) for two photonic modes in accordance with some embodiments. In this example, the mode coupling is implemented using a waveguide beam splitter 200, also sometimes referred to as a directional coupler or mode coupler. Waveguide beam splitter 200 can be realized by bringing two waveguides 202, 204 into close enough proximity that the evanescent field of one waveguide can couple into the other. By adjusting the separation d between waveguides 202, 204 and/or the length l of the coupling region, different couplings between modes can be obtained. In this manner, a waveguide beam splitter 200 can be configured to have a desired transmissivity. For example, the beam splitter can be engineered to have a transmissivity equal to 0.5 (i.e., a 50/50 beam splitter for implementing the specific form of the transfer matrix T introduced above). If other transfer matrices are desired, the reflectivity (or the transmissivity) can be engineered to be greater than 0.6, greater than 0.7, greater than 0.8, or greater than 0.9 without departing from the scope of the present disclosure.

In addition to mode coupling, some unitary transforms may involve phase shifts applied to one or more modes. In some photonic implementations, variable phase-shifters can be implemented in integrated circuits, providing control over the relative phases of the state of a photon spread over multiple modes. Examples of transfer matrices that define such a phase shifts are given by (for applying a +1 and −i phase shift to the second mode, respectively):

$$s = \begin{pmatrix} 1 & 0 \\ 0 & i \end{pmatrix} \tag{14}$$

$$s^\dagger = \begin{pmatrix} 1 & 0 \\ 0 & -i \end{pmatrix}$$

For silica-on-silicon materials some embodiments implement variable phase-shifters using thermo-optical switches. The thermo-optical switches use resistive elements fabricated on the surface of the chip, that via the thermo-optical effect can provide a change of the refractive index n by raising the temperature of the waveguide by an amount of the order of $10^{-5}$K. One of skill in the art with access to the present disclosure will understand that any effect that changes the refractive index of a portion of the waveguide can be used to generate a variable, electrically tunable, phase shift. For example, some embodiments use beam splitters based on any material that supports an electro-optic effect, so-called $\chi^2$ and $\chi^3$ materials such as lithium niobite, BBO, KTP, and the like and even doped semiconductors such as silicon, germanium, and the like.

Figure 3A:
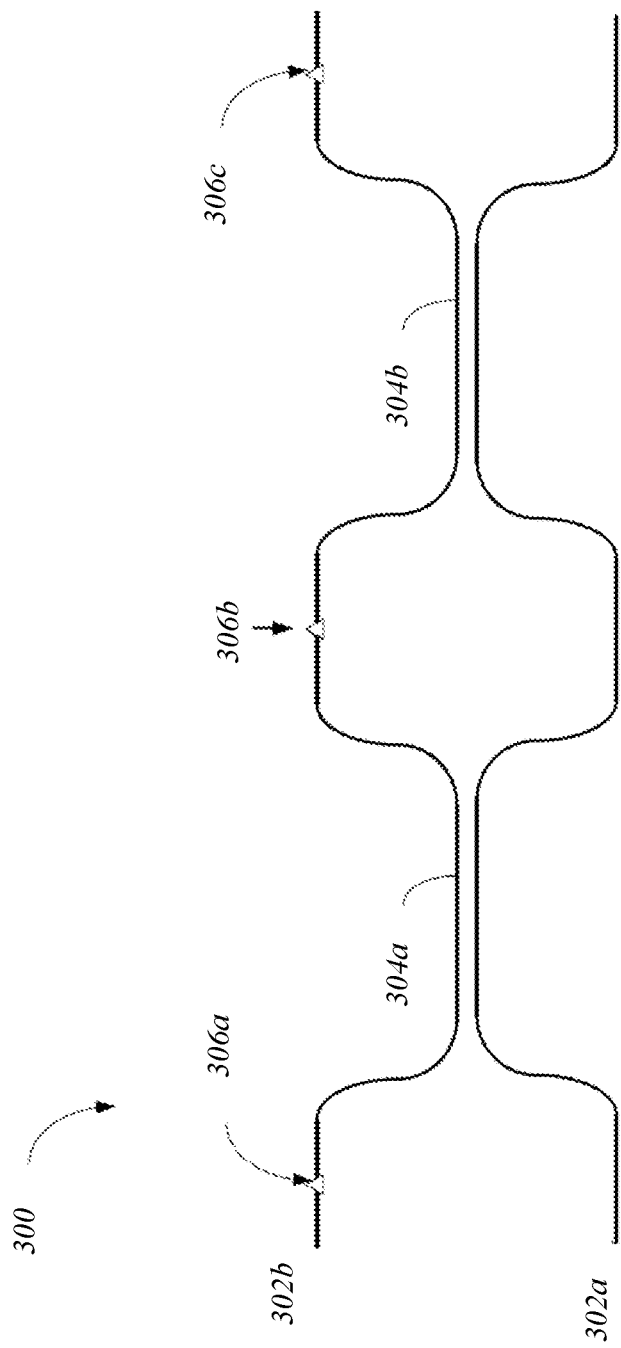
FIGS. 3A and 3B show, in schematic form, examples of physical implementations of a Mach-Zehnder Interferometer (MZI) configuration that can be used in some embodiments.
Figure 3B:
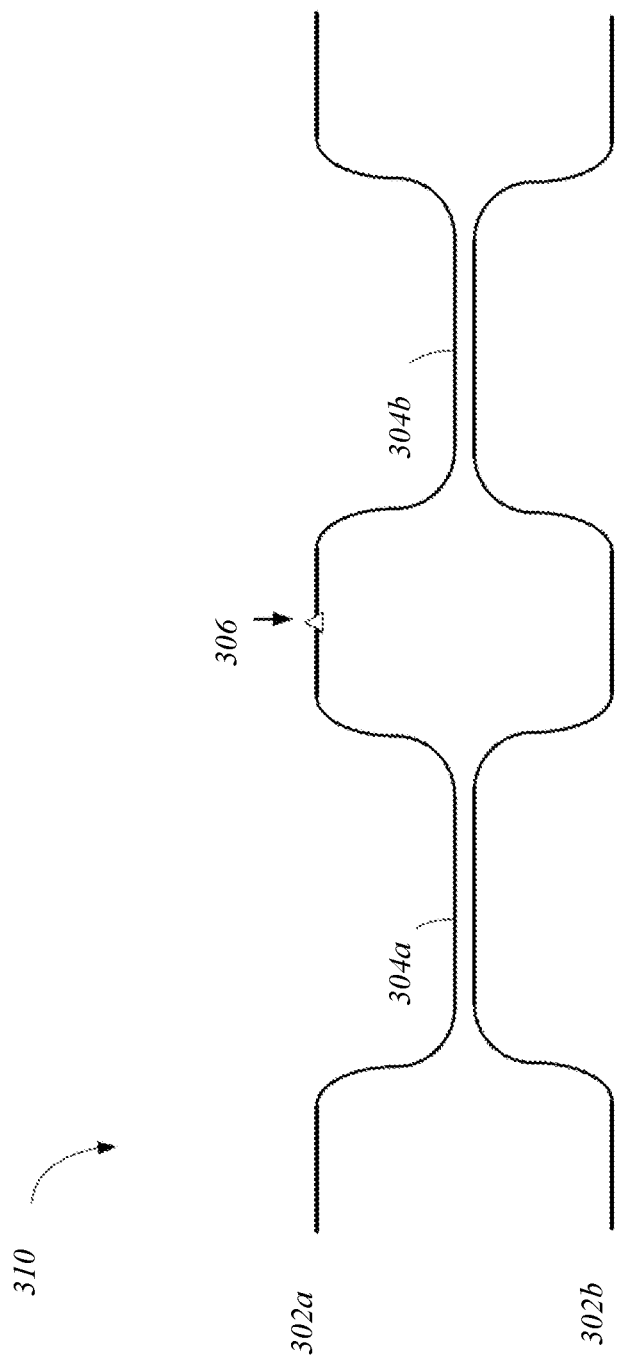

Beam-splitters with variable transmissivity and arbitrary phase relationships between output modes can also be achieved by combining directional couplers and variable phase-shifters in a Mach-Zehnder Interferometer (MZI) configuration 300, e.g., as shown in FIG. 3A. Complete control over the relative phase and amplitude of the two modes 302a, 302b in dual rail encoding can be achieved by varying the phases imparted by phase shifters 306a, 306b, and 306c and the length and proximity of coupling regions 304a and 304b. FIG. 3B shows a slightly simpler example of a MZI 310 that allows for a variable transmissivity between modes 302a, 302b by varying the phase imparted by the phase shifter 306. FIGS. 3A and 3B are examples of how one could implement a mode coupler in a physical device, but any type of mode coupler/beam splitter can be used without departing from the scope of the present disclosure.

Figure 4A:
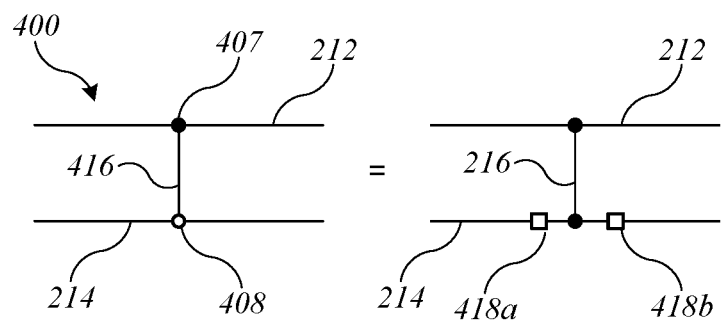
FIG. 4A shows another schematic diagram for coupling of two modes.

In some embodiments, beam splitters and phase shifters can be employed in combination to implement a variety of transfer matrices. For example, FIG. 4A shows, in a schematic form similar to that of FIG. 2A, a mode coupler 400 implementing the following transfer matrix:

$$T_r = \frac{1}{\sqrt{2}}\begin{pmatrix} 1 & 1 \\ 1 & -1 \end{pmatrix}. \tag{15}$$

Thus, mode coupler 400 applies the following mappings:

$$|10\rangle \mapsto \frac{|10\rangle + |01\rangle}{\sqrt{2}} \tag{16}$$

$$|01\rangle \mapsto \frac{|10\rangle - |01\rangle}{\sqrt{2}}$$

$$|11\rangle \mapsto \frac{1}{2}(|20\rangle + |02\rangle).$$

Figure 4B:
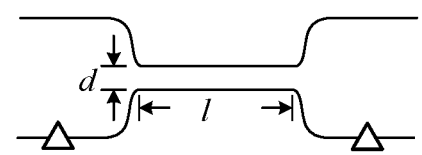
FIG. 4B shows, in schematic form, a physical implementation of the mode coupling of FIG. 4A in a photonic system that can be used in some embodiments.

The transfer matrix $T_r$ of Eq. (15) is related to the transfer matrix T of Eq. (9) by a phase shift on the second mode. This is schematically illustrated in FIG. 4A by the closed node 407 where mode coupler 416 couples to the first mode (line 212) and open node 408 where mode coupler 416 couples to the second mode (line 214). More specifically, $T_r$=sTs, and, as shown at the right-hand side of FIG. 4A, mode coupler 416 can be implemented using mode coupler 216 (as described above), with a preceding and following phase shift (denoted by open squares 418a, 418b). Thus, the transfer matrix $T_r$ can be implemented by the physical beam splitter shown in FIG. 4B, where the open triangles represent +i phase shifters.

Figure 5:
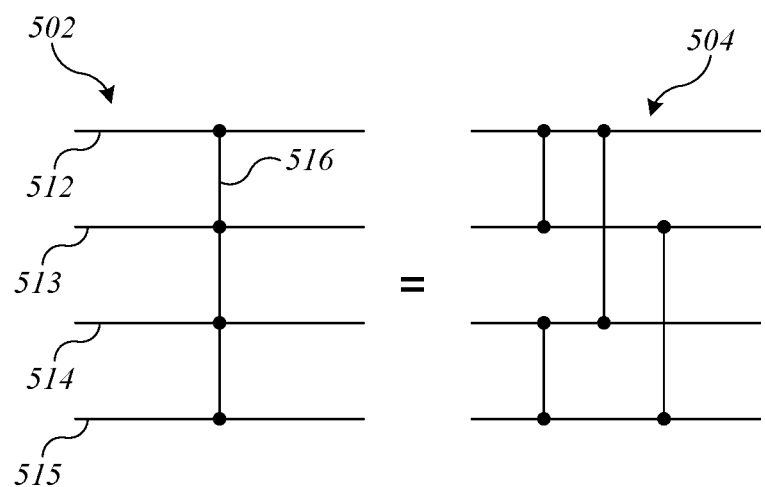
FIG. 5 shows a four-mode coupling scheme that implements a "spreader," or "mode-information erasure," transformation on four modes in accordance with some embodiments.

Similarly, networks of mode couplers and phase shifters can be used to implement couplings among more than two modes. For example, FIG. 5 shows a four-mode coupling scheme that implements a "spreader," or "mode-information erasure," transformation on four modes, i.e., it takes a photon in any one of the input modes and delocalizes the photon amongst each of the four output modes such that the photon has equal probability of being detected in any one of the four output modes. (The well-known Hadamard transformation is one example of a spreader transformation.) As in FIG. 2A, the horizontal lines 512-515 correspond to modes, and the mode coupling is indicated by a vertical line 516 with nodes (dots) to identify the modes being coupled. In this case, four modes are coupled. Circuit notation 502 is an equivalent representation to circuit diagram 504, which is a network of first-order mode couplings. More generally, where a higher-order mode coupling can be implemented as a network of first-order mode couplings, a circuit notation similar to notation 502 (with an appropriate number of modes) may be used.

Figure 6:
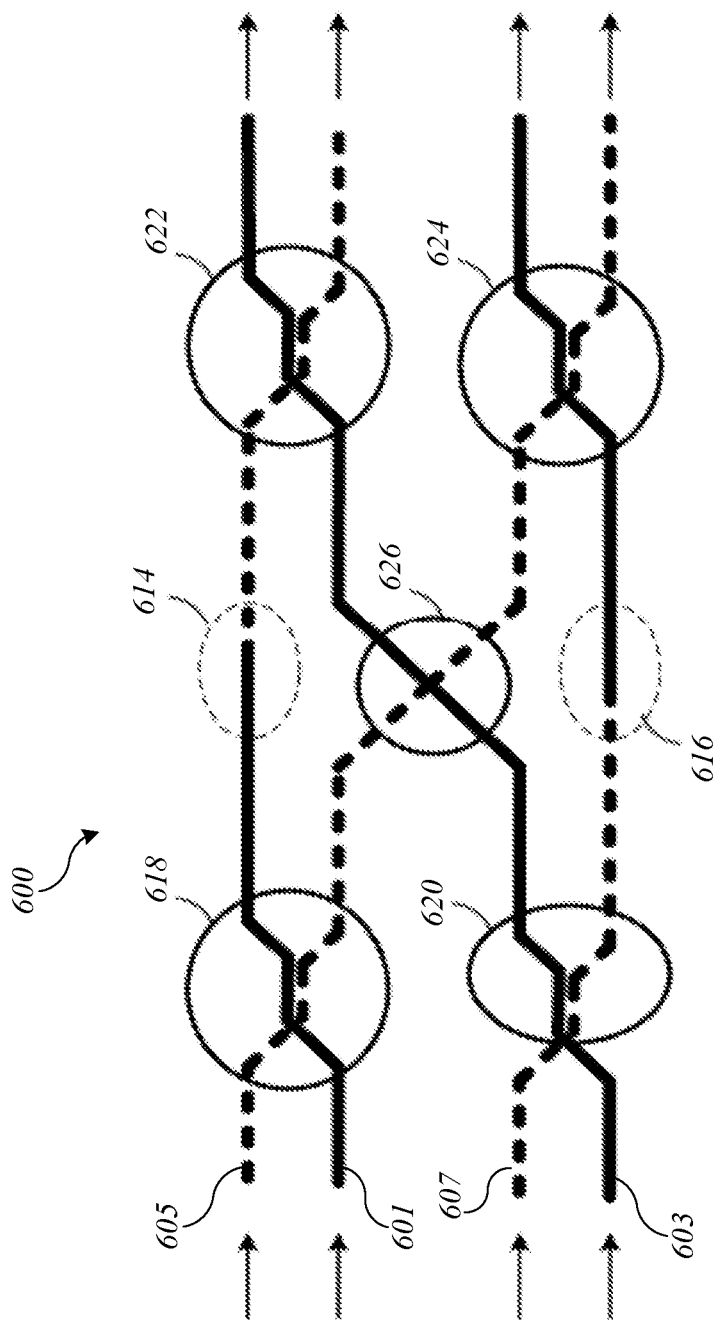
FIG. 6 illustrates an example optical device that can implement the four-mode mode-spreading transform shown schematically in FIG. 5 in accordance with some embodiments.

FIG. 6 illustrates an example optical device 600 that can implement the four-mode mode-spreading transform shown schematically in FIG. 5 in accordance with some embodiments. Optical device 600 includes a first set of optical waveguides 601, 603 formed in a first layer of material (represented by solid lines in FIG. 6) and a second set of optical waveguides 605, 607 formed in a second layer of material that is distinct and separate from the first layer of material (represented by dashed lines in FIG. 6). The second layer of material and the first layer of material are located at different heights on a substrate. One of ordinary skill will appreciate that an interferometer such as that shown in FIG. 6 could be implemented in a single layer if appropriate low loss waveguide crossing were employed.

At least one optical waveguide 601, 603 of the first set of optical waveguides is coupled with an optical waveguide 605, 607 of the second set of optical waveguides with any type of suitable optical coupler, e.g., the directional couplers described herein (e.g., the optical couplers shown in FIGS. 2B, 3A, 3B). For example, the optical device shown in FIG. 6 includes four optical couplers 618, 620, 622, and 624. Each optical coupler can have a coupling region in which two waveguides propagate in parallel. Although the two waveguides are illustrated in FIG. 6 as being offset from each other in the coupling region, the two waveguides may be positioned directly above and below each other in the coupling region without offset. In some embodiments, one or more of the optical couplers 618, 620, 622, and 624 are configured to have a coupling efficiency of approximately 50% between the two waveguides (e.g., a coupling efficiency between 49% and 51%, a coupling efficiency between 49.9% and 50.1%, a coupling efficiency between 49.99% and 50.01%, and a coupling efficiency of 50%, etc.). For example, the length of the two waveguides, the refractive indices of the two waveguides, the widths and heights of the two waveguides, the refractive index of the material located between two waveguides, and the distance between the two waveguides are selected to provide the coupling efficiency of 50% between the two waveguides. This allows the optical coupler to operate like a 50/50 beam splitter.

In addition, the optical device shown in FIG. 6 can include two inter-layer optical couplers 614 and 616. Optical coupler 614 allows transfer of light propagating in a waveguide on the first layer of material to a waveguide on the second layer of material, and optical coupler 616 allows transfer of light propagating in a waveguide on the second layer of material to a waveguide on the first layer of material. The optical couplers 614 and 616 allow optical waveguides located in at least two different layers to be used in a multi-channel optical coupler, which, in turn, enables a compact multi-channel optical coupler.

Furthermore, the optical device shown in FIG. 6 includes a non-coupling waveguide crossing region 626. In some implementations, the two waveguides (603 and 605 in this example) cross each other without having a parallel coupling region present at the crossing in the non-coupling waveguide crossing region 626 (e.g., the waveguides can be two straight waveguides that cross each other at a nearly 90-degree angle).

Those skilled in the art will understand that the foregoing examples are illustrative and that photonic circuits using beam splitters and/or phase shifters can be used to implement many different transfer matrices, including transfer matrices for real and imaginary Hadamard transforms of any order, discrete Fourier transforms, and the like. One class of photonic circuits, referred to herein as "spreader" or "mode-information erasure (MIE)" circuits, has the property that if the input is a single photon localized in one input mode, the circuit delocalizes the photon amongst each of a number of output modes such that the photon has equal probability of being detected in any one of the output modes. Examples of spreader or MIE circuits include circuits implementing Hadamard transfer matrices. (It is to be understood that spreader or MIE circuits may receive an input that is not a single photon localized in one input mode, and the behavior of the circuit in such cases depends on the particular transfer matrix implemented.) In other instances, photonic circuits can implement other transfer matrices, including transfer matrices that, for a single photon in one input mode, provide unequal probability of detecting the photon in different output modes.

Figure 7:
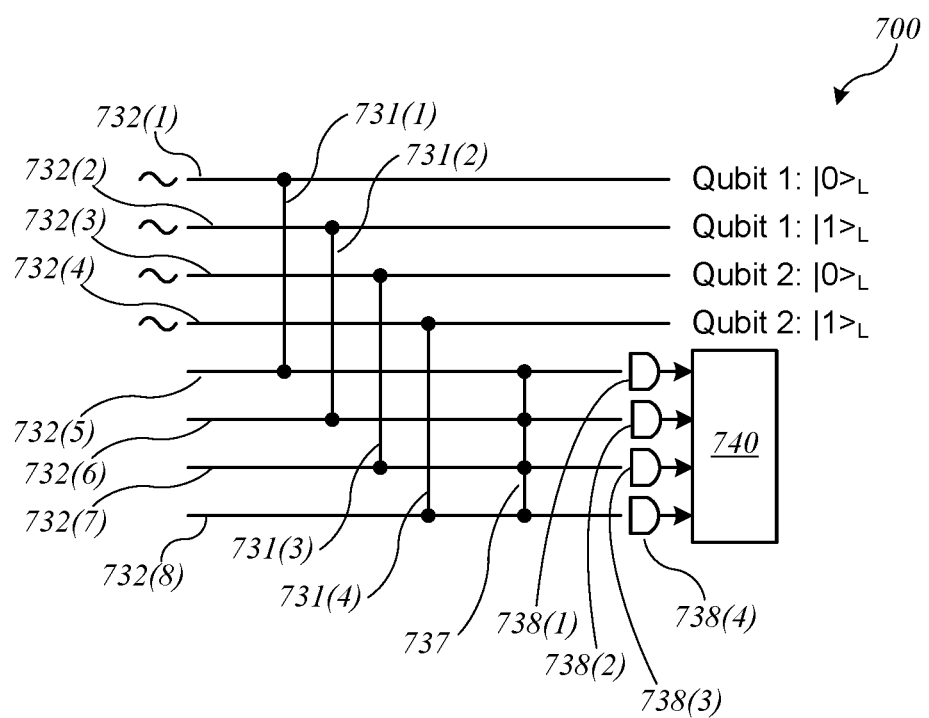
FIG. 7 shows a circuit diagram for a dual-rail-encoded Bell state generator that can be used in some embodiments.

In some embodiments, entangled states of multiple photonic qubits can be created by coupling modes of two (or more) qubits and performing measurements on other modes. By way of example, FIG. 7 shows a circuit diagram for a Bell state generator 700 that can be used in some dual-rail-encoded photonic embodiments. In this example, modes 732(1)-732(4) are initially each occupied by a photon (indicated by a wavy line); modes 732(5)-732(8) are initially vacuum modes. (Those skilled in the art will appreciate that other combinations of occupied and unoccupied modes can be used.)

A first-order mode coupling (e.g., implementing transfer matrix T of Eq. (9)) is performed on pairs of occupied and unoccupied modes as shown by mode couplers 731(1)-731(4). Thereafter, a mode-information erasure coupling (e.g., implementing a four-mode mode spreading transform as shown in FIG. 5) is performed on four of the modes (modes 732(5)-732(8)), as shown by mode coupler 737. Modes 732(5)-732(8) act as "heralding" modes that are measured and used to determine whether a Bell state was successfully generated on the other four modes 732(1)-732(4). For instance, detectors 738(1)-738(4) can be coupled to the modes 732(5)-732(8) after second-order mode coupler 737. Each detector 738(1)-738(4) can output a classical data signal (e.g., a voltage level on a conductor) indicating whether it detected a photon (or the number of photons detected). These outputs can be coupled to classical decision logic circuit 740, which determines whether a Bell state is present on the other four modes 732(1)-732(4). For example, decision logic circuit 740 can be configured such that a Bell state is confirmed (also referred to as "success" of the Bell state generator) if and only if a single photon was detected by each of exactly two of detectors 738(1)-738(4). Modes 732(1)-732(4) can be mapped to the logical states of two qubits (Qubit 1 and Qubit 2), as indicated in FIG. 7. Specifically, in this example, the logical state of Qubit 1 is based on occupancy of modes 732(1) and 732(2), and the logical state of Qubit 2 is based on occupancy of modes 732(3) and 732(4). It should be noted that the operation of Bell state generator 700 can be non-deterministic; that is, inputting four photons as shown does not guarantee that a Bell state will be created on modes 732(1)-732(4). In one implementation, the probability of success is 4/32.

In some embodiments, it is desirable to form cluster states of multiple entangled qubits (typically 3 or more qubits, although the Bell state can be understood as a cluster state of two qubits). One technique for forming larger entangled systems is through the use of an entangling measurement, which is a projective measurement that can be employed to create entanglement between systems of qubits. As used herein, "fusion" (or "a fusion operation" or "fusing") refers to a two-qubit entangling measurement. A "fusion gate" is a structure that receives two input qubits, each of which is typically part of an entangled system. The fusion gate performs a projective measurement operation on the input qubits that produces either one ("type I fusion") or zero ("type II fusion") output qubits in a manner such that the initial two entangled systems are fused into a single entangled system. Fusion gates are specific examples of a general class of two-qubit entangling measurements and are particularly suited for photonic architectures. Examples of type I and type II fusion gates will now be described.

Figure 8A:
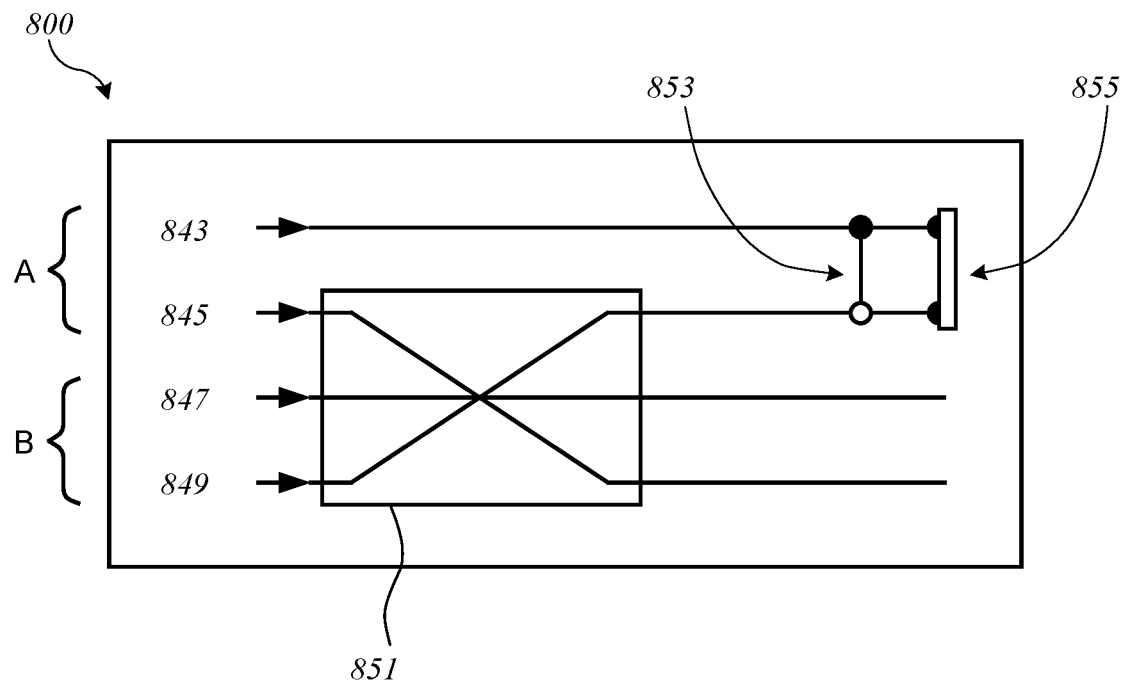
FIG. 8A shows a circuit diagram for a dual-rail-encoded type I fusion gate that can be used in some embodiments.

FIG. 8A shows a circuit diagram illustrating a type I fusion gate 800 in accordance with some embodiments. The diagram shown in FIG. 8A is schematic with each horizontal line representing a mode of a quantum system, e.g., a photon. In a dual-rail encoding, each pair of modes represents a qubit. In a photonic implementation of the gate the modes in diagrams such as that shown in FIG. 8A can be physically realized using single photons in photonic waveguides. Most generally, a type I fusion gate like that shown in FIG. 8A takes qubit A (physically realized, e.g., by photon modes 843 and 845) and qubit B (physically realized, e.g., by photon modes 847 and 849) as input and outputs a single "fused" qubit that inherits the entanglement with other qubits that were previously entangled with either (or both) of input qubit A or input qubit B.

Figure 8B:
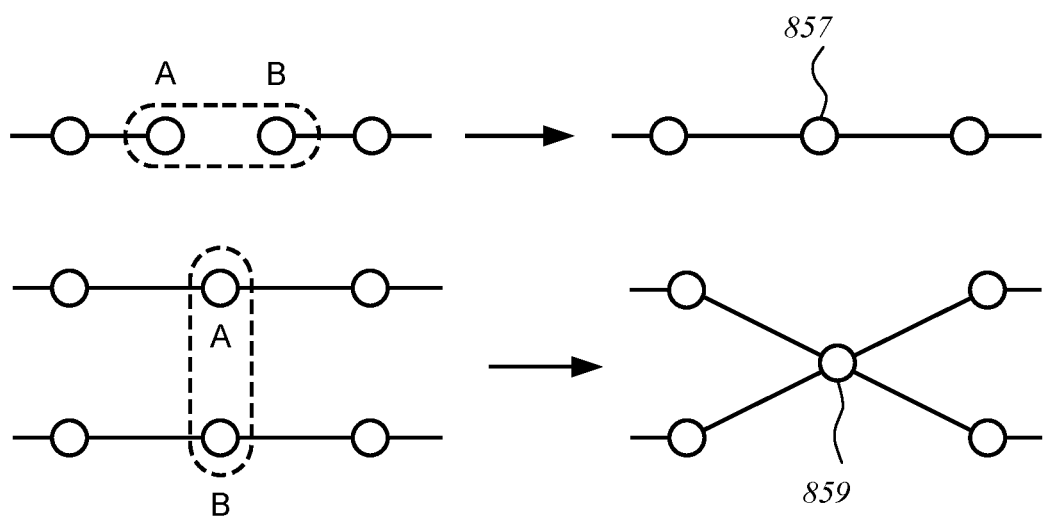
FIG. 8B shows example results of type I fusion operations using the gate of FIG. 8A.

For example, FIG. 8B shows the result of type-I fusing of two qubits A and B that are each, respectively, a qubit located at the end (i.e., a leaf) of some longer entangled cluster state (only a portion of which is shown). The qubit 857 that remains after the fusion operation inherits the entangling bonds from the original qubits A and B thereby creating a larger linear cluster state. FIG. 8B also shows the result of type-I fusing of two qubits A and B that are each, respectively, an internal qubit that belongs to some longer entangled cluster of qubits (only a portion of which is shown). As before, the qubit 859 that remains after fusion inherits the entangling bonds from the original qubits A and B thereby creating a fused cluster state. In this case, the qubit that remains after the fusion operation is entangled with the larger cluster by way of four other nearest neighbor qubits as shown.

Returning to the schematic illustration of type I fusion gate 800 shown in FIG. 8A, qubit A is dual-rail encoded by modes 843 and 845, and qubit B is dual-rail encoded by modes 847 and 849. For example, in the case of path-encoded photonic qubits, the logical zero state of qubit A (denoted $|0\rangle_A$) occurs when mode 843 is a photonic waveguide that includes a single photon and mode 845 is a photonic waveguide that includes zero photons (and likewise for qubit B). Thus, type I fusion gate 800 can take as input two dual-rail-encoded photon qubits thereby resulting in a total of four input modes (e.g., modes 843, 845, 847, and 849). To accomplish the fusion operation, a mode coupler (e.g., 50/50 beam splitter) 853 is applied between a mode of each of the input qubits, e.g., between mode 843 and mode 849 before performing a detection operation on both modes using photon detectors 855 (which includes two distinct photon detectors coupled to modes 843 and 849 respectively). The detection operation on modes 843 and 849 is a destructive measurement. In addition, to ensure that the output modes are adjacently positioned, a mode swap operation 851 can be applied that swaps the position of the second mode of qubit A (mode 845) with the position the second mode of qubit B (mode 849). In some embodiments, mode swapping can be accomplished through a physical waveguide crossing as described above or by one or more photonic switches or by any other type of physical mode swap.

FIG. 8A shows only an example arrangement for a type I fusion gate and one of ordinary skill will appreciate that the position of the mode coupler and the presence of the mode swap region 851 can be altered without departing from the scope of the present disclosure. For example, beam splitter 853 can be applied between modes 845 and 847. Mode swaps are optional and are not necessary if qubits having non-adjacent modes can be dealt with, e.g., by tracking which modes belong to which qubits by storing this information in a classical memory.

Type I fusion gate 800 is a nondeterministic gate, i.e., the fusion operation succeeds with a certain probability less than 1, and in other cases the quantum state that results is not a larger cluster state that comprises the original cluster states fused together to a larger cluster state. More specifically, gate 800 "succeeds," with probability 50%, when only one photon is detected by detectors 855, and "fails" if zero or two photons are detected by detectors 855. When the gate succeeds, the two cluster states that qubits A and B were a part of become fused into a single larger cluster state with a fused qubit remaining as the qubit that links the two previously unlinked cluster states (see, e.g., FIG. 8B). However, when the fusion gate fails, it has the effect of removing both qubits from the original cluster resource states without generating a larger fused state.

Figure 9A:
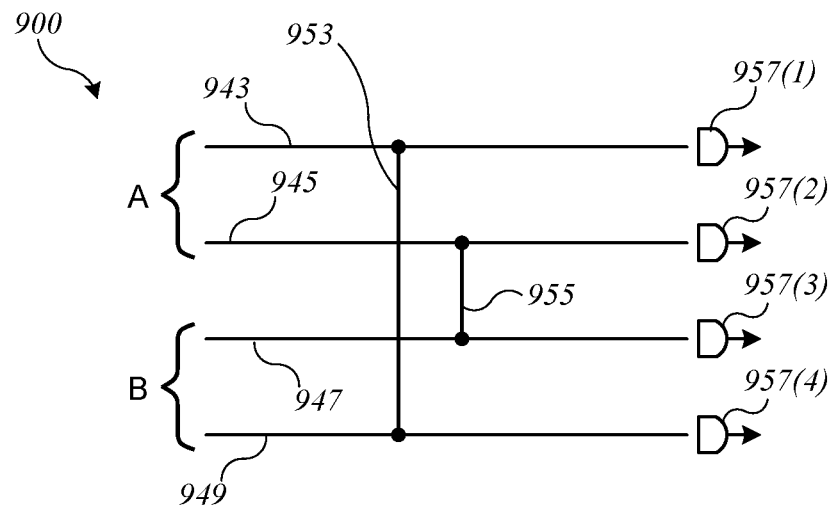
FIG. 9A shows a circuit diagram for a dual-rail-encoded type II fusion gate that can be used in some embodiments.

FIG. 9A shows a circuit diagram illustrating a type II fusion gate 900 in accordance with some embodiments. Like other diagrams herein, the diagram shown in FIG. 9A is schematic with each horizontal line representing a mode of a quantum system, e.g., a photon. In a dual-rail encoding, each pair of modes represents a qubit. In a photonic implementation of the gate the modes in diagrams such as that shown in FIG. 9A can be physically realized using single photons in photonic waveguides. Most generally, a type II fusion gate such as gate 900 takes qubit A (physically realized, e.g., by photon modes 943 and 945) and qubit B (physically realized, e.g., by photon modes 947 and 949) as input and outputs a quantum state that inherits the entanglement with other qubits that were previously entangled with either (or both) of input qubit A or input qubit B. (For type II fusion, if the input quantum state had N qubits, the output quantum state has N−2 qubits. This is different from type I fusion where an input quantum state of N qubits leads to an output quantum state having N−1 qubits.)

Figure 9B:
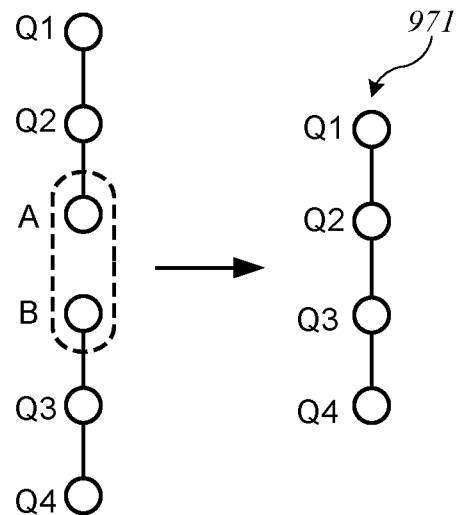
FIG. 9B shows an example result of a type II fusion operation using the gate of FIG. 9A.

For example, FIG. 9B shows the result of type-II fusing of two qubits A and B that are each, respectively, a qubit located at the end (i.e., a leaf) of some longer entangled cluster state (only a portion of which is shown). The resulting qubit system 971 inherits the entangling bonds from qubits A and B thereby creating a larger linear cluster state.

Returning to the schematic illustration of type II fusion gate 900 shown in FIG. 9A, qubit A is dual-rail encoded by modes 943 and 945, and qubit B is dual-rail encoded by modes 947 and 949. For example, in the case of path encoded photonic qubits, the logical zero state of qubit A (denoted $|0\rangle_A$) occurs when mode 943 is a photonic waveguide that includes a single photon and mode 945 is a photonic waveguide that includes zero photons (and likewise for qubit B). Thus, type II fusion gate 900 takes as input two dual-rail-encoded photon qubits thereby resulting in a total of four input modes (e.g., modes 943, 945, 947, and 949). To accomplish the fusion operation, a first mode coupler (e.g., 50/50 beam splitter) 953 is applied between a mode of each of the input qubits, e.g., between mode 943 and mode 949, and a second mode coupler (e.g., 50/50 beam splitter) 955 is applied between the other modes of each of the input qubits, e.g., between modes 945 and 947. A detection operation is performed on all four modes using photon detectors 957(1)-957(4). The detection operation is a destructive measurement. In some embodiments, mode swap operations (not shown in FIG. 9A) can be performed to place modes in adjacent positions prior to mode coupling. In some embodiments, mode swapping can be accomplished through a physical waveguide crossing as described above or by one or more photonic switches or by any other type of physical mode swap. Mode swaps are optional and are not necessary if qubits having non-adjacent modes can be dealt with, e.g., by tracking which modes belong to which qubits by storing this information in a classical memory.

FIG. 9A shows only an example arrangement for the type II fusion gate and one of ordinary skill will appreciate that the positions of the mode couplers and the presence or absence of mode swap regions can be altered without departing from the scope of the present disclosure.

The type II fusion gate shown in FIG. 9A is a nondeterministic gate, i.e., the fusion operation succeeds with a certain probability less than 1, and in other cases the quantum state that results is not a larger cluster state that comprises the original cluster states fused together to a larger cluster state. More specifically, the gate "succeeds" in the case where one photon is detected by one of detectors 957(1) and 957(4) and one photon is detected by one of detectors 957(2) and 957(3); in all other cases, the gate "fails." When the gate succeeds, the two cluster states that qubits A and B were a part of become fused into a single larger cluster state; unlike type-I fusion, no fused qubit remains (compare FIG. 8B and FIG. 9B). When the fusion gate fails, it has the effect of removing both qubits from the original cluster resource states without generating a larger fused state.

The foregoing description provides an example of how photonic circuits can be used to implement physical qubits and operations on physical qubits using mode coupling between waveguides. In these examples, a pair of modes can be used to represent each physical qubit. Examples described below can be implemented using similar photonic circuit elements.

2. Generation of Entanglement Structures

As described in Section 1, a qubit can be physically realized using a pair of waveguides into which a photon is introduced, and qubits can be operated upon using mode couplers (e.g., beam splitters), variable phase shifters, photon detectors, and the like. For instance, entanglement between two (or more) qubits can be created by providing mode couplers between waveguides associated with different qubits. As a practical matter, physical qubits may suffer from loss (e.g., where inefficiency in photon generation circuits, mode couplers, fusion circuits, or other components can result in a photon not being detected during measurement) and noise (e.g., where bit-flip errors can occur prior to measurement). Consequently, relying on a single physical qubit (e.g., a photon propagating in a pair of waveguides) when performing a quantum computation may result in an unacceptably high error rate. To provide fault tolerance, photonic quantum computers can be designed to operate on one or more logical qubits, where a "logical qubit" is a topological cluster state having an entanglement structure that enables error correction. (As used in the following sections, the term "qubit" refers to a physical qubit; all references to logical qubits include the qualifier "logical.") For example, in some embodiments the entanglement structure of a logical qubit can be represented as a graph in three dimensions. As a shorthand, the present disclosure uses the term "entanglement space" to refer to a space having dimensionality corresponding to the graph representation of an entanglement structure. In the context of quantum computing, logical qubits can improve robustness by supporting error detection and error correction. Logical qubits may also be used in other contexts, such as quantum communication.

Some embodiments described herein relate to devices and methods that can be used to construct large entanglement structures from smaller entangled systems of physical qubits, referred to as "resource states." As used herein, a "resource state" refers to an entangled system of a number (n) of qubits in a non-separable entangled state (which is an entangled state that cannot be decomposed into smaller separate entangled states). In various embodiments, the number n can be a small number (e.g., two or more, or any number up to about 20), or a larger number (as large as desired).

Figure 10A:
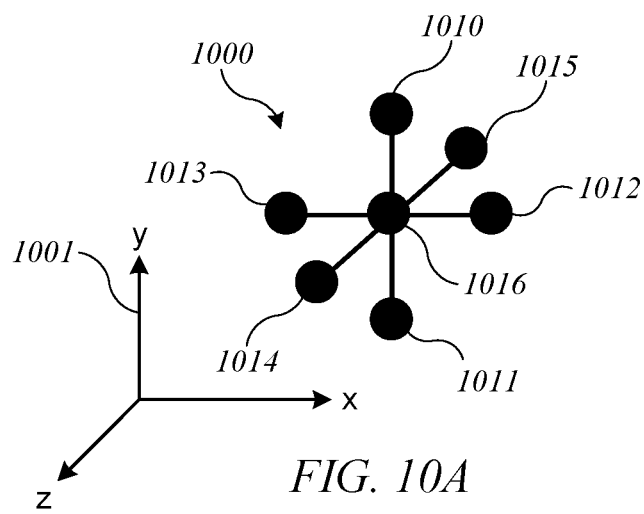
FIGS. 10A-10C show entanglement graph representations of resource states that can be used according to some embodiments.
Figure 10B:
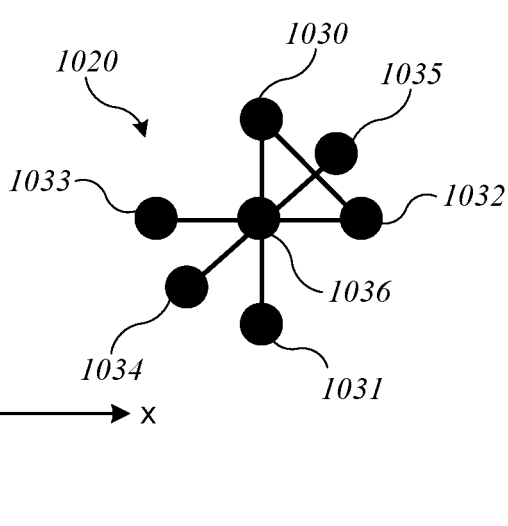
Figure 10C:
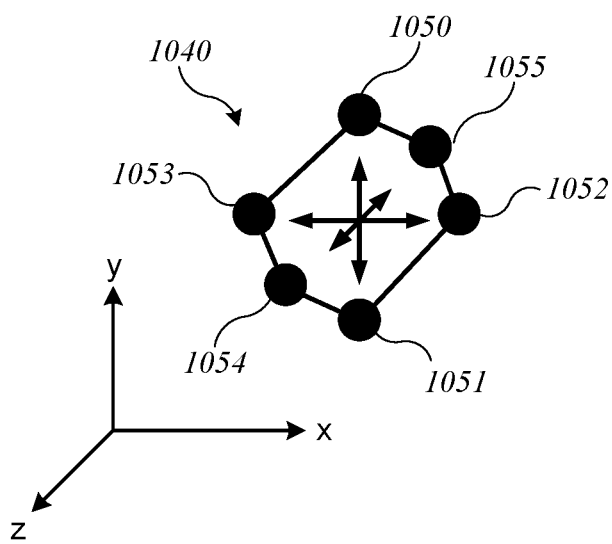

FIGS. 10A-10C show entanglement graph representations of resource states that can be used according to some embodiments. In the graph representations used herein, a physical qubit is represented as a dot, and entanglement between physical qubits is represented by lines connecting pairs of dots. In these examples, the entanglement geometry defines a three-dimensional space, and labels x, y, and z are used to designate the different dimensions in this entanglement space. It should be understood that these dimensions need not correspond to physical dimensions and that in some instances qubits may be separated in time rather than in spatial dimensions. For example, each physical qubit can be implemented using photons propagating in waveguides, and a particular section of waveguide may host photons associated with different qubits at different times.

FIG. 10A shows an example of a resource state 1000 having seven physical qubits 1010-1016. In resource state 1000, a "central" qubit 1016 is entangled with six "peripheral" qubits 1010-1015. For convenience of description, the six peripheral qubits are distinguished from each other using directional identifiers +x, −x, +y, −y, +z, −z (as indicated by coordinate axes 1001); thus, for example, qubit 1012 may be referred to as the +y qubit, qubit 1013 may be referred to as the −x qubit, and so on. It should be understood that these identifiers refer to the entanglement geometry and need not correspond to actual physical directions. As will become apparent, the terms "central" qubit and "peripheral" qubit are used herein to distinguish qubits that are subject to fusion operations with qubits from other resource states ("peripheral qubits") from qubits that are not subject to fusion operations with qubits from other resource states ("central qubits").

The entanglement geometry or topology of a resource state can be varied. By way of example, FIG. 10B shows an example of a different resource state 1020 having seven physical qubits 1030-1036. Similarly to resource state 1000, a central qubit 1036 is entangled with six peripheral qubits 1030-1035. Resource state 1020 differs from resource state 1010 in that resource state 1020 has additional entanglement between peripheral qubits 1030 and 1032.

As another example, FIG. 10C shows a resource state 1040, known in the art as a Kagome-6 state. Resource state 1040 has six peripheral qubits 1050-1055 (and no central qubit), and each peripheral qubit is entangled with two other qubits. Resource state 1040 can be understood as having a three-dimensional entanglement geometry as suggested by the bidirectional arrows in the center, with qubit 1050 being a +y qubit, qubit 1051 being a −y qubit, qubit 1052 being a +x qubit, qubit 1053 being a −x qubit, qubit 1054 being a +z qubit, and qubit 1055 being a −z qubit.

The resource state examples in FIGS. 10A-10C are illustrative and not limiting. In some embodiments, the entanglement topology/geometry of a resource state can be chosen based on a particular computation to be executed, and different resource states that are used in generating a single entanglement structure can have different entanglement topologies. Further, while the examples shown involve resource states having six or seven qubits, the number of qubits in each resource state can also be varied. Accordingly, a resource state may be larger or smaller than the examples shown, and may include any number of central qubits (including zero central qubits) and/or peripheral qubits. Additional considerations related to the selection of size and entanglement geometry for a resource state are described below.

Figure 11A:
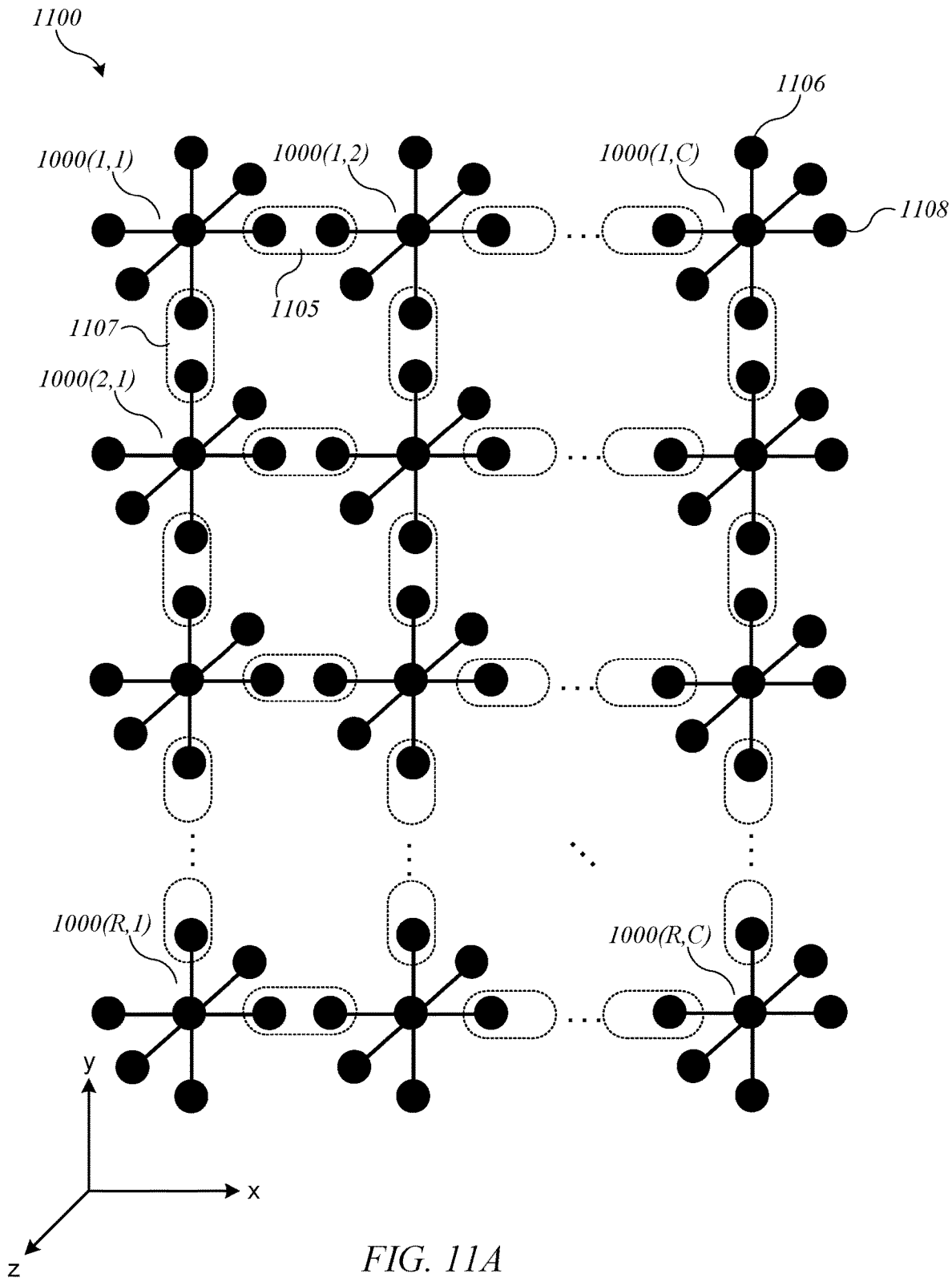
FIGS. 11A and 11B show examples of layers of resource states according to some embodiments.
Figure 11B:
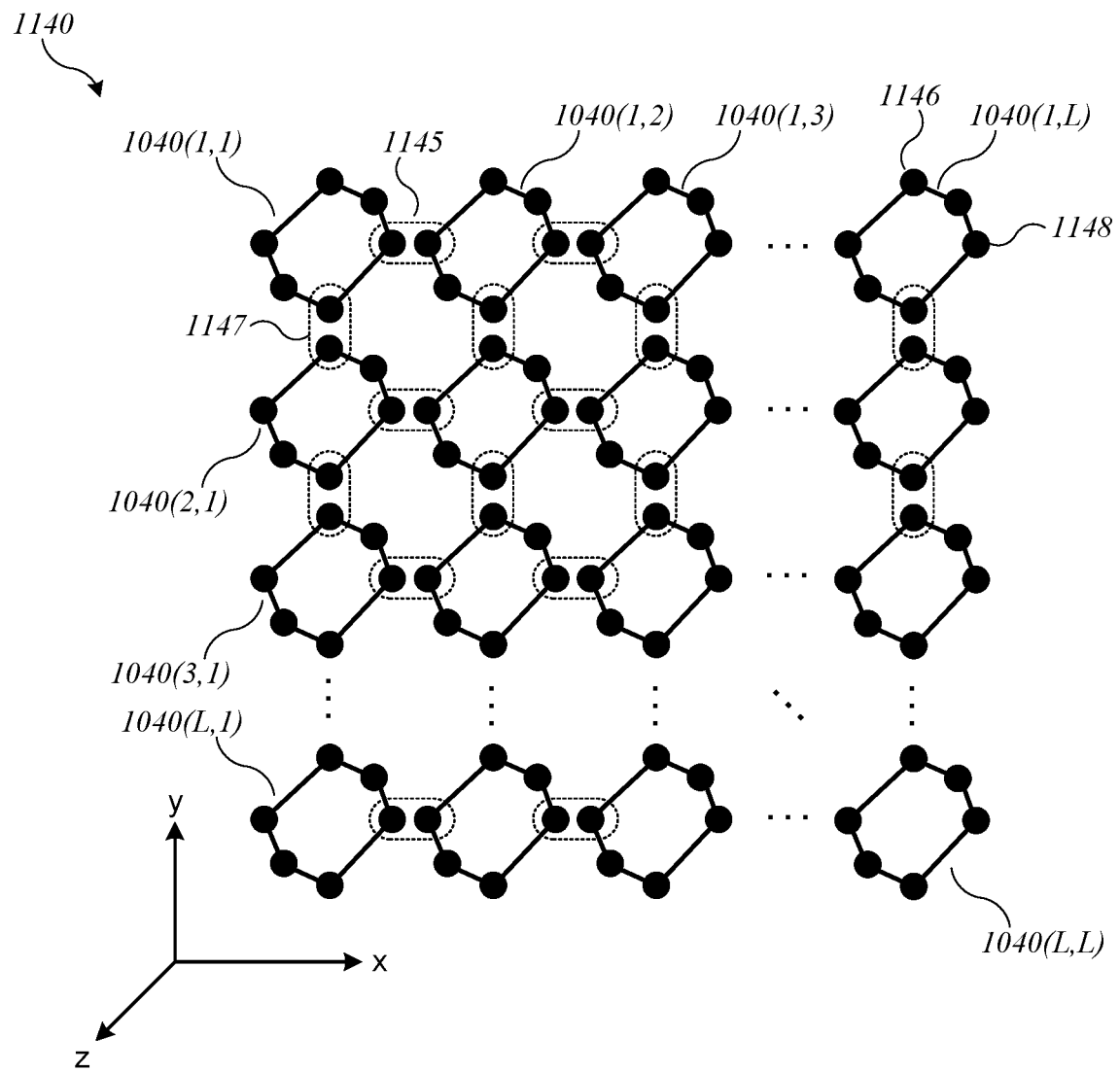

According to various embodiments, a "layer" consisting of some number of resource states can be generated using one or more resource state generators. (As with other geometric or spatial terms used herein, it should be understood that "layer" refers to a graph representation of quantum entanglement of the physical qubits and does not imply any particular physical arrangement of waveguides or other components.) FIGS. 11A and 11B show examples of layers of resource states according to some embodiments. In FIG. 11A, layer 1100 is formed from multiple instances of resource state 1000 of FIG. 10A, and in FIG. 11B, layer 1140 is formed from multiple instances of resource state 1040 of FIG. 10C. Layers 1100 and 1140 have a size, defined as the number of resource states included in the layer. In examples used herein, each layer has a regular array structure with rows and columns. (The terms "row" and "column" are used herein to distinguish dimensions in entanglement space and need not correspond to physical dimensions.) Thus, as shown in FIG. 11A, layer 1100 includes a number R×C of resource states, where R is the number of rows and C is the number of columns. In some instances (e.g., as shown in FIG. 11B), R=C=L, and layer 1100 can be said to be square with size $L^2$. In some embodiments, $L^2$ (or R×C) can be a large number, e.g., ~100 to ~$10^6$.

To create entanglement structures larger than a resource state, fusion operations (e.g., type II fusion operations as described above or other entangling measurement operations) can be performed to create entanglement between qubits of different resource states within a layer. FIGS. 11A and 11B show, using dotted ovals, examples of pairs of qubits that can be input to a fusion circuit (e.g., type II fusion circuit 900 of FIG. 9B). Thus, for example, in layer 1100 of FIG. 11A, the +x qubit of resource state 1000(1,1) and the −x qubit of resource state 1000(1,2) can be inputs to one fusion operation, as indicated by dotted oval 1105, while the −y qubit of resource state 1000(1,1) and the +y qubit of resource state 1000(2,1) can be inputs to another fusion operation, as indicated by dotted oval 1107. As indicated, this pattern can be repeated across layer 1100. Similarly, in layer 1140 of FIG. 11B, the +x qubit of resource state 1040(1,1) and the −x qubit of resource state 1040(1,2) can be inputs to one fusion operation, as indicated by dotted oval 1145, while the −y qubit of resource state 1040(1,1) and the +y qubit of resource state 1040(2,1) can be inputs to another fusion operation, as indicated by dotted oval 1147. As indicated, this pattern can be repeated across layer 1100.

In some embodiments, qubits at the edge, or boundary, of a layer (e.g., qubits 1106 and 1108 in layer 1100 or qubits 1146 and 1148 in layer 1140) can be treated as a special case. For example, a qubit at the boundary of a layer (also referred to as a "boundary qubit") can be removed from the system by performing a Z measurement (i.e., a measurement in the Pauli Z basis) or similar operation on the qubit. Alternatively, a boundary qubit may be subject to a fusion operation with another boundary qubit, which can be a boundary qubit in the same layer or in a different layer as desired. Examples of operations on boundary qubits are described below. In some embodiments, a resource state generator can be configured such that boundary qubits are not generated or are selectively generated.

Figure 12A:
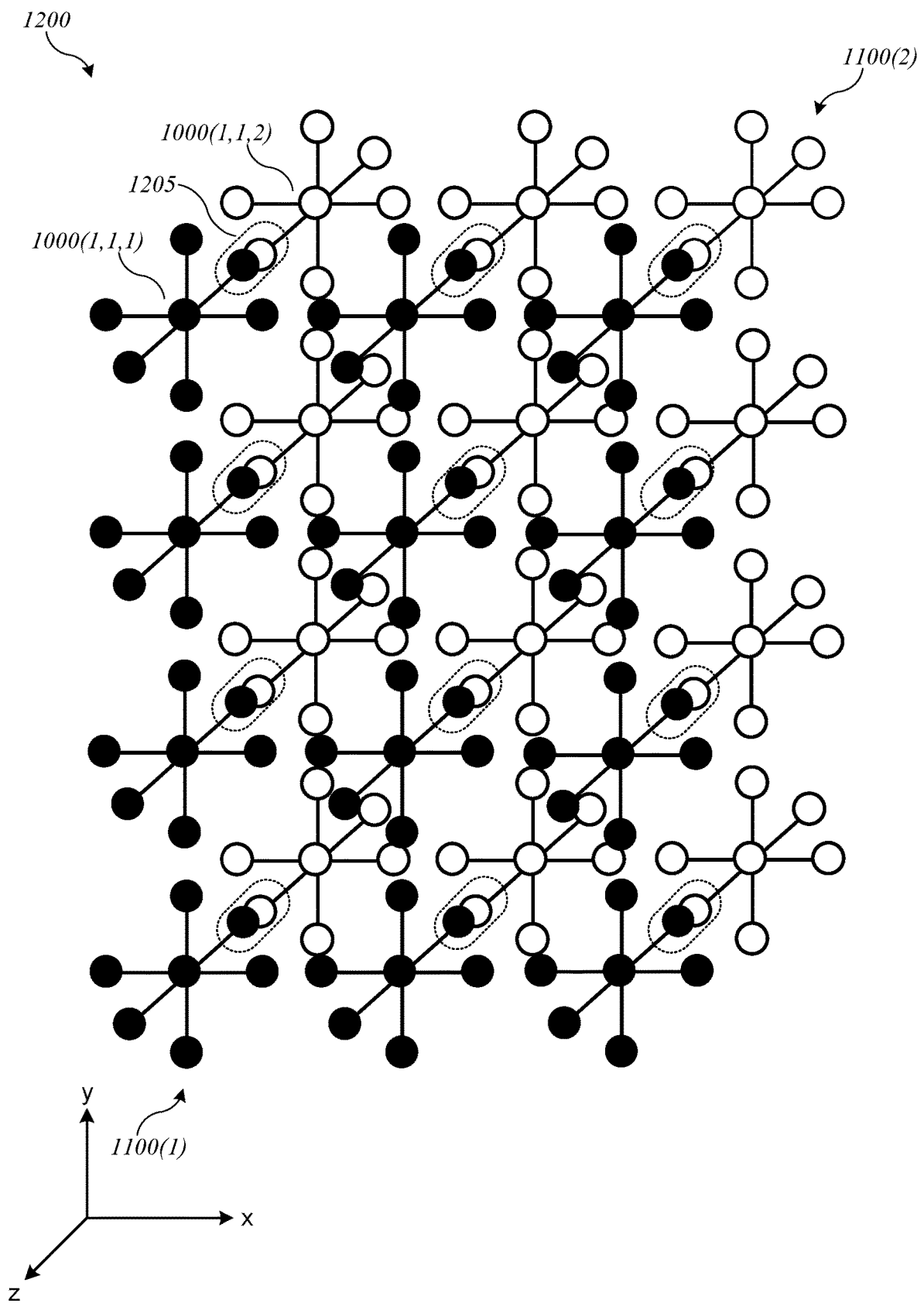
FIGS. 12A and 12B show examples of three-dimensional arrays that include two layers of resource states according to some embodiments.
Figure 12B:
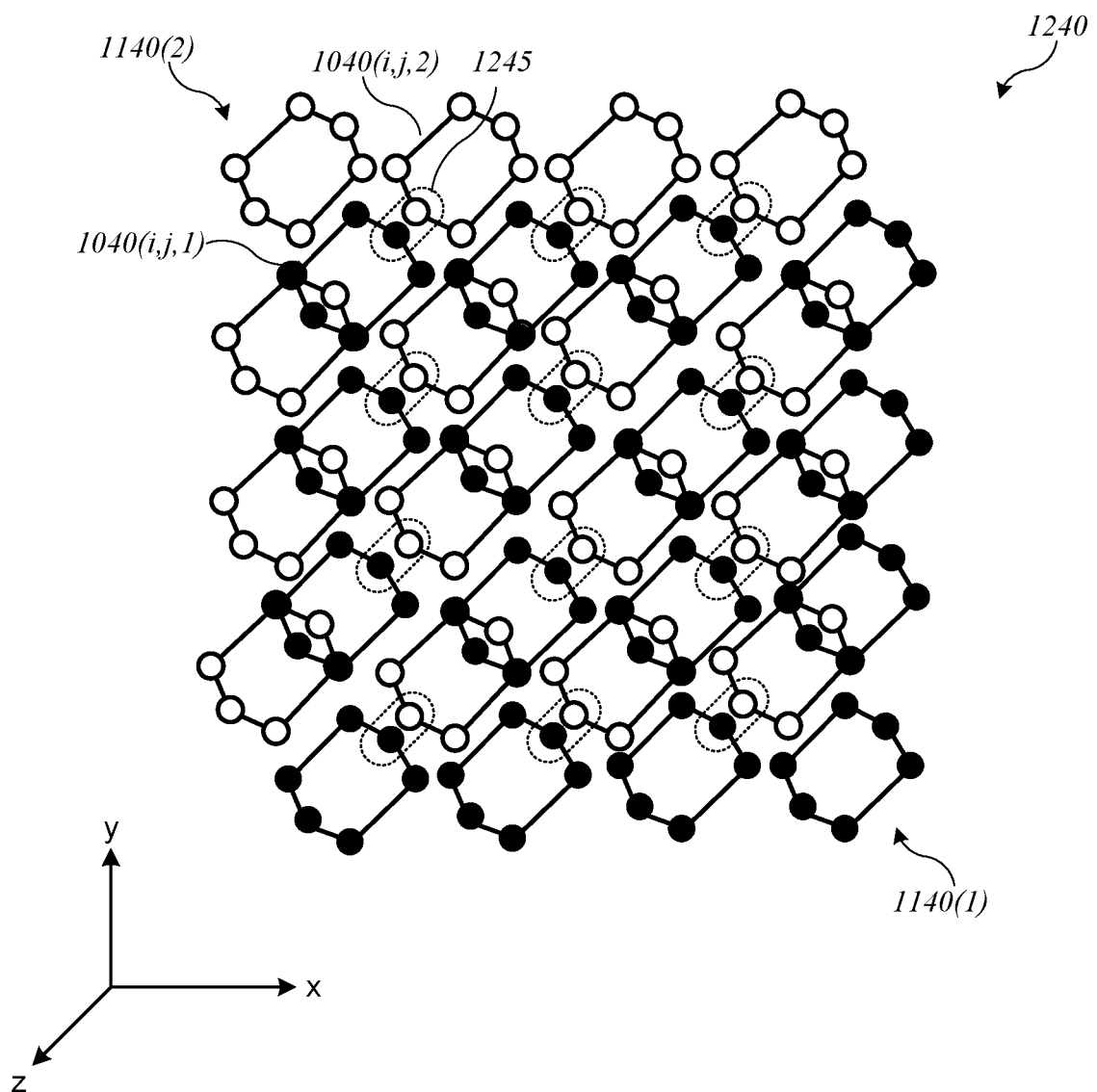

In some embodiments, multiple layers of resource states can be created, and additional fusion operations (e.g., type II fusion operations as described above) can be performed to create entanglement between qubits associated with resource states of different layers. For example, FIGS. 12A and 12B show examples of three-dimensional arrays that include two layers of resource states according to some embodiments. In FIG. 12A, array 1200 includes two instances of layer 1100 of FIG. 11B, and in FIG. 12B, array 1240 includes two instances of layer 1140 of FIG. 11B. For clarity of illustration, in FIGS. 12A and 12B, layers 1100(1) and 1140(1) are shown using black dots to represent qubits while layers 1100(2) and 1140(2) are shown using white dots to represent qubits. FIGS. 12A and 12B show, using dotted ovals, examples of pairs of qubits from different layers that can be input to a fusion circuit (e.g., type II fusion circuit 900 of FIG. 9B). Thus, for example, as shown in FIG. 12A, the −z qubit of resource state 1000(1,1,1) and the +z qubit of resource state 1000(1,1,2) can be inputs to a fusion operation, as indicated by dotted oval 1205. Similarly, the −z qubit of each other resource state in layer 1100(1) can be fused with the +z qubit of a resource state in a corresponding position in layer 1100(2). Likewise, as shown in FIG. 12B, the −z qubit of each resource state 1040(i,j,1) in layer 1140(1) and the +z qubit of a corresponding resource state 1040(i,j,2) in layer 1140(2) can be inputs to a fusion operation, as indicated by dotted oval 1245. For clarity of illustration, fusion operations between neighboring qubits within a layer are not shown in FIGS. 12A and 12B; however, it should be understood that fusion operations within each layer (e.g., as shown in FIGS. 11A and 11B) can also be performed. The same pattern of fusion operations can be extended to any number of layers. The number of layers that are generated can be independent of the size of a layer and may be determined, for instance, based on a particular quantum computation to be performed.

In some embodiments, the fusion operations between qubits of resource states within a layer (e.g., as shown in FIGS. 11A and 11B) and the fusion operations between qubits of resource states in different layers (e.g., as shown in FIGS. 12A and 12B) are type II fusion operations (as described above with reference to FIGS. 9A and 9B) performed on a pair of input qubits Successful type II fusion removes the input qubits from the system and creates entanglement between the remaining qubits (in this case, the central qubits). In addition, type II fusion (whether successful or not) entails making destructive measurements, and the results of those measurements (e.g., the number of photons detected by each of detectors 957 in fusion circuit 900 of FIG. 9A) can be provided as (classical) data to a classical computer, which can interpret the results to extract information that reflects the entanglement structure. For example, a classical computer may be able to use the measurement data to determine a result of a quantum computation.

In the description that follows, fusion operations may be referred to as "spacelike" or "timelike." This terminology is evocative of particular implementations in which different qubits or resource states are generated at different times: spacelike fusion can be performed between qubits generated at the same time using different instances of hardware, while timelike fusion can be performed between qubits generated at different times using the same instance of hardware. For photonic qubits, timelike fusion can be implemented by delaying an earlier-produced qubit (e.g., using additional lengths of waveguide material to create a longer propagation path for the photon), thereby allowing mode coupling with a later-produced qubit. By leveraging timelike fusion, the same hardware can be used to generate multiple instances of the resource states within a layer and/or to generate multiple layers of resource states.

In some embodiments, some or all of the fusion operations can be performed using reconfigurable fusion circuits. Reconfigurable fusion circuits can incorporate various operations prior to fusion such as phase shifts, mode swaps, and/or basis rotations and can receive (classical) control signals to select particular fusion operations to be performed. For instance, different fusion operations can be selectably performed at different positions within a layer, or different fusion operations can be selectably performed for different layers. Reconfigurable fusion circuits can be used, e.g., to implement particular quantum computing algorithms using the array of resource states.

Figure 13:
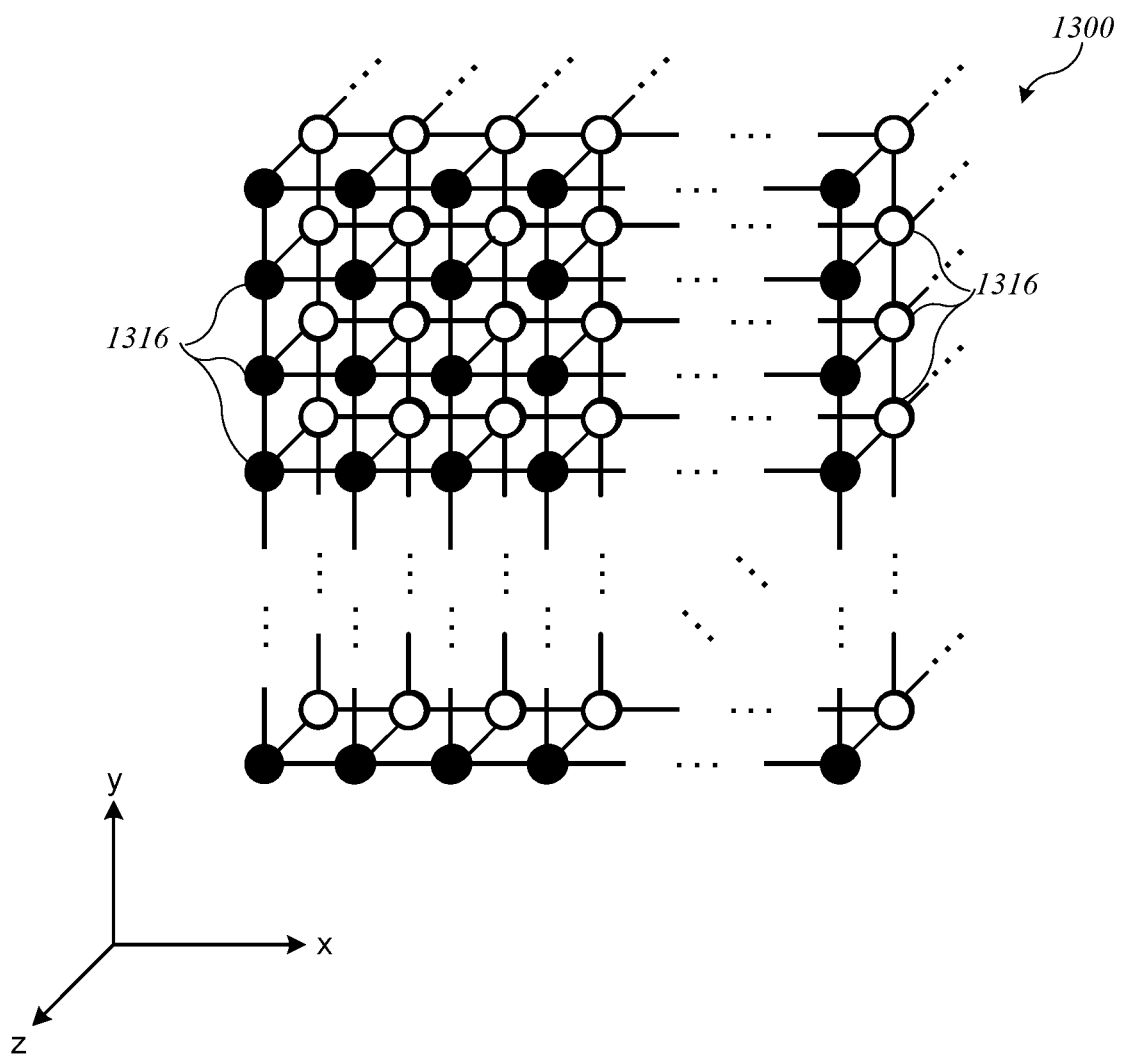
FIG. 13 shows an example of a large entangled system of qubits that can be created according to some embodiments.

In some embodiments, (e.g., the example of FIGS. 10A, 11A, and 12A) each resource state has a central qubit (i.e., a qubit such as qubit 1016 that is not subject to fusion operations with a qubit of another resource state). Thus, after performing fusion operations as described above, a large entangled system (referred to herein as an "LES") of qubits can produced. FIG. 13 shows an example of an LES 1300 that can be created through fusion operations as shown in FIGS. 11A and 12A applied to resource state 1000 of FIG. 10A according to some embodiments. In this example, resource state 1000 has a single central qubit (qubit 1016 in FIG. 10A), and LES 1300 can be understood as having layers, with each layer including an array of R×C qubits 1316. More generally, a resource state can have any number of central qubits, and the number of qubits per layer of an LES may be different from the size of the layer of resource states that contributed to the layer of the LES. An LES is a system of qubits that is physically prepared and therefore exists physically in a particular entangled state. The entangled state of the qubits (e.g., photonic qubits) can itself be a graph state, a cluster state, some other entangled state that forms a fault tolerant cluster state that, with appropriate measurements on the individual qubits, corresponds to a quantum error correcting code (such as a topological code, e.g., the foliated surface code, volume codes, color codes and the like), or any portion of these entangled states. Accordingly, an LES (or several LESes that are further mutually entangled via processes such as "stitching" processes described below) can be used to encode one or more logical qubits, or as a cluster state (or portion of a cluster state) upon which measurements of individual physical qubits are made to implement quantum computations in measurement-based quantum computing ("MBQC") systems, or in any other context in which a large entangled system of physical qubits is to be generated.

In other embodiments (e.g., the example of FIGS. 10C, 11B, 12B), the resource states do not have any central qubits.

In embodiments where the resource states have no central qubits, the fusion operations within and between layers may involve destructive measurements on all of the qubits of all of the resource states, and the final output of creating entanglement can be a set of (classical) measurement outcome data from the fusion operations. In some embodiments, this measurement outcome data can be interpreted as the result of a computation involving one or more error-corrected logical qubits having an entanglement structure defined by the resource states and fusion operations performed thereon. This technique is referred to herein as "fusion-based quantum computing," or "FBQC."

It should be understood that the resource states and arrays shown herein are illustrative and that variations and modifications are possible. The size and entanglement geometry of resources states can be varied. In some embodiments, resource states having different sizes and/or entanglement geometries can be used at different positions within a layer or within an array of layers, and position-dependent selection of resource state configurations can be used to implement a variety of logical operations. It should also be understood that the fusion operations may be stochastic in nature and may not always succeed; in some embodiments, the entanglement geometry can support fault tolerance for both MBQC or FBQC. Further, while FBQC and MBQC are examples of use-cases for the entanglement-generating techniques described herein, it should be understood that these techniques can be applied in other contexts and are not limited to quantum computing.

2.1. Resource State Generation

As described above, some embodiments relate to devices and methods that can be used to construct large entanglement structures from a large number of resource states, where each resource state is an entangled system of a number n of qubits in a non-separable entangled state.

The particular size and entanglement geometry of the resource states can be chosen as a design parameter. In some cases, the optimal size may depend on the particular physical implementation of the qubits. For example, as described above, qubits can be implemented using photons propagating in waveguides. The processes used to generate the photons and create entanglement may be stochastic (i.e., the probability of successfully generating a photon in any given instance is significantly less than 1). Where generation or entanglement of qubits is stochastic, multiplexing techniques or other techniques may be used to increase the probability of producing a resource state having a specified entanglement structure (for each attempt). Given a set of resource states, the processes used to create the larger entanglement structure (e.g., fusion processes as described above) may also be stochastic, and the larger entanglement structure can be defined in a manner that supports fault-tolerant behavior in the presence of stochastic processes. Accordingly, the size of the resource state can be chosen for a particular implementation based on the rate of errors in resource state generation that can be tolerated and the particular probability of producing a resource state having a specified entanglement structure.

In some embodiments, a resource state such as resource state 1100 can be generated using photonic and electronic circuits and components (e.g., of the type described in Section 1.3 above) to produce and manipulate individual photons. In some implementations, a resource state generator can be a single integrated circuit fabricated, e.g., using conventional silicon-based technologies. The resource state generator can include photon sources or can receive photons from an external source. The resource state generator can also include photonic circuits implementing Bell state generators and fusion operations as described above. To provide robustness, the resource state generator can include multiple parallel instances of various photonic circuits with detectors and electronic control logic to select a successful instance to propagate a photon. One skilled in the art will know various ways to construct a photonic resource state generator capable of generating resource states having a desired entanglement geometry.

In some embodiments, resource states can be generated using techniques other than linear optical systems. For instance, various devices are known for generating and creating entanglement between systems of "matter-based" qubits, such as qubits implemented in ion traps, other qubits encoded in energy levels of an atom or ion, spin-encoded qubits, superconducting qubits, or other physical systems. It is also understood in the art that quantum information is fungible, in the sense that many different physical systems can be used to encode the same information (in this case, a quantum state). Thus, it is possible in principle to swap the quantum state of one system onto another system by inducing interactions between the systems. For example, the state of a qubit (or ensemble of entangled qubits) encoded in energy levels of an atom or ion can be swapped onto the electromagnetic field (i.e., photons). It is also possible to use transducer technologies to swap the state of a superconducting qubit onto a photonic state. In some instances, the initial swap may be onto photons having microwave frequencies; after the swap, the frequencies of the photons can be increased into the operation frequencies of optical fiber or other optical waveguides. As another example, quantum teleportation can be applied between matter-based qubits and Bell pairs in which one qubit of the Bell pair is a photon having frequency suitable for optical fiber (or other optical waveguides), thereby transferring the quantum state of the matter-based qubits to a system of photonic qubits. Accordingly, in some embodiments matter-based qubits can be used to generate a resource state that consists of photonic qubits, and the particular construction and configuration of the resource state generator is not relevant to understanding the present description.

2.2. Circuits for Creating Entanglement Structures from Resource States

Examples of circuits and techniques that can be used to create entanglement structures by performing fusion operations as described above between qubits of resource states produced by one or more resource state generators will now be described. For simplicity of description, two cases are considered. One case includes the example of FIGS. 10A, 11A, and 12A, where each resource state includes a central qubit and an LES as shown in FIG. 13 is produced. The other case includes the examples of FIGS. 10C, 11B, and 12B, where each resource state does not include a central qubit and the result of the fusion operations described above is (classical) measurement outcome data that reflects the entanglement structure. It should be understood that other resource state configurations, including configurations with any number (zero or more) of central qubits, can be used.

2.2.1. Circuit Symbols

To facilitate understanding of the description, FIGS. 14A-14F introduce a set of schematic circuit symbols that are used in subsequent figures. These circuit symbols represent circuits that operate on physical (photonic) qubits, and each input or output line represents a (physical) qubit. As a matter of drawing convention, inputs are shown at the left and outputs at the right, with the understanding that a schematic circuit drawing need not correspond to a specific physical layout.

FIG. 14A shows a symbol denoting a resource state generator (RSG) circuit 1400. As described above, an RSG circuit can be implemented using any circuit or device that produces a resource state encoded on photonic qubits. Examples include photonic/electronic circuits as well as devices that create a resource state encoded on a non-photonic system of physical qubits, then swap the quantum state onto photonic qubits. Other implementations of a resource state generator circuit may create an initial state in a non-photonic system of physical qubits, swap the initial state onto photonic qubits, then perform linear optical operations to create the resource state. Regardless of implementation, the outputs of RSG circuit 1400 are qubits, indicated by lines 1402; the number of outputs depends on the particular resource state. In embodiments described herein, it is assumed that the RSG circuit generates one resource state per clock cycle, and the length of a clock cycle can be defined based on the time required for one RSG circuit to generate one resource state. The time required can depend on the particular RSG circuit; for instance, an RSG circuit might generate a resource state in 1 ns (or 100 ns), and a clock cycle might be 1 ns (or 100 ns). In some embodiments, a clock cycle can be longer than the time required for an RSG circuit to generate one resource state; it is not required that RSGs operate at maximum speed. For purposes of the present description, it is assumed herein that RSG circuit 1400 outputs all qubits of a resource state in the same clock cycle; however, those skilled in the art with access to this disclosure will appreciate that the timing can be varied.

FIG. 14B shows a symbol denoting a type II fusion circuit 1405. A type II fusion circuit can be implemented, e.g., as described above with reference to FIGS. 9A and 9B. The inputs are two qubits (indicated by lines 1404). As described above, the type II fusion operation entails a destructive measurement on the two qubits. Type II fusion circuit 1405 can provide a classical output signal 1406, which can encode measurement data indicating the count of detected photons from each detector and/or other information (e.g., success or failure of the fusion operation).

FIG. 14C shows a symbol denoting a switching circuit 1410. Inputs and outputs to switching circuit 1410 can include any number of qubits (lines 1408), and the number of inputs need not equal the number of outputs (lines 1409). Switching circuit 1410 can incorporate any combination of one or more active optical switches, mode couplers, mode swap circuits, phase shifters, or the like. A switching circuit can be configured to perform an active operation that reconfigures input modes (e.g., to effect a basis change for a qubit by coupling the modes of the qubit), permutes input modes, and/or applies a phase to one or more of the input modes (which can affect subsequent coupling between modes). In some embodiments, operation of switching circuit 1410 can be controlled dynamically in response to a classical control signal 1411, the state of which can be determined based on results of previous operations, a particular computation to be performed, a configuration setting, timing counters (e.g., for periodic switching), or any other parameter or information.

FIG. 14D shows a symbol denoting a delay circuit 1415. A delay circuit delays propagation of a qubit (input 1412) for a fixed length of time, then outputs the qubit (output 1414). The length of time (in clock cycles) is indicated by a number: D=1 indicates a delay of one clock cycle. A delay circuit can be implemented, e.g., by providing one or more suitable lengths of optical fiber, other waveguide material, nitride layers, memory, or the like, so that the photon of the delayed qubit travels a longer path than the photon of a non-delayed qubit.

FIG. 14E shows a symbol denoting a reconfigurable fusion circuit 1420. As shown, a reconfigurable fusion circuit includes a switching circuit 1410 followed by a fusion circuit 1405. A reconfigurable fusion circuit can support a configurable operation, e.g., a basis change or phase shift, applied by switching circuit 1410 prior to the fusion operation by fusion circuit 1405. As with other instances of switching circuit 1410, operation of the switching circuit 1410 within reconfigurable fusion circuit 1420 can be controlled dynamically in response to a classical control signal 1411. As with other instances of fusion circuit 1405, fusion circuit 1405 within reconfigurable fusion circuit 1420 can provide classical output signal 1406.

FIG. 14F shows a symbol denoting an offset reconfigurable fusion circuit 1425. As shown, the offset reconfigurable confusion circuit is similar to reconfigurable fusion circuit 1420, with the addition of a delay circuit 1415 to delay one of the inputs relative to the other by a specified number of clock cycles. Offset reconfigurable fusion circuit 1425 may also be referred to as a "timelike" fusion circuit, a term that emphasizes the temporal aspect resulting from the delay circuit.

2.2.2. Networked Generation of Entanglement

Figure 15:
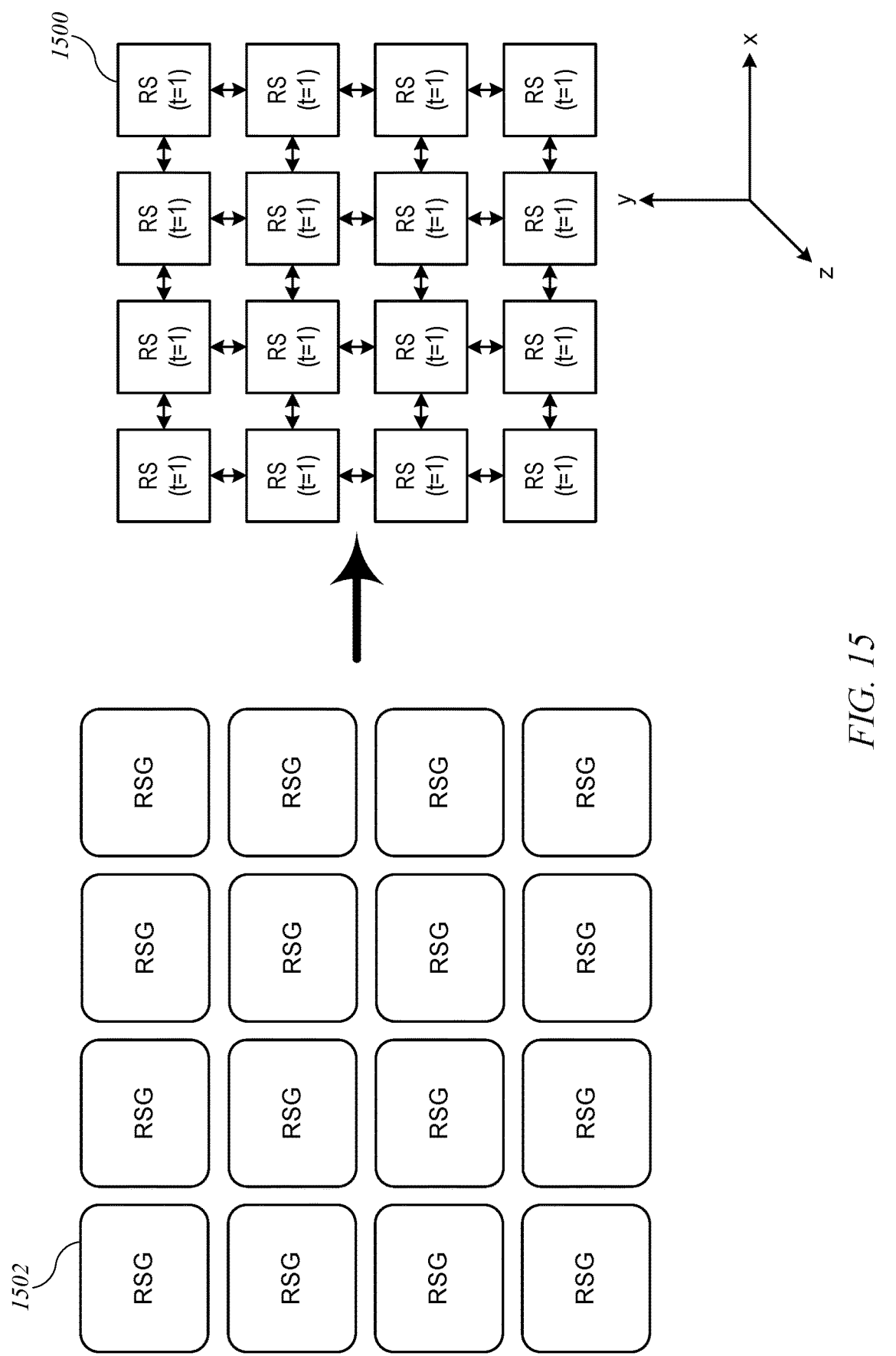
FIG. 15 shows a conceptual illustration of networked generation of a large entangled system of qubits according to some embodiments.

In some embodiments, a set of networked RSG circuits can be provided, in which each RSG circuit provides one resource state that is fused with resource states from other RSG circuits to form a layer of an entanglement structure (e.g., as shown in FIG. 11A or 11B); the same RSG circuits can successively generate different layers for the entanglement structure. FIG. 15 shows a conceptual illustration of networked generation of a layer according to some embodiments. To support generation of a layer of size $L^2$, a corresponding number $L^2$ of RSG circuits 1502 is provided. In the simplified example used herein, $L^2=16$, but in practice $L^2$ can be much larger (e.g., $\sim 10^2$, $\sim 10^4$, $\sim 10^6$). In each clock cycle, enough resource states 1500 to form a complete two-dimensional (2D) layer of resource states can be generated. (In FIG. 15, each resource state 1500 is annotated with time "t=1" to indicate that all are produced during the same clock cycle.) Spacelike fusion operations can be performed on qubits of neighboring resource states 1500 (e.g., as shown in FIGS. 11A and 11B) using additional circuitry described below. A three-dimensional entanglement structure can be generated by using the same $L^2$ RSG circuits 1502 in different clock cycles to generate different layers of $L^2$ resource states, and timelike fusion operations can be performed on qubits of resource states 1500 in different layers (e.g., as shown in FIGS. 12A and 12B) using additional circuitry described below.

Figure 16A:
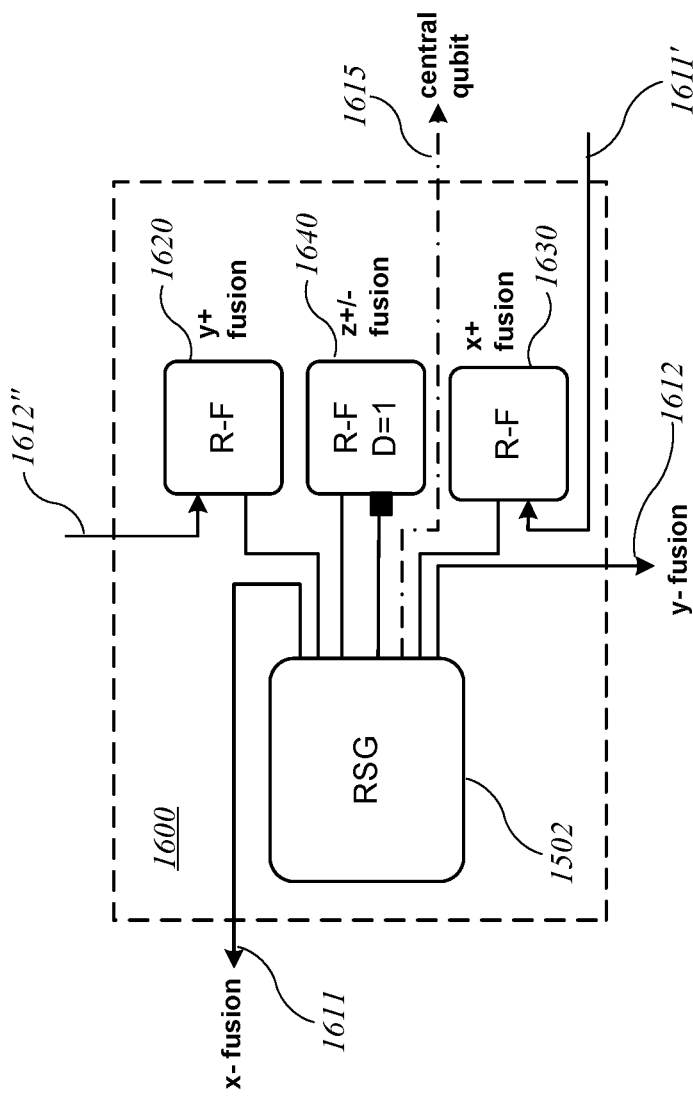
FIGS. 16A and 16B show schematic diagrams of a circuit for generating entanglement structures from resource states using networked RSG circuits according to some embodiments.
Figure 16B:
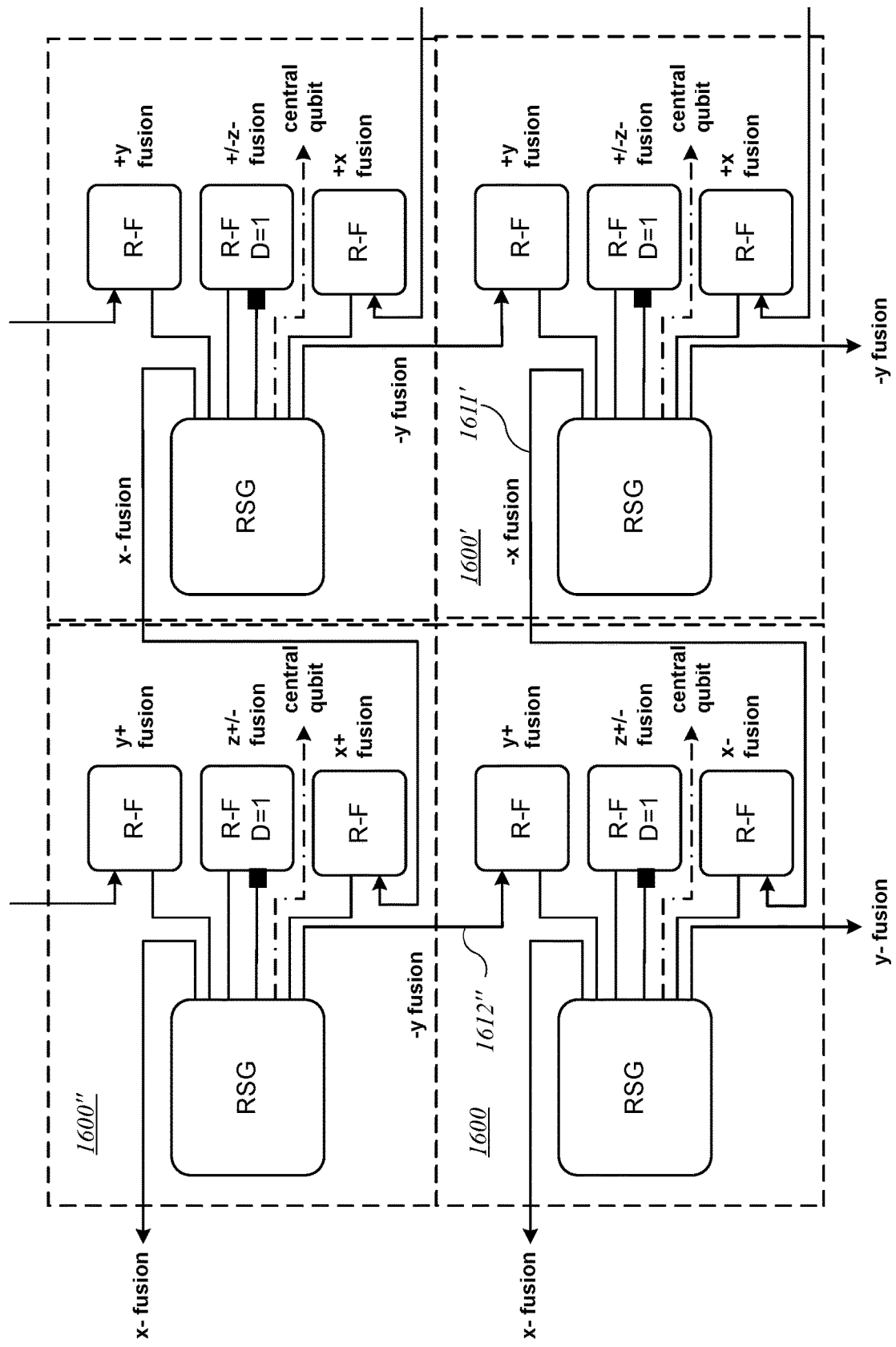

FIGS. 16A and 16B show schematic diagrams of a "fully networked" circuit for generating entanglement structures from resource states according to some embodiments. The circuit notation is as described above with reference to FIGS. 14A-14F except that, for clarity of illustration, classical inputs and outputs are not shown. FIG. 16A shows a representative network cell 1600, and FIG. 16B shows couplings among neighboring instances of network cell 1600 within a network 1650. As best seen in FIG. 16A, each network cell 1600 includes an RSG circuit 1502 that produces a resource state having six peripheral qubits (solid lines) and optionally one or more central qubits 1615, which (if present) is (are) not subject to fusion operations. For example, if RSG circuit 1502 produces resource state 1000 of FIG. 10A, central qubit 1016 can be provided as central qubit 1615; however, if RSG circuit instead produces resource state 1040 of FIG. 10C, no central qubit 1615 is provided. RSG 1502 provides two peripheral qubits to neighboring network cells, as shown by "x− fusion" output path 1611 and "y− fusion" output path 1612. Network cell 1600 also receives qubits from two neighboring network cells. Specifically, input path 1611' couples to the x− fusion output path of network cell 1600' (as shown in FIG. 16B). Likewise, input path 1612" couples to the y− fusion output path of network cell 1600", which is the neighbor of network cell 1600 in the +y direction (as shown in FIG. 16B).

Each instance of network cell 1600 also includes a y+ reconfigurable fusion circuit 1620, an x+ reconfigurable fusion circuit 1630, and a z+/− offset reconfigurable fusion circuit 1640. The y+ reconfigurable fusion circuit 1620 couples the +y qubit of a "local" resource state generated by RSG circuit 1502 to the −y qubit of a "networked" resource state generated by the RSG circuit in the neighboring network cell 1600" in the +y direction. The x+ reconfigurable fusion circuit 1630 couples the +x qubit of the local resource state generated by RSG circuit 1502 to the −x qubit of a networked resource state produced by the neighboring network cell 1600' in the +x direction. The z+/− offset reconfigurable fusion circuit receives +z and −z qubits of the local resource state generated by RSG circuit 1502. The −z qubit is delayed by one clock cycle and fused with the +z qubit of the resource state generated by RSG circuit 1502 during the next clock cycle.

The connectivity shown in FIGS. 16A and 16B can be extended to any number of network cells, allowing layers of any size to be generated. (The size may be fixed in the hardware design.)

2.2.3. Rasterized Generation of Entanglement

Using fully networked RSG circuits to generate entanglement as described above provides fast computations but can be hardware intensive, particularly where the size ($L^2$) of each layer is large. In addition, the maximum size of a layer may be constrained by the available hardware. Accordingly, some embodiments employ a reduced-hardware approach, referred to herein as "rasterized" generation of entanglement, in which one instance of an RSG circuit provides multiple resource states within a single layer. In one example of "fully rasterized" generation, a single instance of an RSG circuit can be used to generate entanglement structures with layers of arbitrary size, by providing appropriate delay and fusion circuits.

Figure 17:
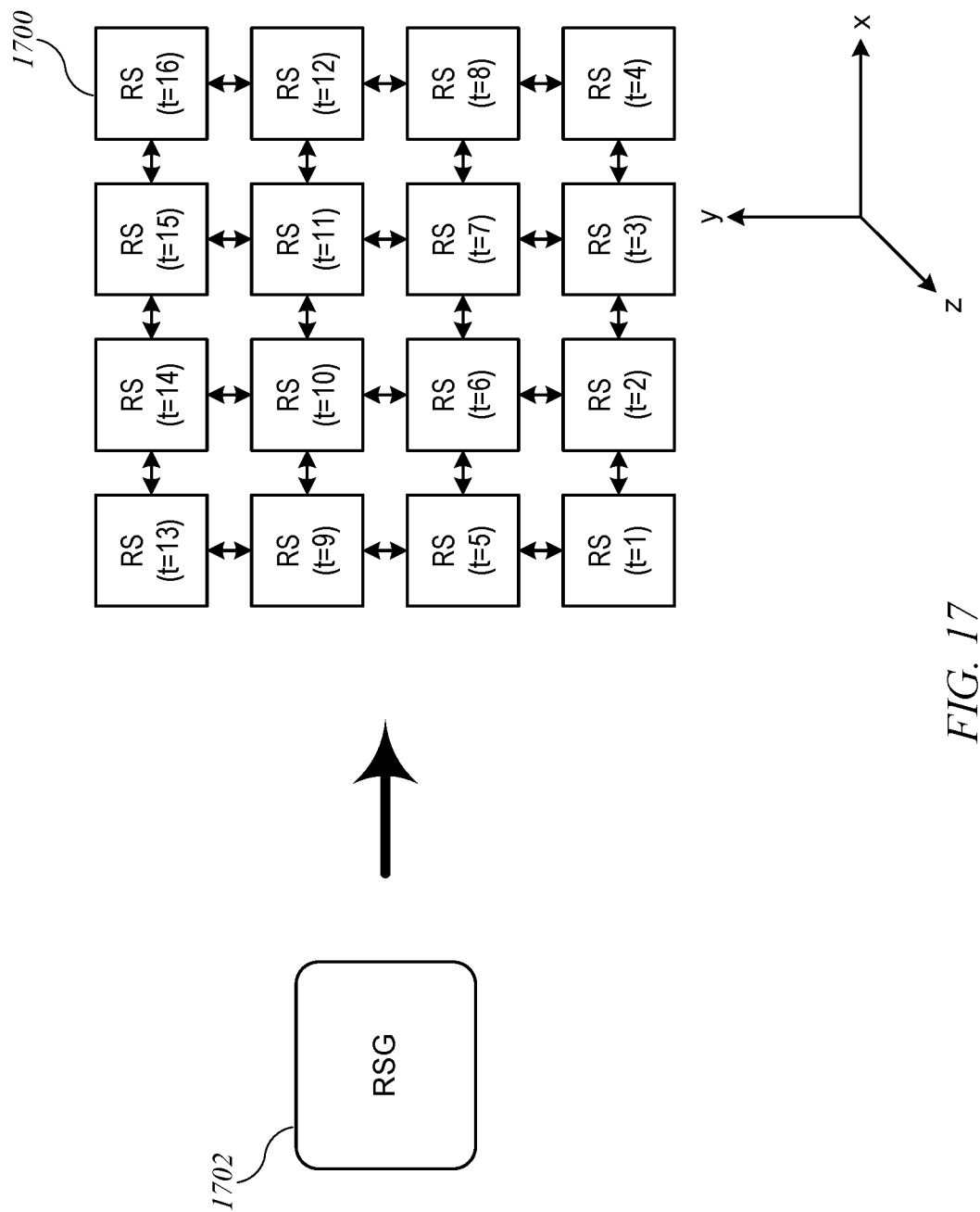
FIG. 17 shows a conceptual illustration of rasterized generation of a large entangled system of qubits according to some embodiments.

FIG. 17 shows a conceptual illustration of rasterized generation of a layer for an entanglement structure according to some embodiments. To support generation of a layer of size $L^2$, a single instance of an RSG circuit 1702 is provided. In the simplified examples used herein, $L^2=16$, but in practice $L^2$ can be much larger (e.g., ∼$10^2$, ∼$10^4$, ∼$10^6$). In each clock cycle, RSG circuit 1702 generates a single resource state, and enough resource states to form a complete 2D layer can be generated in $L^2$ clock cycles. In this example, each instance of resource state 1700 is generated in a different clock cycle, and each instance of resource state 1700 is annotated with time "t=1" to "t=16" to indicate the clock cycle during which each resource state 1700 is produced. Timelike fusion operations can be performed on qubits of neighboring resource states 1700 generated during different clock cycles (e.g., fusion operations as shown in FIGS. 11A and 11B) using additional circuitry described below. A three-dimensional entanglement structure can be generated by using the same RSG circuit 1702 to repeat the process of generating $L^2$ resource states for each layer, and timelike fusion operations can be performed on qubits of resource states 1700 in different layers (e.g., fusion operations as shown in FIGS. 12A and 12B) using additional circuitry described below.

Figure 18:
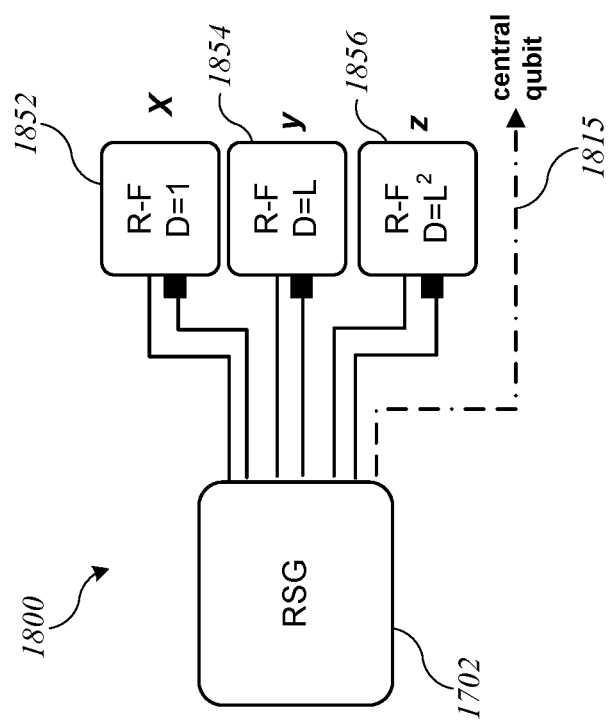
FIG. 18 shows a schematic diagram of a circuit for generating entanglement structures from resource states using a single RSG circuit according to some embodiments.

FIG. 18 shows a schematic diagram of a "fully rasterized" circuit 1800 for generating entanglement structures from resource states according to some embodiments. The circuit notation is as described above with reference to FIGS. 14A-14F except that, for clarity of illustration, classical inputs and outputs are not shown. RSG circuit 1702 produces a resource state having six peripheral qubits and optionally one or more central qubits 1815, which (if present) is (are) not subject to fusion operations. For example, if RSG circuit 1502 produces resource state 1000 of FIG. 10A, central qubit 1016 can be provided as central qubit 1815; however, if RSG circuit instead produces resource state 1040 of FIG. 10C, no central qubit 1815 is provided. Offset reconfigurable fusion circuit 1852 delays the −x qubit of each resource state output from RSG circuit 1702 by 1 clock cycle, then passes the −x qubit through a configurable switching circuit together with the (undelayed)+x qubit of the resource state output from RSG circuit 1702 in the next clock cycle, after which a fusion operation is performed on the two qubits output from the switching circuit. Offset reconfigurable fusion circuit 1854 delays the −y qubit of each resource state output from RSG circuit 1702 by L clock cycles, then passes the −y qubit through a configurable switching circuit together with the (undelayed)+y qubit of the resource state output from RSG circuit 1702 L clock cycles later, after which a fusion operation is performed on the two qubits output from the switching circuit. Offset reconfigurable fusion circuit 1856 delays the −z qubit of each resource state output by RSG circuit 1702 by $L^2$ clock cycles, then passes the −z qubit through a configurable switching circuit together with the (undelayed)+z qubit of the resource state output from RSG circuit 1702 $L^2$ clock cycles later, after which a fusion operation is performed on the two qubits output from the switching circuit.

In this example, generation of resource states by fully rasterized circuit 1800 can be understood as proceeding along rows of a layer of resource states, as shown in FIG. 17. Resource state generation and fusion operations between qubits of neighboring resource states using offset reconfigurable fusion circuit 1852 proceed along the +x direction (in the entanglement geometry) for the length (L) of one row of the layer. After completion of the first row, fully rasterized circuit 1800 continues to the next row in the +y direction, proceeding again along the +x direction to generate a second row and to perform fusion operations between (delayed)+y qubits from resource states of the first row and −y qubits from newly generated resource states of the second row using offset reconfigurable fusion circuit 1854, and so on until an entire layer is generated. Thereafter, the process can be repeated to generate a second layer and perform fusion operations between (delayed)+z qubits from resource states of the first layer and −z qubits from newly generated resource states of the second layer using offset reconfigurable fusion circuit 1856. Accordingly, any number of layers can be generated in a rasterized fashion. It should be understood that the term "rasterized" as used herein does not imply any particular physical arrangement of components, and rasterized circuit 1800 does not need to move at all in order to generate resource states corresponding to different positions in a layer. Instead, photons encoding qubits associated with different instances of resource state 1700 can propagate through the same set of waveguides at different times.

Referring again to FIG. 18, the switching circuits within offset reconfigurable fusion circuits 1852, 1854, and 1856 can be controlled to provide desired behavior at the boundaries of the array. For instance, in order to form a layer having a planar topology, the +x qubit of the resource state at the end of a given row should not be fused with the −x qubit of the next resource state (which is in a different row); instead, the +x qubit of the resource state and the end of each row and the −x qubit of the resource state at the beginning of each row may be removed from the system, which can be done, for example by measuring each qubit in the Z basis. Similar considerations apply in the y and z dimensions. Accordingly, in some embodiments, the switching circuits within offset reconfigurable fusion circuits 1852, 1854, and 1856 can be reconfigured to perform single-qubit Z measurements on the incident qubits during selected clock cycles (e.g., by selectably coupling the input modes to output modes that couple to photon detectors). For other layer topologies, different behavior can be implemented; examples are described below. In some embodiments, RSG circuit 1702 can be reconfigurable such that resource states at the end of rows do not include qubits that are not to be subject to fusion operations with qubits of other resource states.

It should be appreciated that circuit 1800 of FIG. 18 can be used to generate layers of any size. (In some embodiments, a maximum size may be fixed in the hardware design, e.g., by length of various delay lines.) A layer of size $L^2$ can be generated in $L^2$ clock cycles (assuming one resource state is produced during each clock cycle). It should also be noted that, since many photons can coexist in a delay line, as few as three physical delay lines (e.g., three optical fibers or other waveguides of lengths corresponding to delays of 1, L and $L^2$ clock cycles) are needed. More generally, the number of physical delay lines needed for a given implementation can depend on the particular structure of the resource state and dimensions of the layer. Accordingly, the hardware implementation using a fully rasterized circuit can be significantly smaller than the fully networked circuit describe above; however, the fully rasterized circuit requires a longer running time to generate and operate on a given number of resource states.

Figure 19:
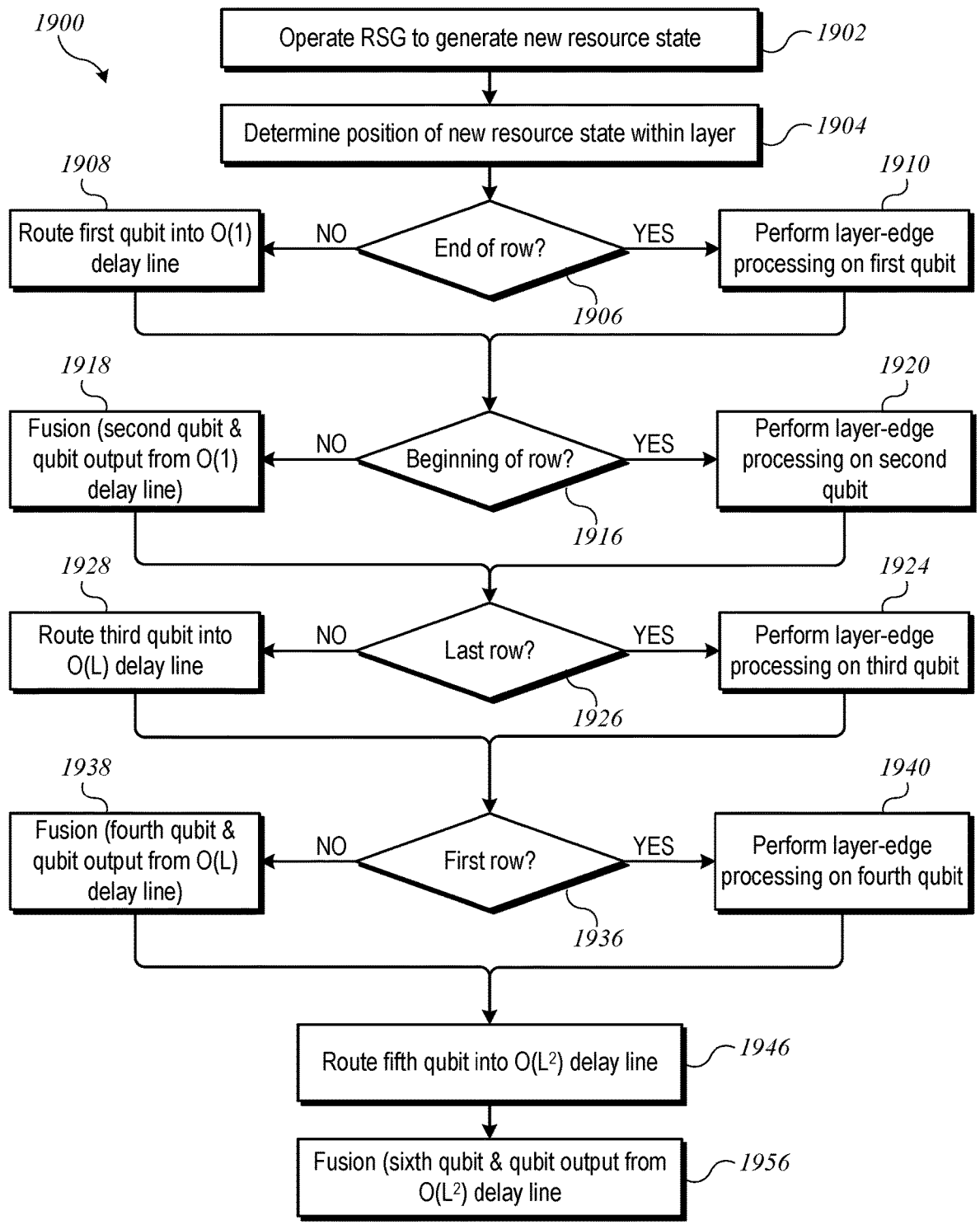
FIG. 19 shows a flow diagram of a process for generating entanglement structures from resource states according to some embodiments.

FIG. 19 shows a flow diagram of a process 1900 that can be implemented using circuit 1800 of FIG. 18 (or other circuits) according to some embodiments. Process 1900 can be performed during each clock cycle while an entanglement structure is being generated, or the duration of a clock cycle can be defined according to the time consumed in performing one iteration of process 1900. In this example, it is assumed that RSG circuit 1702 is used to generate each layer by generating one row, then the next row, and so on, as shown in FIG. 17. (As noted elsewhere in this description, it should be understood that terms such as "row," "column," and "layer" are used in reference to entanglement geometry, which need not correspond to a physical arrangement of qubits.)

At block 1902, RSG circuit 1702 (or other circuit) can be operated to generate a new resource state. In some embodiments, RSG circuit 1702 generates one new resource state for each clock cycle. At block 1904, a position (in entanglement space) of the new resource state within a layer of an entanglement structure is determined. For example, a row-position counter can be incremented at each clock cycle to count positions within a row (e.g., from 1 to L, where L corresponds to the size of a row) and reset at the end of each row, and a column-position counter can be incremented as each row is completed (e.g., every L clock cycles or when the row-position counter is reset) and reset when the layer is complete (e.g., after completing L rows). The current counter values can thus indicate the position of the new resource state within the layer. Other techniques for defining a current position in entanglement space can be used.

At block 1906, a determination is made as to whether the current position corresponds to the end of a row (e.g., whether the row-position counter has value L). If not, then at block 1908, a first qubit of the new resource state is routed into an "O(1)" delay line that imposes a delay on the order of one clock cycle, such as the delay line of offset reconfigurable fusion circuit 1852 of FIG. 18. In some embodiments, the delay line can impose a delay of exactly one clock cycle. If, at block 1906, the current position corresponds to the end of a row, then at block 1910, layer-edge processing can be performed on the first qubit. In some embodiments, layer-edge processing can include performing a measurement on the first qubit that removes the first qubit from the system without destroying entanglement of other qubits. Other options for layer edge processing are described below.

At block 1916, a determination is made as to whether the current position corresponds to the beginning of a row (e.g., whether the row-position counter has value 1). If not, then at block 1918, a fusion operation is performed on the second qubit of the new resource state and a qubit output from the O(1) delay line; for instance, offset reconfigurable fusion circuit 1852 can perform a fusion operation on the second qubit of the new resource state and the qubit that was routed into the O(1) delay line of offset reconfigurable fusion circuit 1852 during the previous clock cycle. If, at block 1916, the current position corresponds to the beginning of a row, then at block 1920, layer-edge processing can be performed on the second qubit. In some embodiments, layer-edge processing can include performing a measurement on the second qubit that removes the second qubit from the system without destroying entanglement of other qubits. Other options for layer edge processing are described below.

At block 1926, a determination is made as to whether the current position corresponds to the last row of the layer (e.g., whether the column-position counter has value L). If not, then at block 1928, a third qubit of the new resource state is routed into an "O(L)" delay line that imposes a delay on the order of L clock cycles, such as the delay line of offset reconfigurable fusion circuit 1854 of FIG. 18. In some embodiments, the O(L) delay line can impose a delay of exactly L clock cycles. If, at block 1926, the current position corresponds to the last row of the layer, then at block 1930, layer-edge processing can be performed on the third qubit. In some embodiments, layer-edge processing can include performing a measurement on the third qubit that removes the third qubit from the system without destroying entanglement of other qubits.

At block 1936, a determination is made as to whether the current position corresponds to the first row of the layer (e.g., whether the column-position counter has value 1). If not, then at block 1938, a fusion operation is performed on a fourth qubit of the new resource state and a qubit output from the O(L) delay line. For instance, offset reconfigurable fusion circuit 1854 can perform a fusion operation on the second qubit of the new resource state and the qubit that was routed into the O(L) delay line of offset reconfigurable fusion circuit 1854 during a clock cycle corresponding to the same position in a previous row. If, at block 1936, the current position corresponds to the first row of the layer, then at block 1940, layer-edge processing can be performed on the fourth qubit. In some embodiments, layer-edge processing can include performing a measurement on the fourth qubit that removes the fourth qubit from the system without destroying entanglement of other qubits. Other options for layer edge processing are described below.

At block 1946, a fifth qubit of the new resource state can be routed into an "$O(L^2)$" delay line that imposes a delay on the order of $L^2$ clock cycles, such as the delay line of offset reconfigurable fusion circuit 1856 of FIG. 18. In some embodiments, the $O(L^2)$ delay line can impose a delay of exactly $L^2$ clock cycles.

At block 1956, a fusion operation can be performed on a sixth qubit of the new resource state and a qubit output from the $O(L^2)$ delay line. For instance, offset reconfigurable fusion circuit 1856 can perform a fusion operation on the second qubit of the new resource state and the qubit that was routed into the $O(L^2)$ delay line of offset reconfigurable fusion circuit 1856 during a clock cycle corresponding to the same position in a previous layer. In some embodiments, for clock cycles corresponding to generation of a first layer of an entanglement structure, the sixth qubit can instead be subject to a different operation, such as a measurement operation that removes the sixth qubit from the system without destroying entanglement of other qubits, or no operation.

Process 1900 is illustrative, and variations and modifications are possible. For instance, while the various decisions and routing operations are shown as sequential, some or all of these operations can be performed in parallel or in a different order from that described. Fusion operations can be replaced with other entangling measurement operations that create entanglement between two systems of qubits. The particular length of the various delay lines can be varied, and delay lines of different lengths can be used when generating different positions within a layer, depending on the desired entanglement structure. Process 1900 can be repeated for any number of clock cycles to generate an entanglement structure having any number of layers of any desired size. Layer-edge processing (also referred to herein as boundary processing) can include measuring the qubit at the edge (or boundary) of the layer. In some embodiments, layer-edge processing can also include performing fusion operations or other entangling operations on qubits at different edges of the same layer or qubits at the edges of different layers; examples are described below.

2.2.4. Hybrid Generation of Entanglement

Embodiments described in Sections 2.2.2 and 2.2.3 represent extreme examples of a design tradeoff between hardware size and computing speed. Other embodiments provide a "hybrid" approach to generating entanglement structures, thereby balancing between hardware size and computing speed. In the hybrid approach, a layer of resource states of size $L^2$ is generated using a number (N) of RSG circuits, where N is greater than 1 but less than $L^2$.

Two different example implementations of a hybrid approach will be described: "raster-based hybrid" circuits and "patch-based hybrid" circuits. In both implementations, a layer of resource states can be regarded as a two-dimensional array of "patches" of contiguous groupings of resource states. For example, if the layer is of size $L^2$, the layer can be regarded as a two-dimensional array of patches of size $P^2$. In a raster-based hybrid approach, the number N of RSG circuits can be $N=L^2/P^2$ and each RSG circuit provides resource states for a different patch, allowing N patches to be generated in parallel; in some embodiments a layer can be completed in $P^2$ clock cycles. In a patch-based hybrid approach, the number N of RSG circuits can be $N=P^2$, and the RSG circuits are used together (similarly to the fully networked unit cells described in Section 2.2.2) to generate a patch in as little as one clock cycle; generation of the layer can be completed in N clock cycles.

Figure 20:
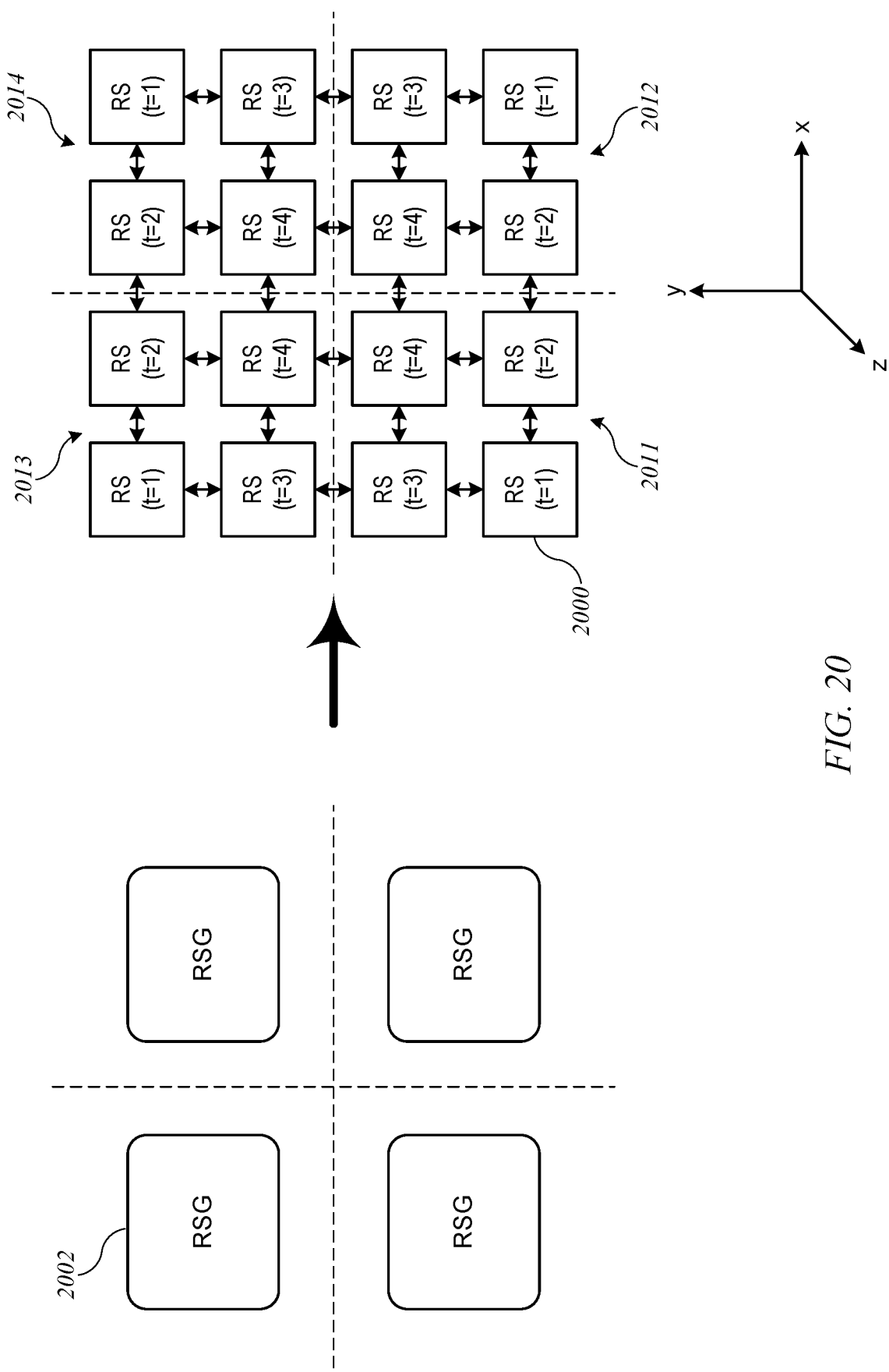
FIG. 20 shows a conceptual illustration of raster-based hybrid generation of an entanglement structure from resource states according to some embodiments.

Turning first to raster-based hybrid circuits, FIG. 20 shows a conceptual illustration of raster-based hybrid generation of an entanglement structure from resource states according to some embodiments. To support generation of a layer of size $L^2$, a number N of RSG circuits 2002 is provided. In the simplified examples used herein, $L^2=16$ and $N=4$, but in practice $L^2$ can be much larger (e.g., $\sim 10^2$, $\sim 10^4$, $\sim 10^6$). N can also be much larger (e.g., $\sim 100$, $\sim 1000$), and $L^2/N$ can be chosen as desired, depending on the desired balance between hardware size and speed of operation. In each clock cycle, each RSG circuit 2002 generates one instance of resource state 2000 so that a total of N resource states are generated. Enough resource states to complete 2D layer can be generated in $L^2/N$ clock cycles. In this example, each instance of resource state 2000 is annotated with time "t=1" to "t=4" to indicate the clock cycle during which that instance of resource state 2000 is produced. In this example, one resource state 2000 is produced for each of four patches 2011-2014 during each clock cycle. Timelike fusion operations similar to those described in Section 2.2.3 above with reference to rasterized generation of a layer can be performed on qubits of neighboring resource states within the same one of patches 2011-2014, and additional fusion operations described below can be performed on qubits of neighboring resource states across patch boundaries (e.g., fusion operations as shown in FIGS. 11A and 11B). A complete layer of size $L^2$ can be generated in $L^2/N$ clock cycles. A three-dimensional entanglement structure can be generated by using the same RSG circuits 2002 to repeat the process of generating patches for each layer, and timelike fusion operations can be performed on qubits of resource states 2000 in different layers (e.g., as shown in FIGS. 12A and 12B) using additional circuitry described below. A three-dimensional entanglement structure can be generated by using the same N RSG circuits 2002 to repeat the process of generating $L^2$ resource states for each, and timelike fusion operations can be performed on qubits of resource states 1700 in different layers (e.g., fusion operations as shown in FIGS. 12A and 12B) using additional circuitry described below.

Figure 21:
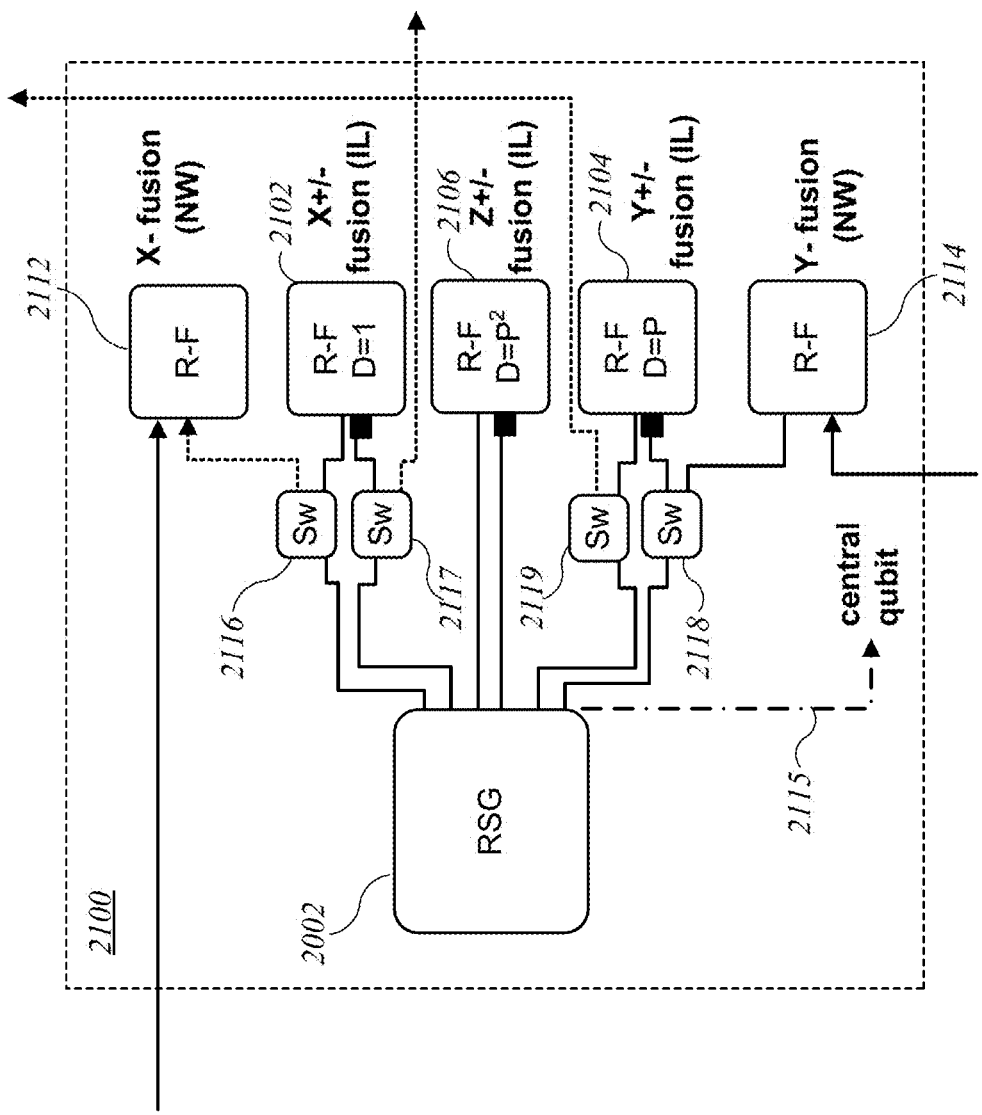
FIG. 21 shows a circuit diagram of a raster-based hybrid unit cell for generating entanglement structures from resource states according to some embodiments.

FIG. 21 shows a schematic circuit diagram of a "raster-based" hybrid unit cell 2100 for generating entanglement structures from resource states according to some embodiments. The circuit notation is as described above with reference to FIGS. 14A-14F except that, for clarity of illustration, classical inputs and outputs are not shown. In this example, hybrid unit cell 2100 generates a contiguous patch of size $N=P \times P$ (where $P < L$) over a series of $P^2$ clock cycles, and N instances of hybrid unit cell 2100 can be networked to generate a full layer of the LES. Accordingly, some aspects of hybrid unit cell 2100 can be similar to fully rasterized circuit 1800 described above while other aspects can be similar to fully networked cells 1600 described above. Each hybrid unit cell 2100 includes an RSG circuit 2002 that produces a resource state having six peripheral qubits and optionally one or more central qubits 2115, which (if present) is (are) not subject to fusion operations. For example, if RSG circuit 2002 produces resource state 1000 of FIG. 10A, central qubit 1016 can be provided as central qubit 2115; however, if RSG circuit instead produces resource state 1040 of FIG. 10C, no central qubit 2115 is provided. Offset reconfigurable fusion circuits 2102, 2104, 2106 can operate similarly to offset reconfigurable fusion circuits 1852, 1854, 1856 of FIG. 18 to create entanglement between locally generated resource states within a patch. In addition, to create entanglement between the patch generated by hybrid unit cell 2100 and patches generated by neighboring instances of hybrid unit cell 2100, additional "networked" reconfigurable fusion circuits 2112, 2114 can be provided. Reconfigurable fusion circuits 2112, 2114 can operate similarly to reconfigurable fusion circuits 1620 and 1630 in network cell 1600 of FIG. 16A to perform fusion operations on a qubit of a locally generated resource state and a qubit of a networked resource state received from a neighboring instance of hybrid unit cell 2100. Routing switches 2116-2119 can be reconfigurable switching circuits that are operated to selectably route the +x, −x, +y, and −y qubits of a particular resource state to one of circuits 2102, 2104 (to be used in a fusion operation with a qubit of a different resource state generated by the same RSG circuit 2002) or to one of fusion circuits 2112, 2114 (to be used in a fusion operation with a qubit of a resource state generated by a neighboring instance of hybrid unit cell 2100).

Figure 22:
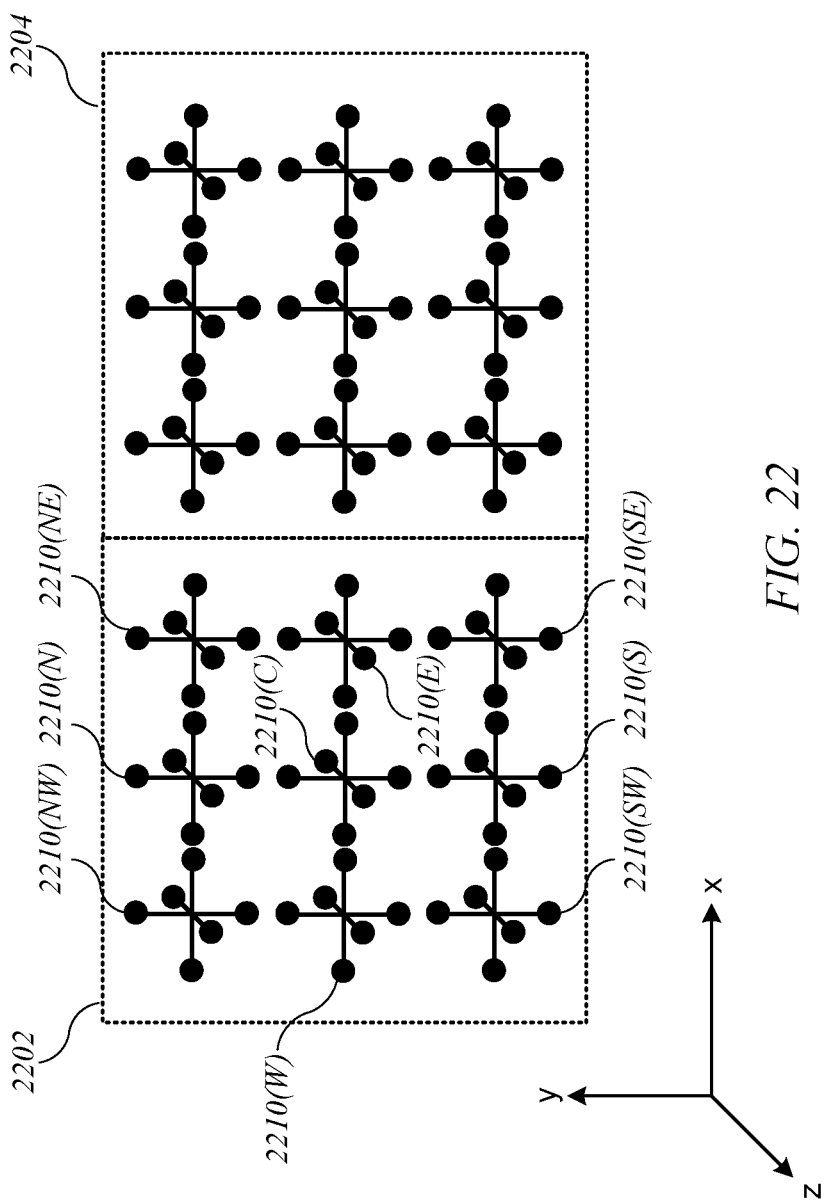
FIG. 22 shows a conceptual illustration of two adjacent patches for a layer according to some embodiments.

To further illustrate operation of routing switches 2116, FIG. 22 shows a conceptual illustration of two adjacent patches 2202, 2204 according to some embodiments. Patches 2202, and 2204 are produced by two different instances of hybrid unit cell 2100. In this example, each instance of hybrid unit cell 2100 produces a patch of size $P^2=9$. Each instance of resource state 2210 in patch 2202 is labeled with a directional indicator (NW, N, NE, E, SE, S, SW, W, or C) to indicate position within the patch. Hybrid unit cell 2100 can generate the resource states in patch 2202 by proceeding across the bottom row in the +x direction, then proceeding across the next row in the +y direction, and so on. Routing switches 2116-2119 can be operated such that for resource state 2210(C), all x and y qubits are routed to "local" offset reconfigurable fusion circuits 2102, 2104 to be fused with qubits of other local resource states generated within hybrid unit cell 2100. For resource state 2210(E) of FIG. 22, routing switches 2116-2119 can be operated such that the +x qubit is routed to a networked reconfigurable fusion circuit 2112 to be fused with a −x qubit of a resource state generated within a neighboring instance of unit cell 2100 while all other x and y qubits are routed to local fusion circuits 2102, 2104. For resource state 2210(NE) of FIG. 22, routing switches 2116-2119 can be operated such that the +x and +y qubits are routed to networked fusion circuits 2112, 2114 to be fused with qubits of resource states from neighboring instances of unit cell 2100 while the −x and −y qubits are routed to local fusion circuits 2102, 2104. Similar logic applies to the other instances of resource state 2210 and can be extended to patches of any size. In this example, a given instance of unit cell 2100 generates the same patch within each layer, and routing switches for the z qubits are not needed because the +z and −z qubits can be always routed to offset reconfigurable fusion circuit 2106. It should be understood that this configuration is not required and that other embodiments of a hybrid unit cell may include routing switches for the z qubits.

Figure 23:
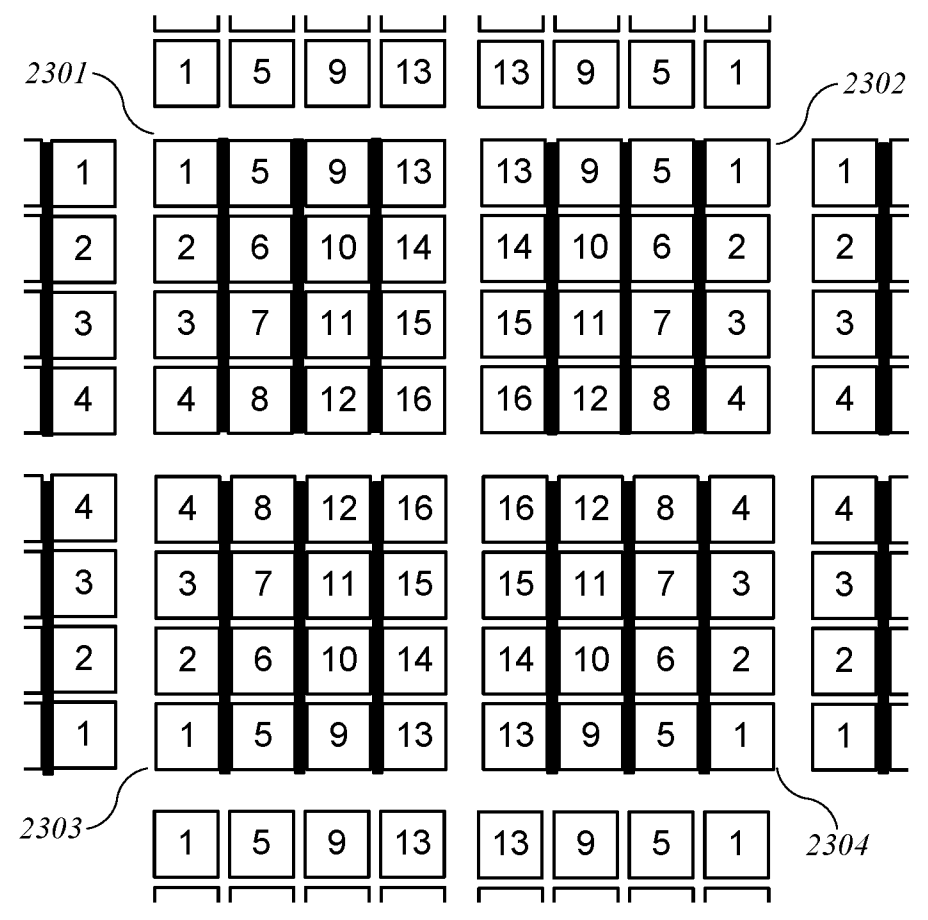

In the embodiment of hybrid unit cell 2100 shown in FIG. 21, qubits that are provided to (or received from) neighboring unit cells are not subject to delay circuits. Accordingly, it may be desirable to coordinate the order in which resource states are generated in different unit cells so that a resource state having qubits that are provided to a neighboring unit cell as input to a networked fusion circuit 2112, 2114 are produced during the same clock cycle as the neighboring resource state(s). FIG. 23 shows an example of a coordinated order of generation of resource states for different patches 2301-2304 according to some embodiments. In this example, the size of each patch 2301-2304 is 4×4. Within each patch 2301-2304, numbers (1-16) show the order of resource state generation, and all resource states with the same number are generated in the same clock cycle. As can be seen, in every instance where a resource state in one patch is to be provided to a networked fusion circuit associated with an adjacent patch, both resource states (or all four resource states in the central location where patches 2301-2304 all adjoin) are generated in the same clock cycle. Accordingly, no position-dependent delay is needed in order to perform fusion operations on qubits of resource states generated in different patches. This principle can be extended to P×P patches for any value of P and to any number of patches. In other embodiments, position-dependent delay circuits and switches can be provided to synchronize qubits between different patches.

Figure 24:
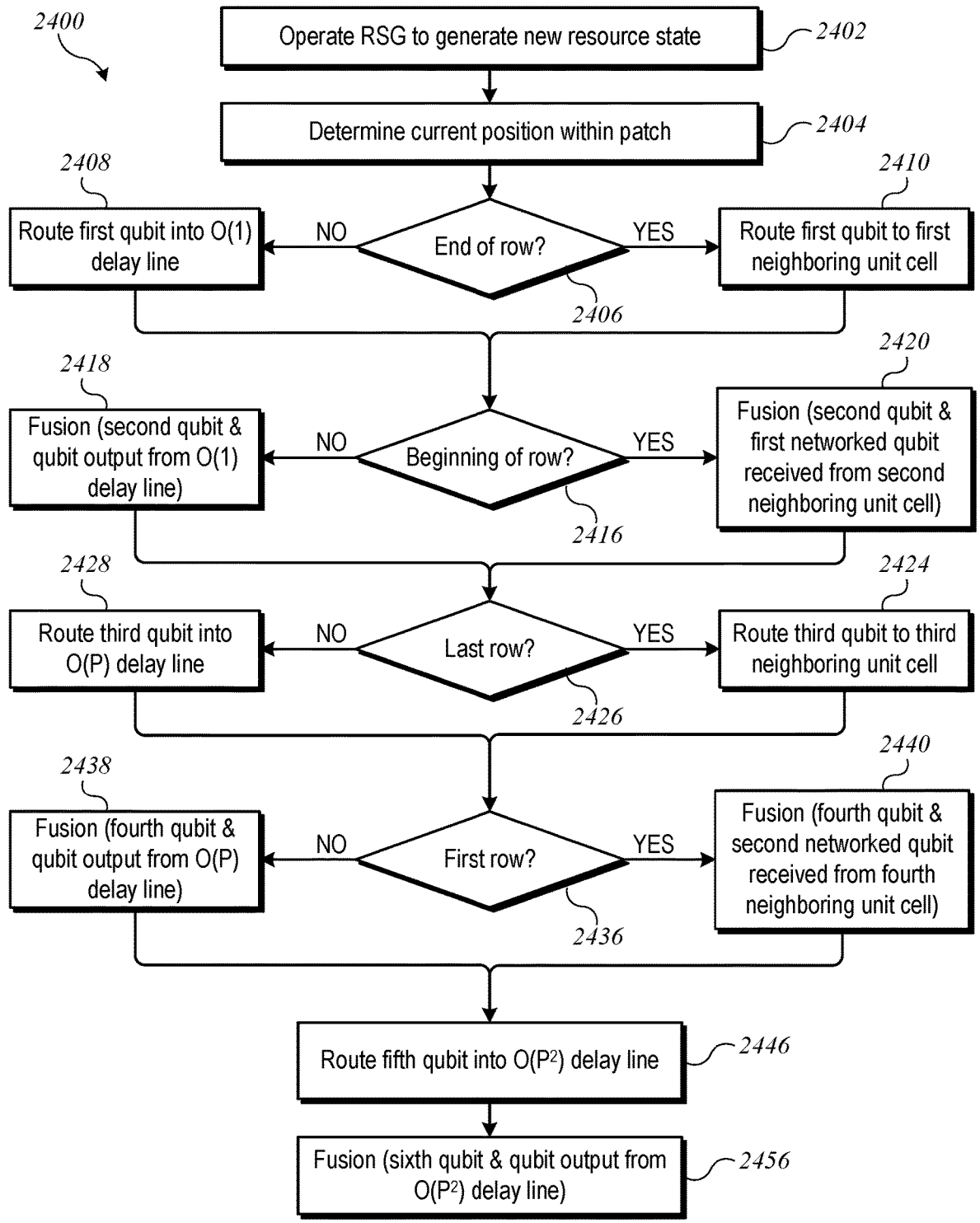
FIG. 24 shows a flow diagram of another process for generating entanglement structures from resource states according to some embodiments.

FIG. 24 shows a flow diagram of a process that can be implemented using hybrid unit cells 2100 of FIG. 21 or similar circuits according to some embodiments. Process 2400 can be performed by each hybrid unit cell 2100 at each clock cycle while an entanglement structure is being generated, with different hybrid unit cells 2100 operating in parallel. In this example, it is assumed that hybrid unit cells 2100 are used to generate layers of an entanglement structure and that each hybrid unit cell generates a contiguous patch having dimensions P×P within each layer. Each hybrid unit cell generates its patch by generating one row, then the next row, and so on (e.g., as shown for each of patches 2301-2304 in FIG. 23). (As noted elsewhere in this description, it should be understood that terms such as "row," "column," and "layer" are used in reference to entanglement space, which need not correspond to a physical arrangement of qubits or hybrid unit cells.)

At block 2402, RSG circuit 2002 (or other circuit) can be operated to generate a new resource state. In some embodiments, RSG circuit 2002 generates one new resource state for each clock cycle. At block 2404, a position of the new resource state within the patch being generated by the hybrid unit cell is determined. For example, a row-position counter can be incremented each clock cycle to count positions within a row (e.g., from 1 to P, where P corresponds to the size of a row within a patch) and reset at the end of each row, and a column-position counter can be incremented as each row is completed (e.g., every P clock cycles) and reset when the patch is complete (e.g., after completing P rows). The current counter values can thus indicate the position of the new resource state within the patch. Other techniques for defining a current position in entanglement space can be used.

At block 2406, a determination is made as to whether the current position corresponds to the end of a row of the patch (e.g., whether the row-position counter has value P). If not, then at block 2408, a first qubit of the new resource state is routed into an O(1) delay line that imposes a delay on the order of one clock cycle, such as the delay line of offset reconfigurable fusion circuit 2102 of FIG. 21. In some embodiments, the O(1) delay line can impose a delay of exactly one clock cycle. If, at block 2406, the current position corresponds to the end of a row of the patch, then at block 2410, the first qubit can be routed (e.g., by operation of switch 2117 of FIG. 21) to a first neighboring unit cell.

At block 2416, a determination is made as to whether the current position corresponds to the beginning of a row of the patch (e.g., whether the row-position counter has value 1). If not, then at block 2418, a fusion operation is performed on the second qubit of the new resource state and a qubit output from the O(1) delay line (which can be a qubit that was routed into the O(1) delay line during a previous clock cycle), e.g., using offset reconfigurable fusion circuit 2102 of FIG. 21. If, at block 2416, the current position corresponds to the beginning of a row, then at block 2420, a fusion operation can be performed on the second qubit of the new resource state and a first networked qubit received from a second neighboring unit cell. Assuming the second neighboring unit cell is also performing process 2400, the first networked qubit can be a qubit that was routed from the second neighboring unit cell according to block 2410.

At block 2426, a determination is made as to whether the current position corresponds to the last row of the patch (e.g., whether the column-position counter has value P). If not, then at block 2428, a third qubit of the new resource state is routed into an O(P) delay line that imposes a delay on the order of P clock cycles. In some embodiments, the O(P) delay line can impose a delay of exactly P clock cycles. If, at block 2426, the current position corresponds to the last row of the patch, then at block 2430, the third qubit can be routed (e.g., by operation of switch 2118 of FIG. 21) to a third neighboring unit cell.

At block 2436, a determination is made as to whether the current position corresponds to the first row of the patch (e.g., whether the column-position counter has value 1). If not, then at block 2438, a fusion operation is performed on a fourth qubit of the new resource state and a qubit output from the O(P) delay line (which can be a qubit that was routed into the O(P) delay line during a clock cycle corresponding to a position in a previous row). If, at block 2436, the current position corresponds to the first row of the patch, then at block 2440, a fusion operation can be performed on the fourth qubit of the new resource state and a second networked qubit received from a fourth neighboring unit cell. Assuming the fourth neighboring unit cell is also performing process 2400, the second networked qubit can be a qubit that was routed from the fourth neighboring unit cell according to block 2430.

At block 2446, a fifth qubit of the new resource state can be routed into an $O(P^2)$ delay line that imposes a delay on the order of $P^2$ clock cycles. In some embodiments, the $O(P^2)$ delay line can impose a delay of exactly $P^2$ clock cycles.

At block 2456, a fusion operation can be performed on a sixth qubit of the new resource state and a qubit output from the $O(P^2)$ delay line (which can be a qubit that was routed into the $O(P^2)$ delay line during a clock cycle corresponding to a position in a previous layer). In some embodiments, for clock cycles corresponding to generation of a first layer of an entanglement structure, the sixth qubit can instead be subject to a different operation, such as a measurement operation that removes the sixth qubit from the system without destroying entanglement of other qubits, or no operation.

Process 2400 is illustrative, and variations and modifications are possible. For instance, while the various decisions and routing operations are shown as sequential, some or all of these operations can be performed in parallel or in a different order from that described. Fusion operations can be replaced with other entangling measurement operations that create entanglement between two systems of qubits. The particular lengths of the various delay lines can be varied, and delay lines of different lengths can be used when generating different positions within a layer, depending on the desired entanglement structure. Process 2400 can be repeated for any number of clock cycles to generate an entanglement structure having any number of layers of any desired size. Further, process 2400 is described on the assumption that the unit cell executing process 2400 has four neighboring unit cells. However, this need not be the case for all unit cells (or indeed any unit cells). Accordingly, in any instance where process 2400 shows routing a qubit to a neighboring unit cell or performing an operation involving a networked qubit received from a neighboring unit cell, if an appropriate neighboring unit cell is absent, then layer-edge processing, e.g., as described above with reference to FIG. 19 or in examples below, can be substituted.

Figure 25:
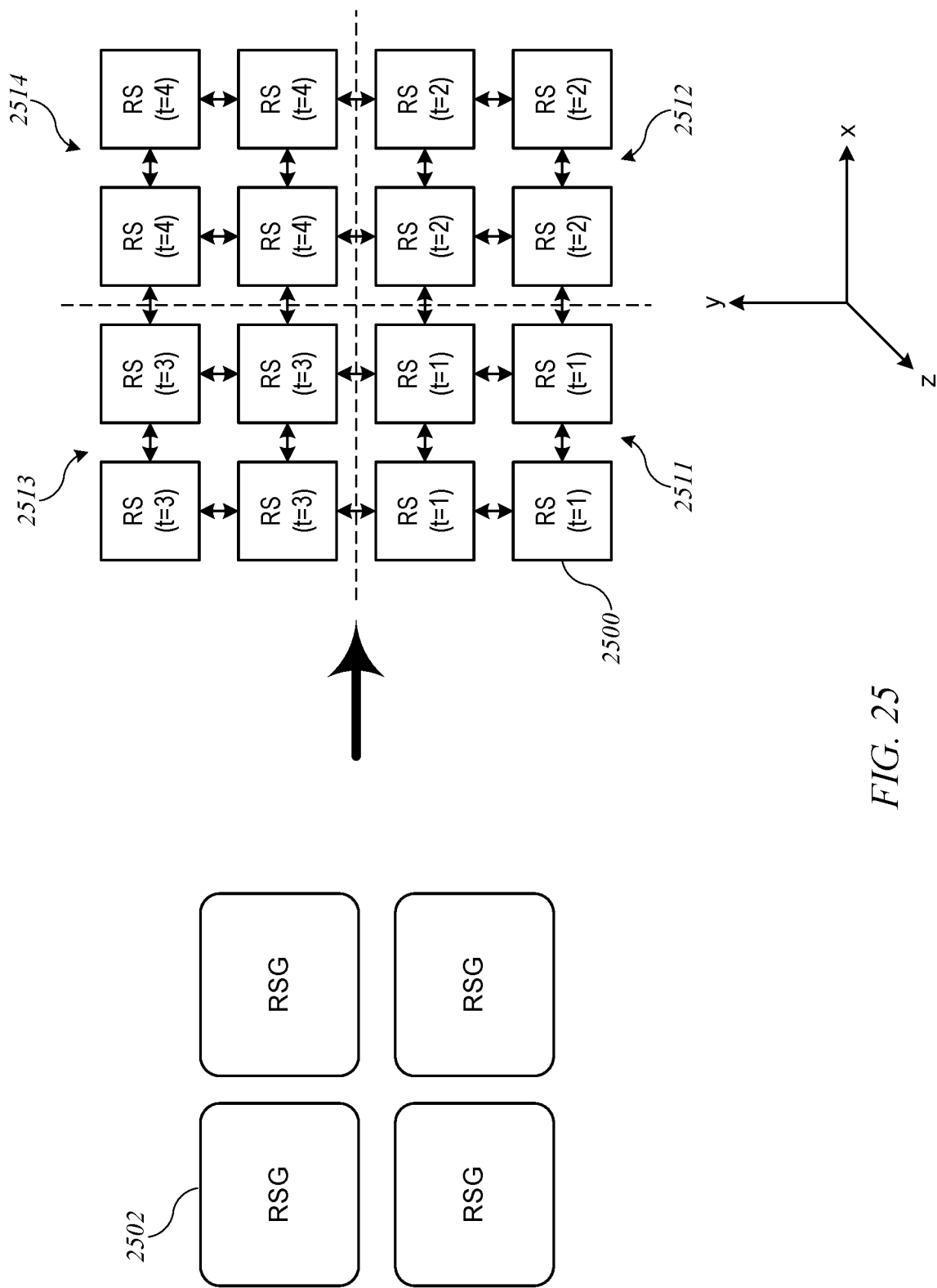
FIG. 25 shows a conceptual illustration of hybrid generation of a layer for an entanglement structure using a patch-based hybrid circuit according to some embodiments.

As noted above, in a "patch-based" hybrid circuit, the number N of RSG circuits can be $N=P^2$, and the resource states generated by the $P^2$ RSG circuits in a single clock cycle can form a (contiguous) patch of size $P^2$ within a layer of size $L^2$. FIG. 25 shows a conceptual illustration of hybrid generation of a layer for an entanglement structure using a patch-based hybrid circuit according to some embodiments. To support generation of a layer of size $L^2$, a number $N=P^2$ of RSG circuits 2002 is provided. In the simplified examples used herein, $L^2=16$ and N=4, but in practice $L^2$ can be much larger (e.g., $\sim 10^2$, $\sim 10^4$, $\sim 10^6$). N can also be much larger (e.g., $\sim 100$, $\sim 1000$), and $P^2$ can be chosen as desired, depending on the desired balance between hardware size and speed of operation. In each clock cycle, each RSG circuit 2502 generates one resource state 2500. (In FIG. 25, each resource state 2500 is annotated with time "t=1" to "t=4" to indicate which resource states 2500 are produced during each clock cycle.) As shown, patch 2511 is formed during a first clock cycle, patch 2512 during a second clock cycle, patch 2513 during a third clock cycle, and patch 2514 during a fourth clock cycle. Spacelike fusion operations can be performed on qubits of neighboring resource states 2500 within a patch (e.g., as shown in FIGS. 11A and 11B) using additional circuitry, which can be similar or identical to the fully networked circuits of FIGS. 16A and 16B. Additional timelike fusion operations can be performed on qubits belonging to resource states in different patches, e.g., using delayed offset reconfigurable fusion circuits or other circuits to "stitch" the patches together, thereby forming a layer of size $L^2$. Examples of circuits implementing fusion operations to stitch patches together into a layer are described in Section 3.3 below.

In the hybrid embodiments described above, each hybrid unit cell has its own dedicated RSG circuit. In some embodiments, operation of an RSG circuit is non-deterministic, meaning that a given instance of an RSG circuit is not expected to produce the desired resource state in every clock cycle. Accordingly, rather than a dedicated RSG circuit for each hybrid unit cell, some embodiments can provide a number (M) of RSG circuits, where M>N and M is chosen to provide a sufficiently high probability that at least N resource states will be generated during a given clock cycle. ("Sufficiently high probability" in a given implementation can be determined based on the particular implementation of fault tolerance.) Active multiplexing techniques, examples of which are known in the art, can be used to select N of the MRSG circuits on each clock cycle to deliver resource states to N different instances of the switching and fusion circuits of a hybrid unit cell. Thus, each hybrid unit cell can but need not have its own dedicated instance(s) of an RSG circuit.

It should be appreciated that an array of hybrid unit cells as shown in FIG. 21 can be used to generate entanglement structures of any size. (In some embodiments, the size may be fixed in the hardware design.) Different choices of number of RSG circuits (N) relative to layer size ($L^2$) will result in different computation times, and choices can be made to achieve a desired balance between hardware size and computational speed.

The foregoing examples of entanglement generation circuits and processes are illustrative and can be modified as desired. The use of directional labels (e.g., x, y, z, NE, SE, SW, NW, and the like) is for convenience of description and should be understood as referring to entanglement space, not as requiring or imply a particular physical arrangement of components or physical qubits. All numerical examples are for purposes of illustration and can be modified. In addition, while layers and patches are described with reference to square numbers, it should be understood that non-square layers and/or non-square patches can also be used. For example, patches or layers can be rectangular. Triangular patches or layers (or patches or layers having other shapes) can also be generated, e.g., by varying the number of resource states per row. Further, while examples described above assume that all instances of a resource state have the same entanglement pattern, such uniformity is not required. For instance, in some embodiments, a RSG circuit can be reconfigurable to generate resource states having different entanglement patterns in different clock cycles. In addition, the RSG circuit(s) may operate in a non-deterministic manner, and this may introduce stochastic variation among resource states.

3. Interleaved Generation of Entanglement Structures

Embodiments described in Section 2 support generation of entanglement structures across time. As noted above, entanglement structures can be used as logical qubits (e.g., for fault-tolerant quantum computing). In some instances, it is desirable to generate multiple entanglement structures concurrently (e.g., so that two or more logical qubits can be coupled together). One option is to provide separate hardware instances for each entanglement structure. Alternatively, some embodiments support interleaved generation of multiple entanglement structures using the same hardware.

3.1. Overview of LES Generation

Figure 26:
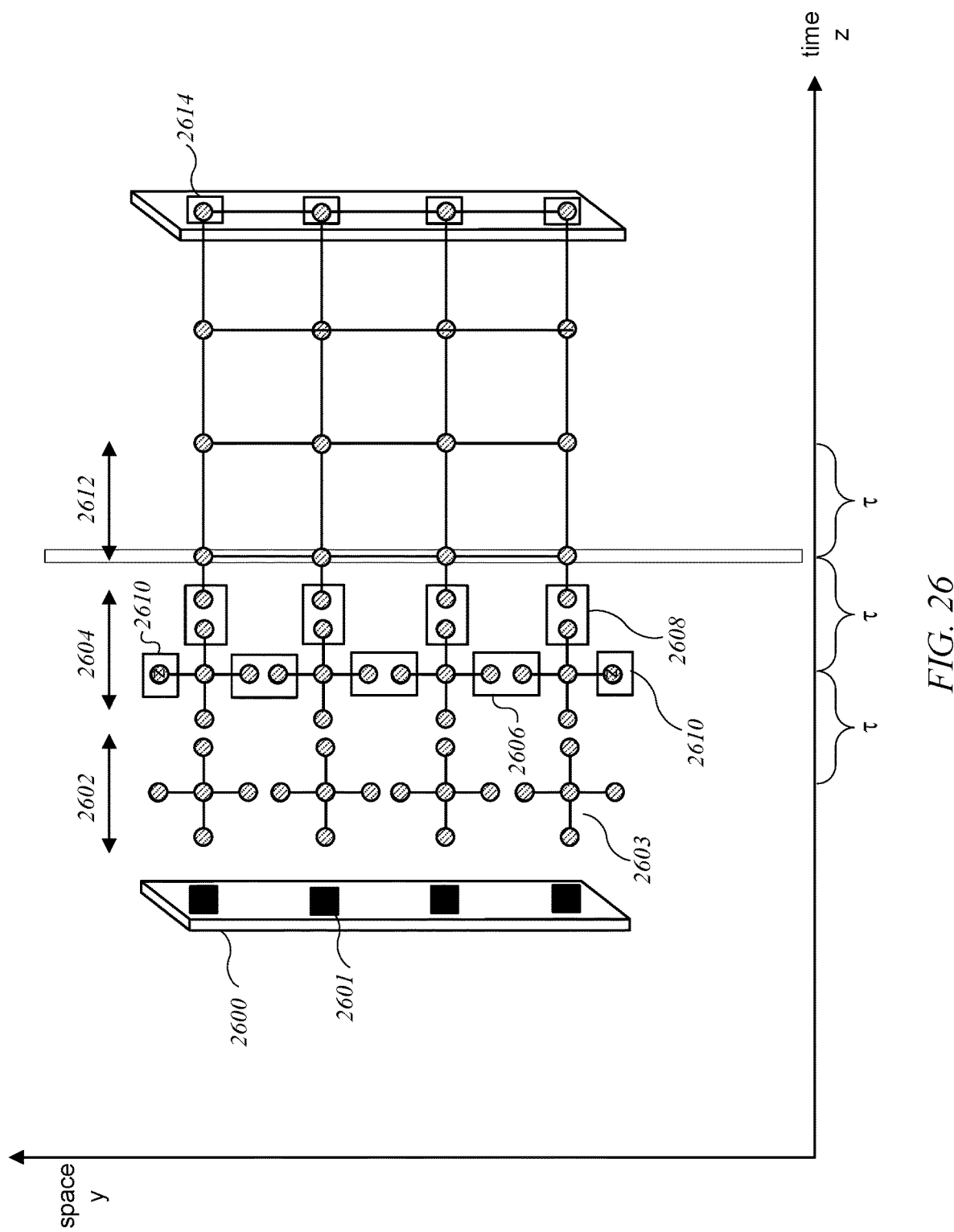
FIG. 26 shows a temporal diagram of generating a large entangled system of qubits according to some embodiments.

In some embodiments, the entanglement structure can include an LES as described above with reference to FIG. 13. FIG. 26 shows a temporal diagram of generating a photonic LES according to some embodiments. The photonic LES in this example is simplified but is similar to LESes that can be used as logical qubits. FIG. 26 should be understood as a diagram in entanglement space. For clarity of illustration, only y ("space") and z ("time") dimensions are shown so that each layer is one-dimensional; however, it should be understood that each layer can be two-dimensional or higher dimensional (in entanglement space). For convenience of description, a time step of duration $\tau$ is defined; for instance, the time step can correspond to a clock cycle (or the amount of time to generate a layer of resource states). The qubits are implemented as photons that propagate through waveguides, and at any given time photons can be present at multiple locations along a given waveguide. Accordingly, FIG. 26 can be understood as either a snapshot view showing locations of many different (physical) qubits at a single time or as a time-lapse view showing locations of the same (physical) qubits at different points in time.

Block 2600 represents resource state generators 2601 producing a complete layer of resource states 2603 (at time step 2602). In this example, it is assumed that resource states 2603 include central qubits that form an LES. In some embodiments, fully networked circuits (e.g., as described in Section 2.2.2) can be used, and time step $\tau$ can correspond to a clock cycle. In other embodiments, rasterized or hybrid network/rasterized circuits (e.g., as described in Sections 2.2.3 and 2.2.4) can be substituted, and time step $\tau$ can correspond to the time needed to generate all of the resource states for a layer (e.g., $L^2$ clock cycles or PIN clock cycles). At time step 2604, fusion operations occur, including spacelike fusion operations 2606 on neighboring physical qubits in the y dimension (and the x dimension, not shown) and timelike fusion operations 2608 to fuse neighboring qubits in successive layers. Optionally, detectors 2610 can be applied at the edges to perform a Z measurement on a peripheral qubit of the resource state at the boundary of the layer, thereby removing it from the system. At time step 2612 (and for an arbitrary number of time steps thereafter), the LES can persist pending a subsequent operation. In the example shown, the subsequent operation includes measurement operations on the qubits of the LES using detectors 2614; however, any subsequent operation performed on a LES can be independent of how the LES is generated, and a LES generated in the manner depicted in FIG. 26 can be used in a variety of operations.

Figure 27:
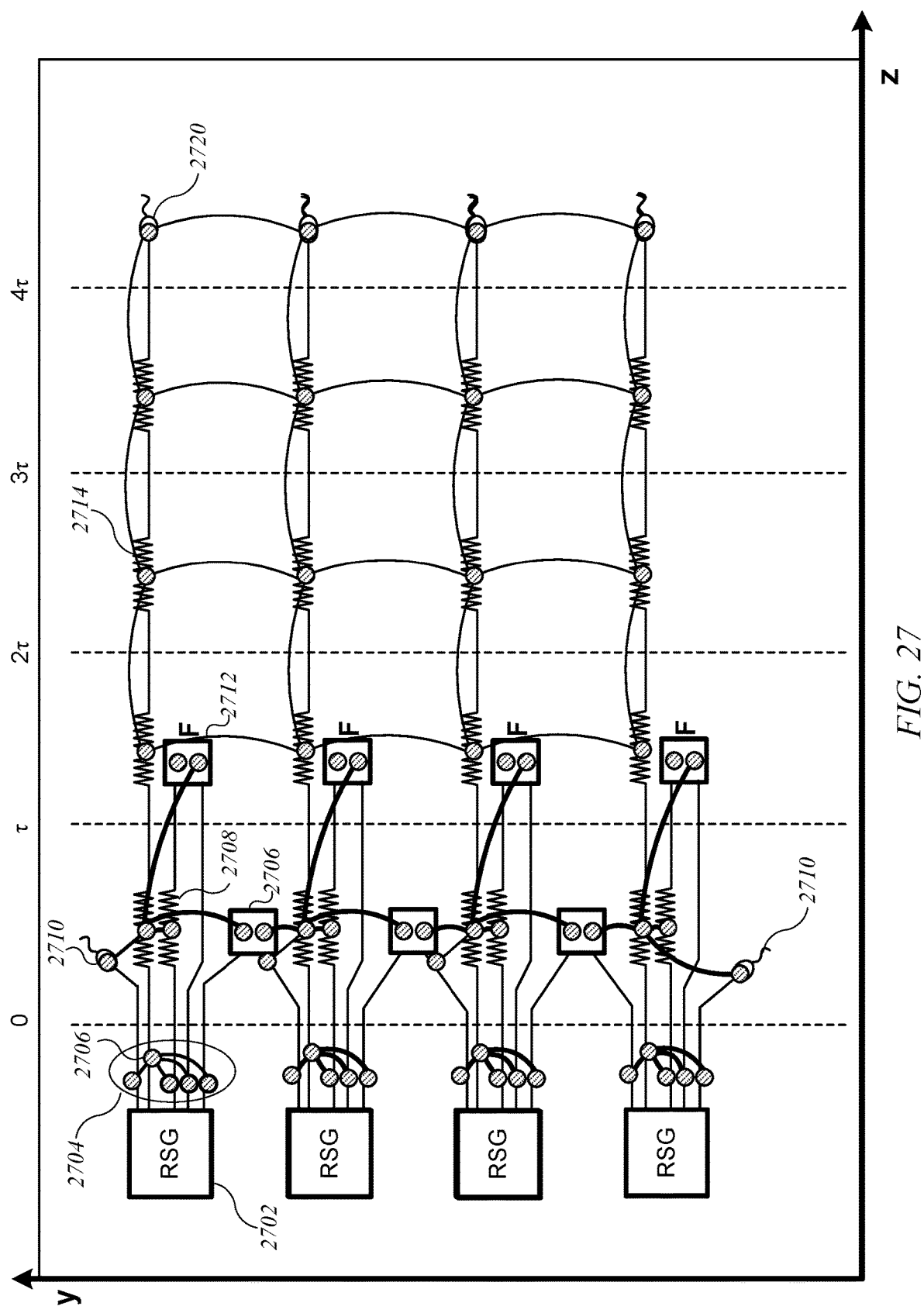
FIG. 27 shows a simplified conceptual diagram of a linear optical circuit implementing the behavior of FIG. 26 according to some embodiments.

FIG. 27 shows a simplified conceptual diagram of a linear optical circuit implementing the behavior of FIG. 26 according to some embodiments. For clarity of illustration, only y ("space") and z ("time") axes are shown; however, it should be understood that each layer can be two-dimensional (in entanglement space). At time t=0, each resource state generator 2702 outputs a resource state 2704, e.g., as described above. In this example, each resource state 2704 is shown as having five qubits (dots), including one central qubit 2706 that propagates, and peripheral qubits associated with the +y, −y, +z, and −z dimensions. Entanglement is indicated by curved lines connecting the qubits, while straight lines indicate waveguides (or groups of waveguides on which each qubit is encoded). (Although not shown, it should be understood that resource states 2704 can also include peripheral qubits associated with the +x and −x dimensions.) Between time t=0 and t=$\tau$, fusion circuits 2706 (which can be, e.g., reconfigurable type II fusion circuits as described above) perform fusion operations on peripheral qubits of neighboring resource states along the y dimension, and delay circuit 2708 delays the −z qubit of each resource state by one time step. Detectors 2710 operate at the layer boundaries to remove peripheral qubits at the edges of each layers. Between time t=$\tau$ and t=2$\tau$, fusion circuits 2712 (e.g., offset fusion circuits as described above) fuse the delayed −z qubit with the +z qubit produced by the same RSG 2702 one time step later. After time t=2$\tau$, the qubits of the LES can propagate through additional delay circuits 2714, ultimately reaching detectors 2720 (or another subsequent operation). Any number of delay circuits 2714 can be introduced, depending on the desired longevity of the LES.

3.2. Temporal Interleaving to Generate Multiple Entanglement Structures

In the examples of FIGS. 26 and 27, a single LES is generated using the circuitry shown in FIG. 27. While only a single 2-dimensional portion of the LES is shown in FIGS. 26-27, one of ordinary skill having the benefit of this disclosure will appreciate that a system that includes additional rows of RSG circuits that may be arranged in the x-direction (into or out of the page) could generate a 3-dimensional LES that can be used for fault-tolerant quantum computing. In addition, spacelike fusions shown in FIGS. 26 and 27 can be replaced by timelike fusions, and the rasterized and hybrid circuits described above can also be used to generate LESes.

In some cases, it may be desirable to use the same circuitry to provide multiple entanglement structures (including but not limited to LESes) that coexist in time (in the sense that photons of both entanglement structures are in flight, e.g., within one or more delay lines, at the same time). According to some embodiments, coexistence of multiple entanglement structures can be provided by "interleaving" the generation of layers of different entanglement structures.

Figure 28:
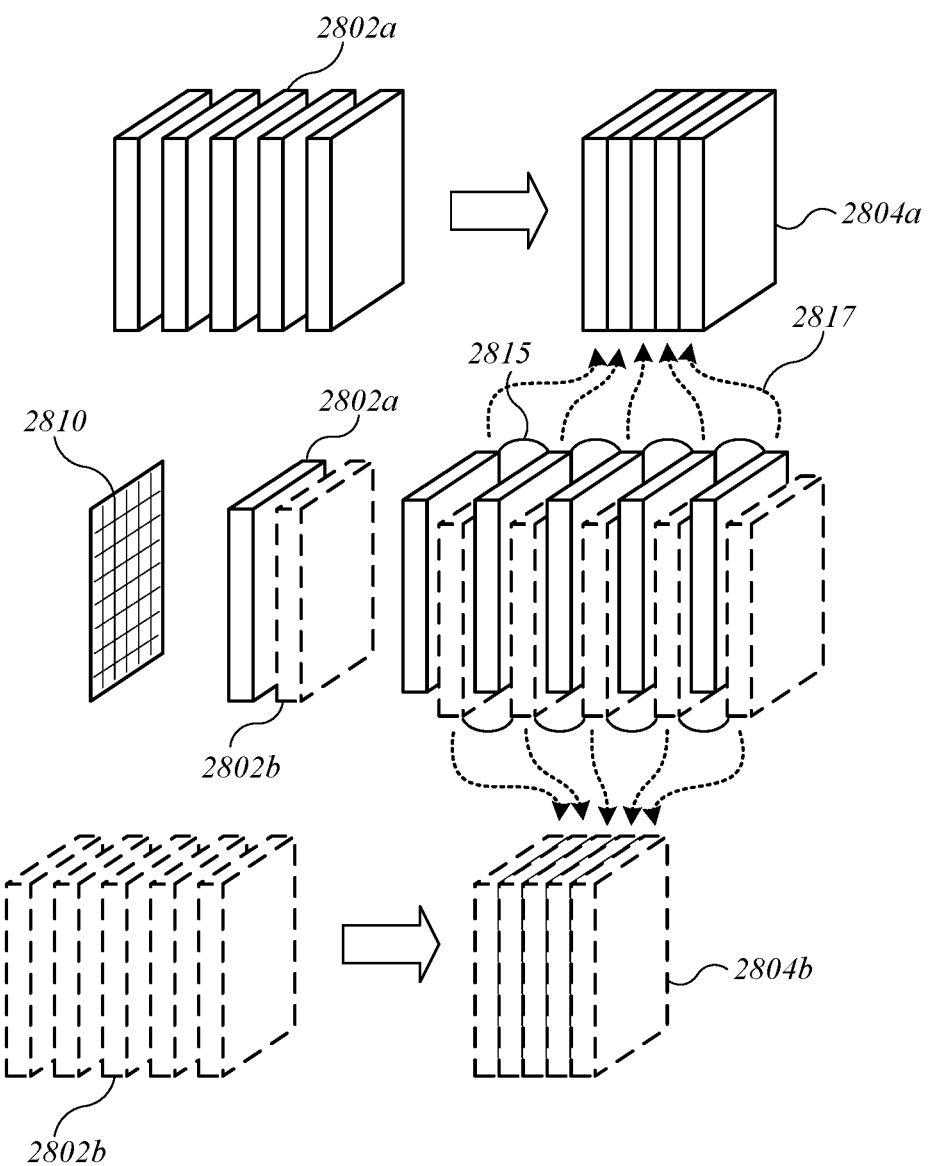
FIG. 28 shows a conceptual illustration of interleaved generation of two large entangled systems of qubits according to some embodiments.

FIG. 28 shows a conceptual illustration of interleaved generation of two entanglement structures (in this case LESes) according to some embodiments. Using techniques described above (or other techniques), layers 2802a of entangled qubits can be generated, after which qubits from different layers 2802a can be entangled (using operations such as fusion operations as described above) to produce a first LES 2804a. Similarly, layers 2802b can be generated and qubits from different layers 2802b can be entangled to produce a second LES 2804b. (Different line styles are used for LES 2804a and LES 2804b to aid in visualization.) It should be understood that, while each LES 2804a, 2804b is shown as having five layers, an LES may have any number of layers.

Interleaved generation of two LESes can involve using the same hardware to generate layers of both LESes, for instance in an alternating manner. In some embodiments, layer-generating hardware 2810 (which can be implemented using various circuits as described above, can be used to generate a layer 2802a or 2802b at each of a series of time interval. Entanglement can be created between layers generated during alternate time periods (by performing fusion operations as described above or other entanglement-creating operations), as indicated by dotted arcs 2815, while entanglement is not created between layers generated during consecutive time periods. The result is, in terms of entanglement topology, identical to LESes 2804a, 2804b, as indicated by mapping arrows 2817.

Figure 29:
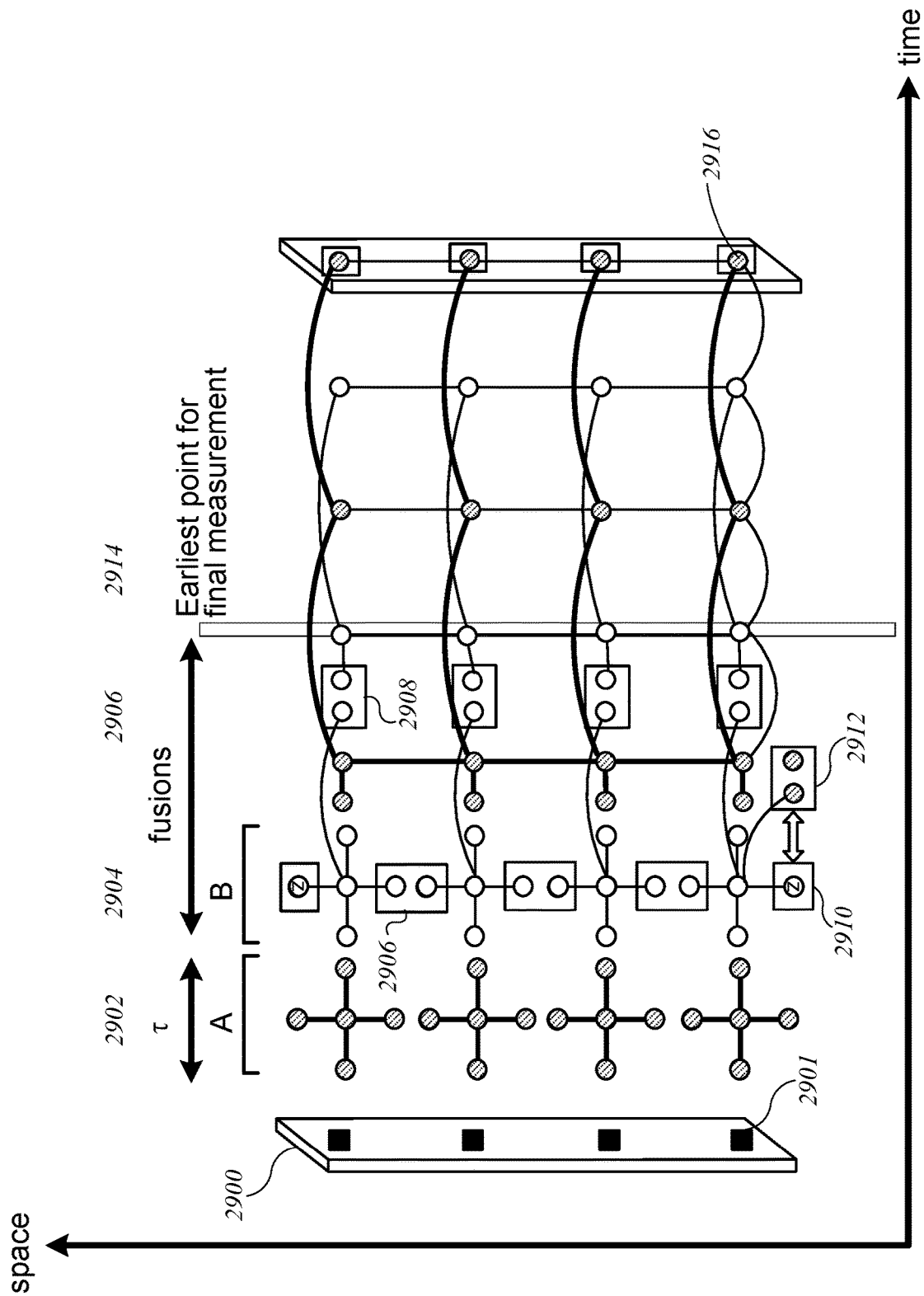
FIG. 29 shows a temporal diagram of generating two interleaved large entangled systems of qubits according to some embodiments.

FIG. 29 shows a temporal diagram of generating two interleaved LESes (and optionally entangling the two interleaved LESes with each other at the boundaries) using a single set of resource state generators and downstream circuitry according to some embodiments. FIG. 29 is similar in many respects to FIG. 26. For instance, only y and z dimensions are shown; however, it should be understood that each layer of an LES can be two-dimensional (in entanglement space). Similarly to FIG. 26, FIG. 29 can be understood as a snapshot view or as a time-lapse view.

Block 2900 represents resource state generators 2901 producing a complete set of resource states (at time step 2902) for a layer of a LES. As with FIG. 26, various techniques can be used to generate resource states for a layer, and time step τ can be defined accordingly. At time step 2904, spacelike fusions 2906 occur to fuse neighboring physical qubits in the y dimension (and the x dimension, not shown).

Unlike FIG. 26, in this example, the resource states generated at alternate time steps are associated with two different LESes. To show the association of qubits with LESes, qubits are color coded (gray circles for qubits associated with LES A, white for qubits associated with LES B). Accordingly, timelike fusions 2908 fuse two qubits from resource states that were generated two time steps apart. At the edges of the layer, boundary qubits can be removed using detector 2910. Alternatively, fusion circuit 2912 can fuse a peripheral qubit of a layer of LES B with a previously generated peripheral qubit of a layer of LES A to "stitch" the LESes together at the boundary, as described below. At time step 2914 (and for an arbitrary number of time steps thereafter), the LESes persist until a subsequent operation, which in this example includes measurement using detectors 2916.

Figure 30:
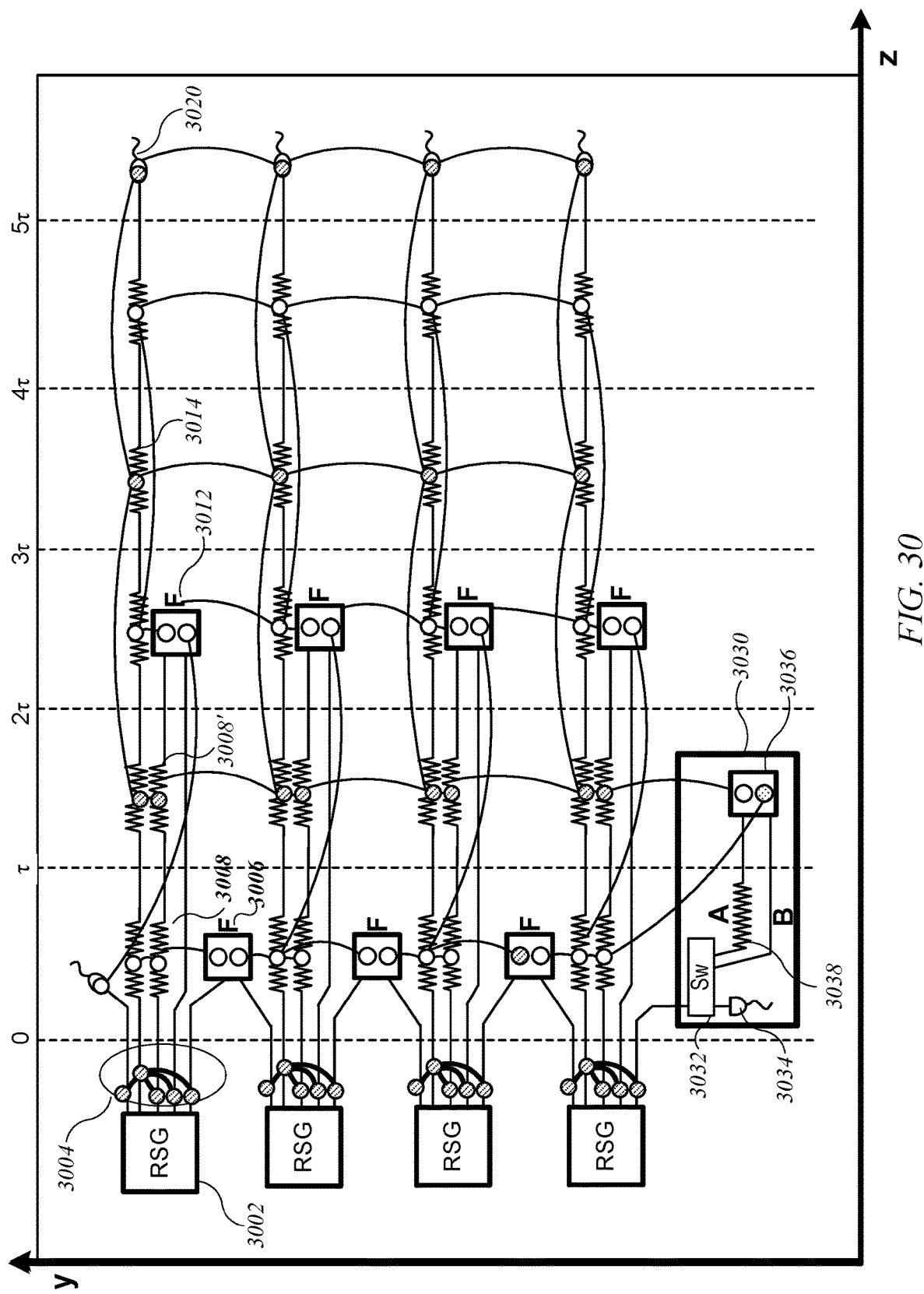
FIG. 30 shows a simplified conceptual diagram of a linear optical circuit implementing the behavior of FIG. 29 according to some embodiments.

FIG. 30 shows a simplified conceptual diagram of a linear optical circuit implementing the behavior of FIG. 29 according to some embodiments, using a notation similar to FIG. 27. At time t=0, resource state generators 3002 output resource states 3004, e.g., as described above. In this example, each resource state 3004 is shown as having five qubits, including one central qubit that propagates, and peripheral qubits associated with the +y, −y, +z, and −z dimensions. (Although not shown, it should be understood that resource states 2704 can also include peripheral qubits associated with the +x and −x dimensions.) Between time t=0 and t=τ, fusion circuits 3006 perform fusion operations on peripheral qubits of neighboring resource states along the y dimension, and delay circuit 3008 delays the −z peripheral qubit of each resource state by one time step. Between time t=τ and t=2τ, a second delay circuit 3008' delays the −z peripheral qubit of each resource state by another time step.

Between time t=2τ and t=3τ, a fusion circuits 3012 (e.g., offset fusion circuits as described above) perform fusion operations on the delayed (by 2τ) −z qubit and the +z qubit produced by the same RSG 3002 two time steps later. In this manner, entanglement can be created between layers of an LES formed during alternating time steps, thereby allowing the same hardware to generate two LESes via temporal interleaving.

After time t=3τ, the physical qubits that constitute the two LESes can propagate through additional delay circuits 3014, ultimately reaching detectors 3020 (or some other subsequent operation). Any number of delay circuits 3014 can be introduced, depending on the desired longevity of the LESes.

In some embodiments, various boundary operations can be performed on boundary qubits of the layers using a configurable boundary circuit 3030, shown as operating between time t=0 and t=2τ. Configurable boundary circuit 3030 includes a switch 3032 (similar to active switches described above) that can direct a qubit into either a detector 3034 or an offset reconfigurable fusion circuit 3036. For a given time step, if switch 3032 selects detector 3034, the boundary qubit is removed from the layer that is currently propagating between t=0 and t=2τ. If switch 3032 instead selects offset reconfigurable fusion circuit 3036, then during a first time period, a peripheral qubit associated with a layer of one LES (LES A in this example) is delayed by delay circuit 3038 and in the next time period a peripheral qubit associated with a layer of the other LES (LES B in this example) is received, and offset reconfigurable fusion circuit 3036 performs a fusion operation on the received qubit and the delayed qubit. The operation performed by offset reconfigurable fusion circuit 3036 is also referred to as "boundary stitching." In some embodiments, boundary stitching can be used to stitch patches generated during different time periods (e.g., patches generated using the patch-based hybrid approach of FIG. 25) together to form a larger layer.

It should be understood that these examples are illustrative and not limiting. Interleaving techniques are not limited to creation of LESes; similar techniques can be used where the entanglement structure is generated from resource states having no central qubits, to allow multiple entanglement structures to coexist in time or to support generation of an entanglement structure having larger layers and/or nonplanar layer topologies, examples of which are described below. The interleaving techniques described herein can be modified to provide any number of concurrent entanglement structures (2 or 3 or more), and the size of the entanglement structures can be chosen as desired. The layers of resource states used for interleaving can be generated using any of the networked, rasterized, or hybrid approaches described above, and the same RSG circuits can be used to generate the resource states for all of the entanglement structures that are being interleaved. In some embodiments, the RSG circuits can be reconfigurable so that different entanglement structures or different layers within a single entanglement structure can have entanglement geometries that differ from each other. In addition, where interleaving generates multiple entanglement structures, the different concurrently existing entanglement structures can be selectively entangled with each other using additional circuits.

3.3. Lattice Surgery

Figure 32:
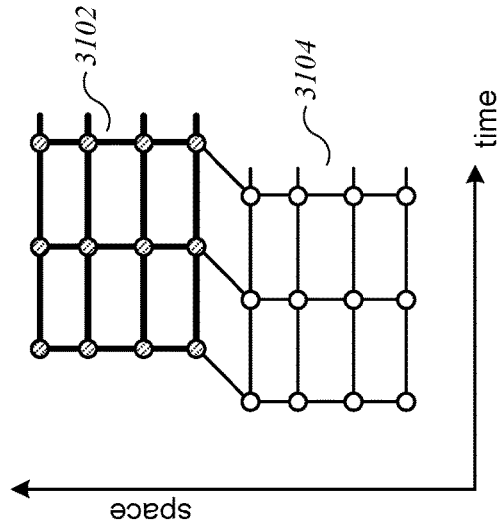
FIG. 32 shows a conceptual illustration of stitching of two large entangled systems of qubits to form a single larger entangled system of qubits according to some embodiments.
Figure 31:
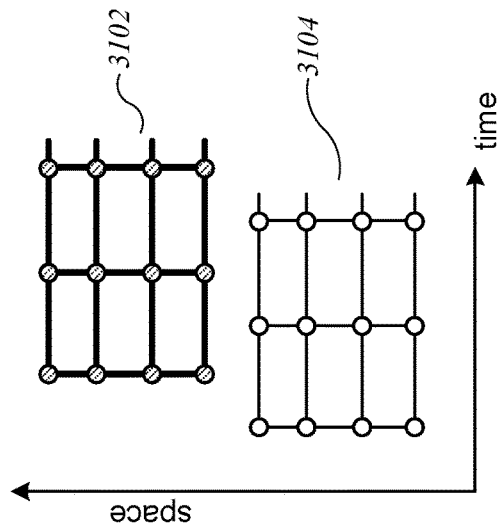
FIG. 31 shows a conceptual illustration of two large entangled system of qubits coexisting in time.

In addition to or instead of interleaved generation of multiple LESes, configurable boundary circuit 3030 and similar circuits can allow entanglement structures with a variety of layer topologies to be constructed by selectively performing fusion operations (or not) on qubits at the boundaries of the layers. Such selective boundary fusion is also referred to herein as "lattice surgery." For instance, in some embodiments, switch 3032 can be dynamically configured for each pair of time periods to support couplings (or absence of couplings between layers), also referred to as "boundary stitching." By way of example, FIG. 31 shows a conceptual illustration of two LESes 3102, 3104 coexisting in time. As in FIGS. 26 and 27, only a y dimension (vertical axis, labeled as "space" and z dimension (horizontal axis, labeled as "time") are shown, although it should be understood that each LES can be three-dimensional. A first LES 3102 and a second LES 3104 overlap in time. Layers (shown as columns since only they dimension is shown) of LESes 3102 and 3104 can be temporally offset from each other as indicated by the temporal offset of the physical qubits. For instance, the layers can be generated using interleaving techniques. In some embodiments, temporal offset can be created by generating physical qubits for LESes 3102 and 3104 during alternating time periods τ. Thus, as described above, the same hardware can be used to generate both LESes. In the example shown in FIG. 31, the first column of LES 3102 can be generated and those photons sent into a delay line. Then the first column of LES 3104 can be generated and sent into a different (or the same) delay line. Then the second column of LES 3102 can be generated and subsequently fused with the first column of LES 3102 (but not fused with the first column of LES 3104) that was being stored in the delay line, and so on. While FIGS. 31-33 show LES 2152 and LES 3104 offset in the y-direction relative to each other, it will be appreciated that interleaving allows for the same set of physical resource state generators to be generating the resource states, e.g., in alternating clock cycles, necessary to generate the respective LESes.

In some embodiments, LESes 3102 and 3104 can be coupled together, e.g., to create a single LES with a larger layer. For instance, FIG. 32 shows a conceptual illustration of "stitching" of LESes 3102 and 3104 at the boundary to form a single LES with a larger layer size, e.g., by performing fusion operations between boundary qubits at one side of the boundary of each layer. This technique can be used, for example to stitch together patches generated in a hybrid circuit at different times or to increase the size of a layer by stitching layers together.

Figure 33:
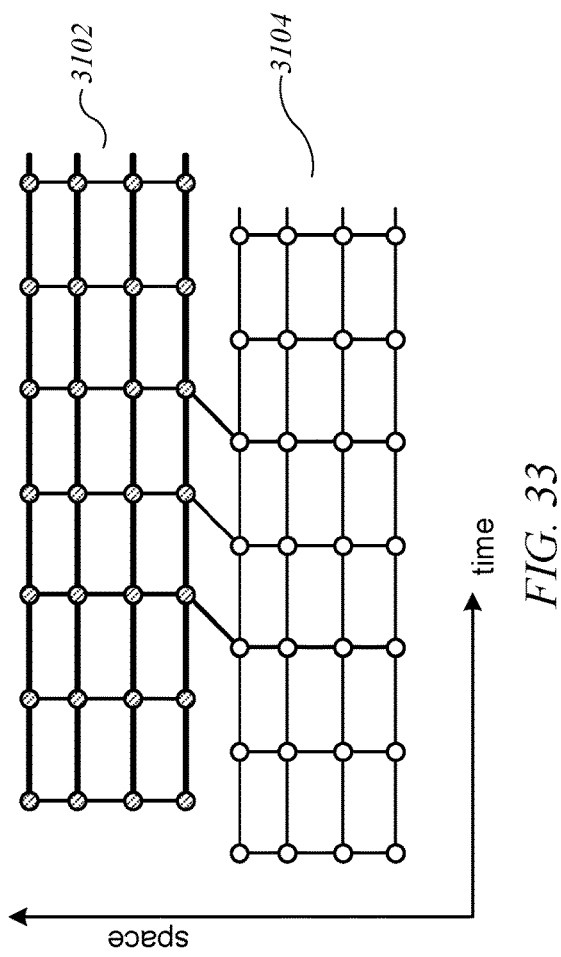
FIG. 33 shows a conceptual illustration of lattice surgery for two large entangled systems of qubits according to some embodiments.

FIG. 33 shows a conceptual illustration of selective lattice surgery, in which LESes 3102 and 3104 are selectively entangled along the boundaries of some layers but not others. Such configurations can be produced by controlling configurable boundary circuit 3030 on a per-clock-cycle basis.

In a scenario where LES 3102 and 3104 are three dimensional LESes that represent different logical qubits, the lattice surgery disclosed herein could be used to implement two-qubit logical gates between the logical qubits encoded within LES 3102 and 3104. When gates need to be applied between the interleaved logical qubits, the appropriate lattice surgery can be applied, either by altering the type of resources states being generated or by altering the types of measurements made on the individual physical qubits of the LESes. Other applications of lattice surgery are also possible. In some embodiments, fusion circuits at the boundary can be reconfigurable to change the type of lattice surgery operation.

It should also be understood that, while a simple LES is used for purposes of illustration, interleaving, boundary stitching and lattice surgery are not limited to the context of forming LESes. Any entanglement structure that can be generated from layers of resource states (including entanglement structures with no central qubits) can have its layers interleaved with one or more other entanglement structures generated in the same manner, and boundary stitching and/or lattice surgery can be performed between layers of such structures.

3.4. Interleaving to Configure Layer Topologies

In some embodiments, temporal interleaving techniques can be used to generate an entanglement structure with layers having a variety of topologies, depending on how the boundary qubits are coupled. For example, a single "folded" layer can be generated by generating two layers on successive clock cycles and stitching the layers together at the boundary using a fusion circuit, as shown in FIG. 29. FIGS. 34A-34D show a conceptual illustration of using interleaving to create a three-dimensional entanglement topology having folded layers according to some embodiments. FIG. 34A shows a layer 3400 in an xy plane in entanglement space. Layer 3400 can be a layer of resource states that have been entangled with each other using fusion operations as described above. Any of the techniques described in Section 2 or other techniques can be used to create layer 3400. FIG. 34B illustrates a "folded" topology 3410 that can be created for layer 3400. FIG. 34C illustrates an interleaving technique that can be used to create a three-dimensional entanglement structure with layers having a folded topology 3410. In FIG. 34C, time runs along the z-axis (vertical on the page). Four layers (or patches) 3411, 3412, 3413, 3414, each of which can be a portion of layer 3400, are shown in the xy plane. Each of layers (or patches 3411, 3412, 3413, 3414) can be generated by the same hardware during a different time period τ. Entanglement is created between qubits of alternating layers. For instance, as indicated by vertical lines 3420, some or all qubits of layer 3411 can be entangled with corresponding qubits of layer 3413, and as indicated by vertical lines 3422, some or all qubits of layer 3412 can be entangled with corresponding qubits of layer 3414. Fusion operations on qubits in alternating layers (time interval 2τ) can be performed, e.g., using the delay circuitry of FIG. 30.

In addition, pairs of consecutively-generated layers are "stitched" together at the boundaries, as indicated by curved lines 3416, 3418. Stitching can be implemented by creating entanglement at an edge of the layers, e.g., by performing fusion operations on boundary qubits of two layers using offset fusion circuit 3036 of FIG. 30 or similar circuits. As indicated by lines 3416, consecutively-generated layers 3411 and 3412 are stitched together, and as indicated by lines 3418, consecutively-generated layers 3413, 3414 are stitched together. FIG. 34D shows an "unfolded" view of the entanglement structure of FIG. 34C Accordingly, in some embodiments, the folded entanglement structure of FIG. 34C (or FIG. 32) can be understood as a single layer of an entanglement structure that is generated using patch-based hybrid raster/networked RSG circuits, similar to examples described above with reference to FIG. 25. For instance, in embodiments described with reference to FIG. 25, a set of $P^2$ RSG circuit can generate a patch of $P^2$ contiguous resource states in one clock cycle. In some embodiments the patches generated during different clock cycles can be stitched together at the boundaries, and interleaving techniques can be used to form larger layers in the manner shown in FIGS. 34C and 34D. In the example shown in FIGS. 34C and 34D, each patch is of size L×(L/2). However, smaller patches can be used. The size of a patch can be less than L in both (spatial) dimensions if fusion circuits are provided to perform stitching between patches along both spatial boundaries. Further, where there are more than two patches per layer, the delay associated with fusion operations between qubits of different layers can be adjusted appropriately to account for the number of patches per layer.

FIGS. 34A-34D show an entanglement structure having a planar layer topology, but other layer topologies can also be created using folding techniques. FIGS. 35A-35C are conceptual illustrations of using folding techniques to create a periodic boundary condition for a layer of an entanglement structure according to some embodiments. FIG. 35A shows a layer 3500 as a rectangle in the xy plane. FIG. 35B shows a cylindrical layer topology that can be created by performing fusion operations on boundary qubits at the +x boundary 3502 and corresponding qubits at the −x boundary 3504 of layer 3500, as indicated by curved lines 3510. As another example, FIG. 35C shows an interleaving technique that can be used to form a cylindrical layer topology by forming two layers 3522, 3524 and performing fusion operations on corresponding boundary qubits at the +x boundary (as indicted by curved lines 3526) and on corresponding boundary qubits at the −x boundary (as indicated by curved lines 3528).

Figure 36B:
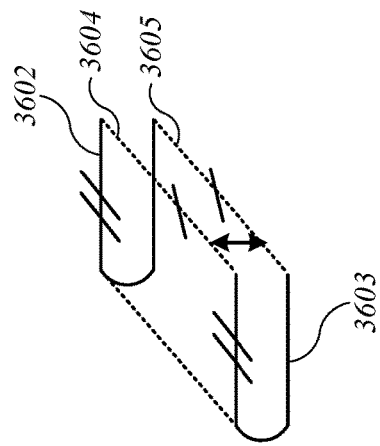
FIGS. 36A-36D are conceptual illustrations of using folding techniques to create a more complex periodic boundary condition for a layer of an entanglement structure according to some embodiments.
Figure 36D:
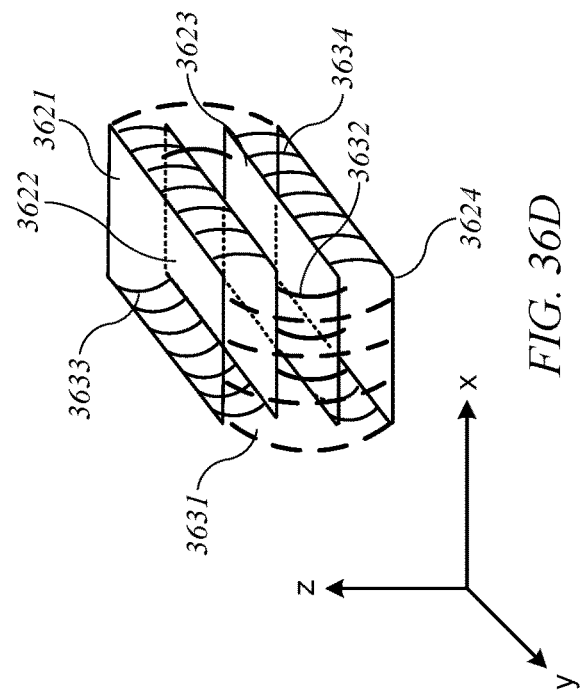
Figure 36A:
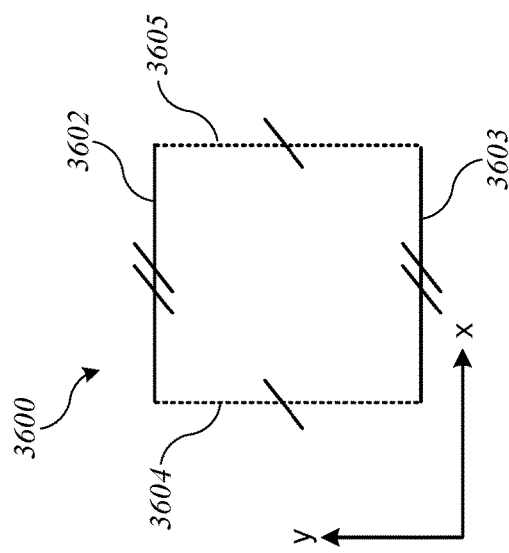
Figure 36C:
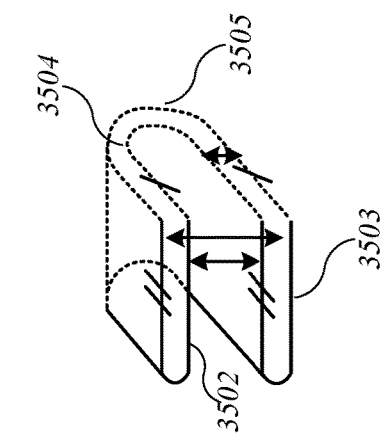

FIGS. 36A-36D are conceptual illustrations of using folding techniques to create a more complex periodic boundary condition for a layer of an entanglement structure according to some embodiments. FIG. 36A shows a layer 3600 of an entanglement structure, with boundaries 3602, 3603, 3604, 3605, which can be folded to create a layer of an entanglement structure with a toroidal topology. Specifically, as shown in FIG. 36B, boundaries 3604, 3605 are coupled to each other (similarly to the cylindrical topology of FIG. 35A), and as shown in FIG. 36C, boundaries 3602, 3603 are also coupled to each other, thereby forming a torus. FIG. 36D shows an interleaving technique that can be used to create a layer having toroidal topology by selectively coupling boundaries along different dimensions of the layers. As in FIG. 34C, time runs along the z-axis (vertical on the page), and the layers are shown as rectangles in the xy plane. Four layers 3621, 3622, 3623, 3624 are generated. At the boundaries, the layers are stitched together (e.g., using timelike fusion). The particular pattern of timelike fusions is indicated by the curved lines 3631 (between layers 3621 and 3624), 3632 (between layers 3622 and 3623), 3633 (between layers 3621 and 3622), and 3634 (between layers 3623 and 3624) and involves variable delays of up to 4τ (depending on which layers are being fused). The variable delay length can be implemented using active switches and multiple delay circuits, similarly to FIG. 30.

FIGS. 37A-37D are conceptual illustrations of using techniques described herein to create a diagonal folding for a layer of an entanglement structure according to some embodiments. FIG. 37A shows a layer 3700 of an entanglement structure having a +x boundary 3702 and a −y boundary 3704. In this example, layer 3700 is a square layer. In some embodiments, layer 3700 can be created with a diagonal fold, as shown in FIG. 37B. For example, as shown in FIG. 37C, four triangular patches 3711, 3712, 3713, and 3714 can be generated during four different time steps (each time step can be a clock cycle or a longer time step). Successive patches 3711, 3712 are stitched together at the diagonal boundary (as indicated by curved line 3721 to form a first square layer, and successive patches 3713, 3714 are stitched together at the diagonal boundary as indicated by curved line 3722 to form a second square layer. Entanglement between corresponding locations in the first and second layers can be created as indicated by lines 3724 (representing entanglement between patch 3711 of the first square layer and patch 3713 of the second square layer) and 3726 (representing entanglement between patch 3712 of the first square layer and patch 3714 of the second square layer). In some embodiments, a triangular patch can be generated using a network of unit cells with different numbers of unit cells corresponding to different rows or using a rasterized unit cell that generates a varying number of resource states per row. Further, a square network of unit cells or a rasterized unit cell that generates a fixed number of resource states per row can be used to concurrently generate triangular patches for two different structures that may subsequently be entangled with each other (e.g., by appropriately configuring the x-dimension and y-dimension fusion circuits). In some embodiments, diagonal folding of the layers can support logical operations that may be implemented using fusion operations on pairs of qubits that are close in space and time, or logical operations may be performed between multiple logical qubits by performing fusion operations on pairs of qubits that are close in space and time as a result of the diagonally folded layer topology. For example, FIG. 37D shows an example of fusion between qubits (indicated by lines 3734) in different portions of a diagonally folded layer made from triangular patches 3731, 3732. In some embodiments, fusion operations of this kind can be used to implement a transversal gate.

These examples of layer topologies are illustrative. It should be understood that a variety of layer topologies can be generated, not limited to the examples shown. Further, generation of multiple entanglement structures can be performed using interleaving techniques regardless of the layer topology of any particular entanglement structure.

4. Implementing Quantum Computing Operations

Quantum computing operations using entanglement structures generated in the manner described above can be implemented using various techniques. One approach is to modify the resource states (and therefore the entanglement geometry) based on the computation to be performed. For example, resource states at different positions in a 2D layer may be generated with different entanglement geometries. In some embodiments, the RSG circuits can be dynamically reconfigurable to allow resource states with different entanglement geometries to be generated.

Another approach involves modifying the fusion operations when resource states are fused together. For example, using reconfigurable fusion circuits as described above with reference to FIG. 14E, MZI circuits with variable phase shifts (e.g., as described in Section 1.3 above) can be applied selectively to different qubits (or to individual modes) prior to fusion, thereby allowing different quantum logic operations to be implemented. In various embodiments, these approaches can be combined.

5. Example Quantum Computer Systems

Figure 38:
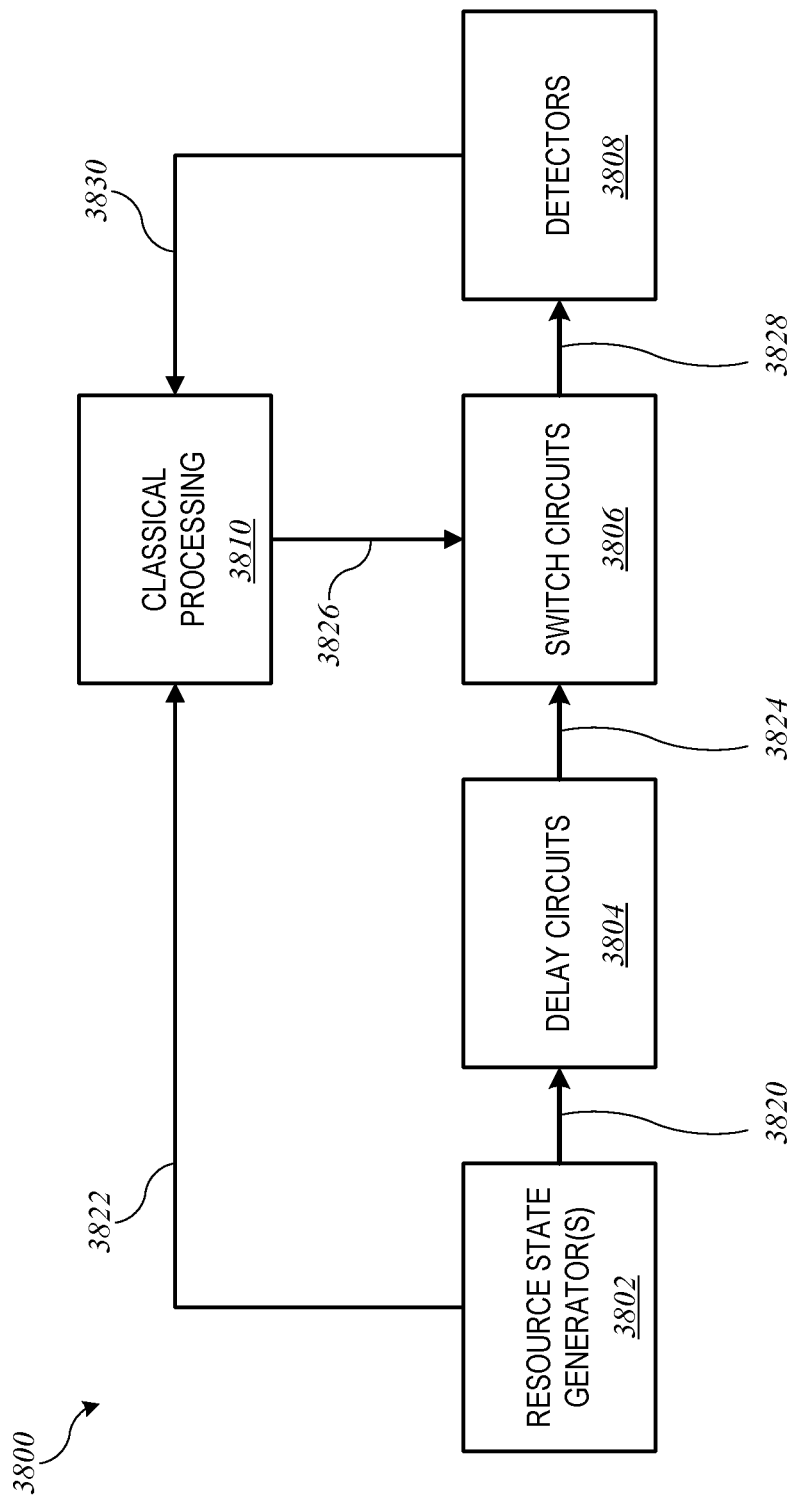
FIG. 38 shows an example system architecture for a quantum computer system according to some embodiments.

FIG. 38 shows an example system architecture for a quantum computer system 3800 that can implement MBQC or FBQC according to some embodiments. Using photonic physical qubits, some embodiments of quantum computer system 3800 can generate a fault-tolerant cluster state that can be used to represent logical qubits for MBQC; other embodiments of quantum computer system 3800 can generate measurement data reflecting entanglement structures for fault-tolerant FBQC. System 3800 includes resource state generator(s) 3802, delay circuits 3804, switch circuits 3806, detectors 3808, and a classical processing unit 3810.

Resource state generators 3802 can include a single instance of a resource state generator circuit as described above or multiple instances. The RSG circuit(s) can be autonomously operated, with no data input required, and each RSG circuit can generate one resource state per clock cycle (which can be, e.g., ~1 ns or longer). Any of the resource states described above or other resource states can be generated. The resource state can be output on optical fibers (or other waveguides) 3820, e.g., at a rate of n*N photons per clock cycle where n is the number of qubits in each resource state and N is the number of instances of the RSG circuit. Resource state generator unit 3802 can also send classical data output (e.g., indicating success or failure of various elements of the resource state generation process) to classical processing unit 3810 via data path 3822. In some embodiments, resource state generator unit 3802 can be maintained at cryogenic temperatures (e.g., 4 K). Delay circuit 3804 can include optical fibers, other waveguides, optical memory or other components to delay photons corresponding to particular qubits by appropriate delay time, e.g., delay times of 1 clock cycle, L clock cycles, and $L^2$ clock cycles as described above. As described above, in some embodiments, only one delay line of each duration is needed to implement rasterized generation of a logical qubit. Delay circuits 3804 need not operate at cryogenic temperatures. Photons exiting delay circuit 3804 can be delivered to switch circuits 3806 via waveguides 3824, which can be optical fibers, on-chip waveguides, or any other type of waveguide.

Switch circuits 3806 can include active switches and waveguides to perform mode coupling, mode swapping, and phase shift operations on the qubits. In various embodiments, switch circuits 3806 can perform mode coupling operations associated with fusion operations (e.g., type II fusion operations as described above with reference in FIG. 9A) and/or basis selection operations associated with measurement of individual qubits. In some embodiments, switch circuits 3806 can be dynamically reconfigurable in response to control signals from classical processor 3810, and quantum computer 3800 can perform different computations by reconfiguring switches in switch circuit 3806. In some embodiments, switch circuits 3806 can implement all of the reconfigurable switches and mode couplers for the reconfigurable fusion circuits used in examples above. Switching circuits 3806 deliver output photons to detectors 3808 via waveguides 3828, which can be optical fibers, on-chip waveguides, or any other type of waveguide.

Detectors 3808 can include photonic detectors capable of detecting photons in a waveguide. Each photonic detector is coupled to one waveguide and generates an output (classical) signal indicating whether a photon was detected. In some embodiments, some or all of the photonic detectors can be capable of counting photons, and the output signal from each photonic detector can include the number of photons detected by that photonic detector. In some embodiments, detectors 3808 may operate at cryogenic temperatures. Detectors 3808 can provide classical output signals indicating the number of photons (or binary signals indicating whether a photon was detected) to classical processing unit 3810 via signal path 3830.

Classical processing unit 3810 can be a classical computer system that is capable of communicating with resource state generator(s) 3802, switch circuits 3806, and detectors 3808 using classical digital logic signals. In some embodiments, classical processing unit 3810 can determine appropriate settings for switch circuits 3806 based on a particular quantum computation (or program) to be executed. Classical processing unit 3810 can receive feedback signals (e.g., measurement outcomes) from resource state generator(s) 3802 and detectors 3808 and can determine the result of the computation based on the feedback signals. In some embodiments, classical processing unit 3810 can use the feedback signals to modify subsequent control signals sent to switch circuits 3806. Operation of classical processing unit 3810 may incorporate error correction algorithms and other techniques.

System 3800 of FIG. 38 is illustrative, and variations and modifications are possible. Blocks shown separately can be combined, or a single block can be implemented using multiple distinct components. Resource state generator(s) 3802, delay circuits 3804, switch circuits 3806, and detectors 3808 can implement the circuits descried above for generating entanglement structures. For instance, delay circuits 3804 can implement all of the delay line portions of the offset reconfigurable fusion circuits described above, while switch circuits 3806 can implement the reconfigurable switches and mode couplers associated with reconfigurable fusion and detectors 3810 can implement the destructive measurements associated with fusion operations. In some embodiments, generating the entanglement structure can include producing an LES on which measurements of individual qubits can be made to implement MBQC. In other embodiments, generating the entanglement structure can include performing fusion operations on qubits of resource states (e.g., as described above) with the measurement results obtained in the fusion operations provided to classical processing unit 3810, thereby implementing FBQC.

System 3800 is just one example of a quantum computer systems that can incorporate rasterization and/or interleaving techniques as described herein to generate one or more logical qubits or other cluster states or other entanglement structures, and those skilled in the art with access to this disclosure will appreciate that many different systems can be implemented.

6. Additional Embodiments

Embodiments described herein provide examples of systems and methods for generating entanglement structures that can be used, for instance, as fault-tolerant cluster states (which can be used to create and manipulate logical qubits), or in any other operation where large entanglement structures may be desirable. The size and entanglement geometry of an entanglement structure can be varied according to the particular use-case. For instance, while the foregoing description uses examples of entanglement structures from layers that are two-dimensional (in entanglement space), a layer can have more dimensions. Further, the embodiments described above include references to specific materials and structures (e.g., optical fibers), but other materials and structures capable of producing, propagating, and operating on photons can be substituted.

It should be understood that all numerical values used herein are for purposes of illustration and may be varied. In some instances ranges are specified to provide a sense of scale, but numerical values outside a disclosed range are not precluded.

It should also be understood that all diagrams herein are intended as schematic. Unless specifically indicated otherwise, the drawings are not intended to imply any particular physical arrangement of the elements shown therein, or that all elements shown are necessary. Those skilled in the art with access to this disclosure will understand that elements shown in drawings or otherwise described in this disclosure can be modified or omitted and that other elements not shown or described can be added.

This disclosure provides a description of the claimed invention with reference to specific embodiments. Those skilled in the art with access to this disclosure will appreciate that the embodiments are not exhaustive of the scope of the claimed invention, which extends to all variations, modifications, and equivalents.

What is claimed is:

1. A circuit for generating entanglement among qubits, the circuit comprising a number (N) of unit cells forming a network such that each unit cell is coupled to at least two neighboring unit cells, each unit cell comprising:
   a routing circuit having a plurality of optical paths to provide a first local resource state during a first clock cycle, a second local resource state during a second clock cycle, a third local resource state during a third clock cycle, and a fourth local resource state during a fourth clock cycle, wherein each of the first, second, third, and fourth local resource states comprises a system of entangled photonic qubits and wherein the first, second, third, and fourth clock cycles are different clock cycles;
   a plurality of fusion circuits including a first local fusion circuit, a second local fusion circuit, a third local fusion circuit, a first networked fusion circuit, and a second networked fusion circuit, each of the plurality of fusion circuits being configured to perform an entangling measurement operation between two input qubits;
   a first local delay line coupled to a first input of the first local fusion circuit and having a delay of a first number of clock cycles;
   a second local delay line coupled to a first input of the second local fusion circuit and having a delay of a second number of clock cycles, the second number being greater than the first number;
   a third local delay line coupled to a first input of the third local fusion circuit and having a delay of a third number of clock cycles, the third number being greater than the second number;
   a first routing switch configured to selectably direct a first qubit of each resource state to one of the first local delay line of the unit cell or a first input of the first networked fusion circuit of a first neighboring unit cell;
   a second routing switch configured to selectably direct a second qubit of each resource state to one of a second input of the first local fusion circuit or a second input of the first networked fusion circuit of the unit cell;
   a third routing switch configured to selectably direct a third qubit of each resource state to one of the second local delay line of the unit cell or a first input of the second networked fusion circuit of a second neighboring unit cell;
   a fourth routing switch configured to selectably direct a fourth qubit of each resource state to one of a second input of the second local fusion circuit or a second input of the second networked fusion circuit of the unit cell;
   a first routing path to direct a fifth qubit of each resource state to the third local delay line; and
   a second routing path to direct a sixth qubit of each resource state to the third local fusion circuit.

2. The circuit of claim 1 wherein:
   the circuit is operable to form a large entangled system of qubits having an entanglement structure comprising a plurality of layers in entanglement space;
   the first local resource state, the second local resource state, and the third local resource state are all associated with a first one of the plurality of layers; and
   the fourth local resource state is associated with a second one of the plurality of layers.

3. The circuit of claim 1 wherein:
   the resource states define a plurality of layers in entanglement space;
   the first local resource state, the second local resource state, and the third local resource state are all associated with a first one of the plurality of layers; and
   the fourth local resource state is associated with a second one of the plurality of layers.

4. The circuit of claim 3 wherein each layer of the plurality of layers in the entanglement space is a two-dimensional layer having a size of $L^2$ and where each unit cell generates a number ($P^2$) of resource states for each layer, wherein $P^2=L^2/N$.

5. The circuit of claim 4 wherein:
   the first clock cycle and the second clock cycle are separated by a first time interval; and
   the first and third clock cycles are separated by P times the first time interval.

6. The circuit of claim 5 wherein the first clock cycle and the fourth clock cycle are separated by $P^2$ times the first time interval.

7. The circuit of claim 1 wherein each of the plurality of fusion circuits is configured such that the entangling measurement operation includes a destructive measurement on both of the input qubits.

8. The circuit of claim 1 wherein each unit cell further comprises a resource state generator circuit having photonic circuitry to generate one resource state during each clock cycle and to provide the resource state to the routing circuit.

9. The circuit of claim 1 further comprising:
   a plurality of resource state generator circuits having photonic circuitry to generate resource states; and
   an active multiplexer network configured to deliver resource states from the resource state generator circuits to the routing circuits in the unit cells.

* * * * *